(12) United States Patent
Trisnadi et al.

(10) Patent No.: US 6,782,205 B2
(45) Date of Patent: Aug. 24, 2004

(54) METHOD AND APPARATUS FOR DYNAMIC EQUALIZATION IN WAVELENGTH DIVISION MULTIPLEXING

(75) Inventors: Jahja I. Trisnadi, Cupertino, CA (US); Clinton B. Carlisle, Palo Alto, CA (US)

(73) Assignee: Silicon Light Machines, Sunnyvale, CA (US)

( * ) Notice: Subject to any disclaimer, the term of this patent is extended or adjusted under 35 U.S.C. 154(b) by 0 days.

(21) Appl. No.: 10/051,972

(22) Filed: Jan. 15, 2002

(65) Prior Publication Data

US 2002/0196492 A1 Dec. 26, 2002

Related U.S. Application Data

(60) Provisional application No. 60/301,106, filed on Jun. 25, 2001, and provisional application No. 60/328,586, filed on Oct. 9, 2001.

(51) Int. Cl.[7] .............................................. H04J 14/02
(52) U.S. Cl. ...................................... 398/94; 398/197
(58) Field of Search ................................. 359/291, 124, 359/125, 126, 127, 128, 130, 131; 398/94, 158, 79, 81, 197

(56) References Cited

U.S. PATENT DOCUMENTS

| 1,525,550 A | 2/1925 | Jenkins ........................ 359/291 |
| 1,548,262 A | 8/1925 | Freedman ...................... 283/67 |

(List continued on next page.)

FOREIGN PATENT DOCUMENTS

| DE | 32 33 195 A1 | 3/1983 | ........... H01L/23/52 |
| DE | 43 23 799 A1 | 1/1994 | ........... H01L/23/50 |

(List continued on next page.)

OTHER PUBLICATIONS

R. Apte, "Grating Light Valves for High Resolution Displays", Solid State Sensors and Actuators Workshop, Ph D. Dissertation, Stanford University (Jun. 1994).

O. Solgaard, "Integrated Semiconductor Light Modulators for Fiber–Optic and Display Applications", Ph.D. Dissertation, Stanford University Feb., 1992.

(List continued on next page.)

*Primary Examiner*—Leslie Pascal
*Assistant Examiner*—Christina Y Leung
(74) *Attorney, Agent, or Firm*—Haverstock & Owens LLP

(57) ABSTRACT

An adjustable diffractive light modulator is used to equalize the power level of wavelength multiplexed signals in wavelength division multiplexing applications. An optical channel transmits a multi-wavelength input signal through a wavelength demultiplexer. The input signal comprises a plurality of component signals defined according to a plurality of wavelengths. The de-multiplexer spatially separates the multi-wavelength input signal into its respective plurality of component signals, which are transmitted through a plurality of optical channels onto a plurality of controllable diffractive light modulators. The diffractive light modulators are advantageously comprised of grating light valves. Component signals are reflected off their respective diffractive light modulators and collected in a plurality of optical channels for re-transmission into a wavelength multiplexer. The reflected signals are combined through a multiplexing process and transmitted as an output beam. Control of the diffractive light modulator is achieved by sensors measuring the power level of signals passing through the plurality of optical channels. The measured power levels of light are converted to digital values which are input into an electronic controller for processing. Control output signals from the controller are used to independently control individual pixels within the diffractive light modulator to equalize the reflected light signals.

38 Claims, 17 Drawing Sheets

U.S. PATENT DOCUMENTS

| | | | |
|---|---|---|---|
| RE16,767 E | 10/1927 | Jenkins | |
| 1,814,701 A | 7/1931 | Ives | 359/462 |
| 2,415,226 A | 2/1947 | Sziklai | 178/5.4 |
| 2,783,406 A | 2/1957 | Vanderhooft | 313/70 |
| 2,920,529 A | 1/1960 | Blythe | 88/73 |
| 2,991,690 A | 7/1961 | Grey et al. | 88/16.6 |
| RE25,169 E | 5/1962 | Glenn | |
| 3,256,465 A | 6/1966 | Weissenstern et al. | 317/101 |
| 3,388,301 A | 6/1968 | James | 317/234 |
| 3,443,871 A | 5/1969 | Chitayat | 356/106 |
| 3,553,364 A | 1/1971 | Lee | 178/7.3 |
| 3,576,394 A | 4/1971 | Lee | 178/7.3 |
| 3,600,798 A | 8/1971 | Lee | 29/592 |
| 3,656,837 A | 4/1972 | Sandbank | 350/161 |
| 3,657,610 A | 4/1972 | Yamamoto et al. | 317/243 |
| 3,693,239 A | 9/1972 | Dix | 29/470 |
| 3,743,507 A | 7/1973 | Ih et al. | 96/81 |
| 3,752,563 A | 8/1973 | Torok et al. | 350/151 |
| 3,781,465 A | 12/1973 | Ernstoff et al. | 178/5.4 BD |
| 3,783,184 A | 1/1974 | Ernstoff et al. | 178/5.4 BD |
| 3,792,916 A | 2/1974 | Sarna | 350/163 |
| 3,802,769 A | 4/1974 | Rotz et al. | 352/43 |
| 3,811,186 A | 5/1974 | Larnerd et al. | 29/626 |
| 3,861,784 A | 1/1975 | Torok | 350/162 R |
| 3,862,360 A | 1/1975 | Dill et al. | 178/7.3 D |
| 3,871,014 A | 3/1975 | King et al. | 357/67 |
| 3,886,310 A | 5/1975 | Guldberg et al. | 178/7.5 D |
| 3,896,338 A | 7/1975 | Nathanson et al. | 315/373 |
| 3,915,548 A | 10/1975 | Opittek | 350/3.5 |
| 3,935,499 A | 1/1976 | Oess | 313/413 |
| 3,935,500 A | 1/1976 | Oess et al. | 313/495 |
| 3,938,881 A | 2/1976 | Biegelsen et al. | 350/161 |
| 3,941,456 A | 3/1976 | Schilz et al. | 350/161 |
| 3,942,245 A | 3/1976 | Jackson et al. | 29/591 |
| 3,943,281 A | 3/1976 | Keller et al. | 178/7.5 D |
| 3,947,105 A | 3/1976 | Smith | 353/121 |
| 3,969,611 A | 7/1976 | Fonteneau | 219/502 |
| 3,980,476 A | 9/1976 | Wysocki | 96/1.1 |
| 3,991,416 A | 11/1976 | Byles et al. | 340/324 R |
| 4,001,663 A | 1/1977 | Bray | 321/2 |
| 4,004,849 A | 1/1977 | Shattuck | 350/160 R |
| 4,006,968 A | 2/1977 | Ernstoff et al. | 350/160 LC |
| 4,009,939 A | 3/1977 | Okano | 350/162 SF |
| 4,011,009 A | 3/1977 | Lama et al. | 350/162 R |
| 4,012,116 A | 3/1977 | Yevick | 350/132 |
| 4,012,835 A | 3/1977 | Wallick | 29/591 |
| 4,017,158 A | 4/1977 | Booth | 350/162 SF |
| 4,020,381 A | 4/1977 | Oess et al. | 313/302 |
| 4,021,766 A | 5/1977 | Aine | 338/2 |
| 4,034,211 A | 7/1977 | Horst et al. | 235/61.12 N |
| 4,034,399 A | 7/1977 | Drukier et al. | 357/68 |
| 4,035,068 A | 7/1977 | Rawson | 353/122 |
| 4,067,129 A | 1/1978 | Abramson et al. | 40/563 |
| 4,084,437 A | 4/1978 | Finnegan | 73/361 |
| 4,090,219 A | 5/1978 | Ernstoff et al. | 358/59 |
| 4,093,346 A | 6/1978 | Nishino et al. | 350/162 SF |
| 4,093,921 A | 6/1978 | Buss | 325/459 |
| 4,093,922 A | 6/1978 | Buss | 325/459 |
| 4,100,579 A | 7/1978 | Ernstoff | 358/230 |
| 4,103,273 A | 7/1978 | Keller | 338/2 |
| 4,126,380 A | 11/1978 | Borm | 350/266 |
| 4,127,322 A | 11/1978 | Jacobson et al. | 353/31 |
| 4,135,502 A | 1/1979 | Peck | 128/76.5 |
| 4,139,257 A | 2/1979 | Matsumoto | 350/6.1 |
| 4,143,943 A | 3/1979 | Rawson | 350/120 |
| 4,163,570 A | 8/1979 | Greenaway | 283/8 A |
| 4,184,700 A | 1/1980 | Greenaway | 283/6 |
| 4,185,891 A | 1/1980 | Kaestner | 350/167 |
| 4,190,855 A | 2/1980 | Inoue | 357/80 |
| 4,195,915 A | 4/1980 | Lichty et al. | 350/345 |
| 4,205,428 A | 6/1980 | Ernstoff et al. | 29/592 R |
| 4,211,918 A | 7/1980 | Nyfeler et al. | 235/454 |
| 4,223,050 A | 9/1980 | Nyfeler et al. | 427/163 |
| 4,225,913 A | 9/1980 | Bray | 363/97 |
| 4,249,796 A | 2/1981 | Sincerbox et al. | 350/370 |
| 4,250,217 A | 2/1981 | Greenaway | 428/161 |
| 4,250,393 A | 2/1981 | Greenaway | 250/566 |
| 4,256,787 A | 3/1981 | Shaver et al. | 428/1 |
| 4,257,016 A | 3/1981 | Kramer, Jr. et al. | 322/7.51 |
| 4,290,672 A | 9/1981 | Whitefield | 350/358 |
| 4,295,145 A | 10/1981 | Latta | 346/108 |
| 4,311,999 A | 1/1982 | Upton et al. | 340/755 |
| 4,327,411 A | 4/1982 | Turner | 364/900 |
| 4,327,966 A | 5/1982 | Bloom | 350/162 R |
| 4,331,972 A | 5/1982 | Rajchman | 358/60 |
| 4,336,982 A | 6/1982 | Rector, Jr. | 350/358 |
| 4,338,660 A | 7/1982 | Kelley et al. | 364/200 |
| 4,343,535 A | 8/1982 | Bleha, Jr. | 350/342 |
| 4,346,965 A | 8/1982 | Sprague et al. | 350/358 |
| 4,348,079 A | 9/1982 | Johnson | 350/358 |
| 4,355,463 A | 10/1982 | Burns | 29/827 |
| 4,361,384 A | 11/1982 | Bosserman | 350/174 |
| 4,369,524 A | 1/1983 | Rawson et al. | 455/606 |
| 4,374,397 A | 2/1983 | Mir | 358/75 |
| 4,389,096 A | 6/1983 | Hori et al. | 350/339 R |
| 4,391,490 A | 7/1983 | Hartke | 350/356 |
| 4,396,246 A | 8/1983 | Holman | 350/96.14 |
| 4,398,798 A | 8/1983 | Krawczak et al. | 350/162.24 |
| 4,400,740 A | 8/1983 | Traino et al. | 358/293 |
| 4,408,884 A | 10/1983 | Kleinknecht et al. | 356/355 |
| 4,414,583 A | 11/1983 | Hooker, III | 358/300 |
| 4,417,386 A | 11/1983 | Exner | 29/590 |
| 4,418,397 A | 11/1983 | Brantingham et al. | 364/900 |
| 4,420,717 A | 12/1983 | Wallace et al. | 318/696 |
| 4,422,099 A | 12/1983 | Wolfe | 358/293 |
| 4,426,768 A | 1/1984 | Black et al. | 29/583 |
| 4,430,584 A | 2/1984 | Someshwar et al. | 307/465 |
| 4,435,041 A | 3/1984 | Torok et al. | 350/162.24 |
| 4,440,839 A | 4/1984 | Mottier | 430/2 |
| 4,443,819 A | 4/1984 | Funada et al. | 358/236 |
| 4,443,845 A | 4/1984 | Hamilton et al. | 364/200 |
| 4,447,881 A | 5/1984 | Brantingham et al. | 364/488 |
| 4,454,591 A | 6/1984 | Lou | 364/900 |
| 4,456,338 A | 6/1984 | Gelbart | 350/358 |
| 4,460,907 A | 7/1984 | Nelson | 346/153.1 |
| 4,462,046 A | 7/1984 | Spight | 358/101 |
| 4,467,342 A | 8/1984 | Tower | 357/30 |
| 4,468,725 A | 8/1984 | Venturini | 363/160 |
| 4,483,596 A | 11/1984 | Marshall | 350/385 |
| 4,484,188 A | 11/1984 | Ott | 340/728 |
| 4,487,677 A | 12/1984 | Murphy | 204/247 |
| 4,492,435 A | 1/1985 | Banton et al. | 350/360 |
| 4,503,494 A | 3/1985 | Hamilton et al. | 364/200 |
| 4,511,220 A | 4/1985 | Scully | 350/403 |
| 4,538,883 A | 9/1985 | Sprague et al. | 350/356 |
| 4,545,610 A | 10/1985 | Lakritz et al. | 29/589 |
| 4,556,378 A | 12/1985 | Nyfeler et al. | 425/143 |
| 4,558,171 A | 12/1985 | Gantley et al. | 174/52 FP |
| 4,561,044 A | 12/1985 | Ogura et al. | 362/84 |
| 4,566,935 A | 1/1986 | Hornbeck | 156/626 |
| 4,567,585 A | 1/1986 | Gelbart | 369/97 |
| 4,571,041 A | 2/1986 | Gaudyn | 353/10 |
| 4,571,603 A | 2/1986 | Hornbeck et al. | 346/160 |
| 4,577,932 A | 3/1986 | Gelbart | 350/358 |
| 4,577,933 A | 3/1986 | Yip et al. | 350/358 |
| 4,588,957 A | 5/1986 | Balant et al. | 330/4.3 |
| 4,590,548 A | 5/1986 | Maytum | 363/161 |
| 4,594,501 A | 6/1986 | Culley et al. | 219/492 |
| 4,596,992 A | 6/1986 | Hornbeck | 346/76 PH |
| 4,615,595 A | 10/1986 | Hornbeck | 353/122 |
| 4,623,219 A | 11/1986 | Trias | 350/351 |

| | | | |
|---|---|---|---|
| 4,636,039 A | 1/1987 | Turner .................... 350/356 |
| 4,636,866 A | 1/1987 | Hattori .................... 358/236 |
| 4,641,193 A | 2/1987 | Glenn .................... 358/233 |
| 4,645,881 A | 2/1987 | LeToumelin et al. ........ 379/252 |
| 4,646,158 A | 2/1987 | Ohno et al. .............. 358/236 |
| 4,649,085 A | 3/1987 | Landram .................. 428/620 |
| 4,649,432 A | 3/1987 | Watanabe et al. .......... 358/241 |
| 4,652,932 A | 3/1987 | Miyajima et al. .......... 358/236 |
| 4,655,539 A | 4/1987 | Caulfield et al. .......... 350/3.6 |
| 4,660,938 A | 4/1987 | Kazan .................... 350/355 |
| 4,661,828 A | 4/1987 | Miller, Jr. et al. ........ 346/108 |
| 4,662,746 A | 5/1987 | Hornbeck ................. 350/269 |
| 4,663,670 A | 5/1987 | Ito et al. ............... 358/245 |
| 4,687,326 A | 8/1987 | Corby, Jr. ............... 356/5 |
| 4,698,602 A | 10/1987 | Armitage ................. 332/7.51 |
| 4,700,276 A | 10/1987 | Freyman et al. ............ 361/403 |
| 4,707,064 A | 11/1987 | Dobrowolski et al. ... 350/96.19 |
| 4,709,995 A | 12/1987 | Kuribayashi et al. ....... 350/350 |
| 4,710,732 A | 12/1987 | Hornbeck ................. 332/7.51 |
| 4,711,526 A | 12/1987 | Hennings et al. ........... 350/170 |
| 4,714,326 A | 12/1987 | Usui et al. ............... 350/485 |
| 4,717,066 A | 1/1988 | Goldenberg et al. ........ 228/179 |
| 4,719,507 A | 1/1988 | Bos ....................... 358/92 |
| 4,721,629 A | 1/1988 | Sakai et al. .............. 427/35 |
| 4,722,593 A | 2/1988 | Shimazaki ................. 350/336 |
| 4,724,467 A | 2/1988 | Yip et al. ................ 355/71 |
| 4,728,185 A | 3/1988 | Thomas ................... 353/122 |
| 4,743,091 A | 5/1988 | Gelbart ................... 350/252 |
| 4,744,633 A | 5/1988 | Sheiman .................. 350/132 |
| 4,747,671 A | 5/1988 | Takahashi et al. .......... 350/336 |
| 4,751,509 A | 6/1988 | Kubota et al. ............. 340/784 |
| 4,761,253 A | 8/1988 | Antes .................... 264/1.3 |
| 4,763,975 A | 8/1988 | Scifres et al. ............ 350/96.15 |
| 4,765,865 A | 8/1988 | Gealer et al. ............. 156/647 |
| 4,772,094 A | 9/1988 | Sheiman .................. 350/133 |
| 4,797,694 A | 1/1989 | Agostinelli et al. ........ 346/160 |
| 4,797,918 A | 1/1989 | Lee et al. ................ 380/20 |
| 4,801,194 A | 1/1989 | Agostinelli et al. ........ 350/356 |
| 4,803,560 A | 2/1989 | Matsunaga et al. ......... 359/236 |
| 4,804,641 A | 2/1989 | Arlt et al. ............... 437/227 |
| 4,807,021 A | 2/1989 | Okumura .................. 357/75 |
| 4,807,965 A | 2/1989 | Garakani .................. 350/131 |
| 4,809,078 A | 2/1989 | Yabe et al. ............... 358/236 |
| 4,811,082 A | 3/1989 | Jacobs et al. ............. 357/80 |
| 4,811,210 A | 3/1989 | McAulay .................. 364/200 |
| 4,814,759 A | 3/1989 | Gombrich et al. .......... 340/771 |
| 4,817,850 A | 4/1989 | Wiener-Avnear et al. ... 228/119 |
| 4,824,200 A | 4/1989 | Isono et al. .............. 350/96.16 |
| 4,827,391 A | 5/1989 | Sills ..................... 363/41 |
| 4,829,365 A | 5/1989 | Eichenlaub ................ 358/3 |
| 4,836,649 A | 6/1989 | Ledebuhr et al. .......... 350/331 R |
| 4,856,863 A | 8/1989 | Sampsell et al. .......... 350/96.16 |
| 4,856,869 A | 8/1989 | Sakata et al. ............. 350/162.18 |
| 4,859,012 A | 8/1989 | Cohn ..................... 350/96.24 |
| 4,859,060 A | 8/1989 | Katagiri et al. ........... 356/352 |
| 4,866,488 A | 9/1989 | Frensley ................. 357/4 |
| 4,882,683 A | 11/1989 | Rupp et al. .............. 364/521 |
| 4,893,509 A | 1/1990 | MacIver et al. ........ 73/517 AV |
| 4,896,325 A | 1/1990 | Coldren .................. 372/20 |
| 4,896,948 A | 1/1990 | Dono et al. .............. 350/355 |
| 4,897,708 A | 1/1990 | Clements ................. 357/65 |
| 4,902,083 A | 2/1990 | Wells .................... 350/6.6 |
| 4,915,463 A | 4/1990 | Barbee, Jr. ............... 350/1.1 |
| 4,915,479 A | 4/1990 | Clarke ................... 350/345 |
| 4,924,413 A | 5/1990 | Suwannukul ............... 364/521 |
| 4,926,241 A | 5/1990 | Carey .................... 357/75 |
| 4,930,043 A | 5/1990 | Wiegand .................. 361/283 |
| 4,934,773 A | 6/1990 | Becker ................... 350/6.6 |
| 4,940,309 A | 7/1990 | Baum ..................... 350/171 |
| 4,943,815 A | 7/1990 | Aldrich et al. ............ 346/108 |
| 4,945,773 A | 8/1990 | Sickafus ................. 73/862.59 |
| 4,949,148 A | 8/1990 | Bartelink ................. 357/74 |
| 4,950,890 A | 8/1990 | Gelbart .................. 250/237 G |
| 4,952,925 A | 8/1990 | Haastert ................. 340/784 |
| 4,954,789 A | 9/1990 | Sampsell ................. 330/4.3 |
| 4,956,619 A | 9/1990 | Hornbeck ................. 330/4.3 |
| 4,961,633 A | 10/1990 | Ibrahim et al. ............ 350/392 |
| 4,963,012 A | 10/1990 | Tracy et al. .............. 350/641 |
| 4,970,575 A | 11/1990 | Soga et al. .............. 357/72 |
| 4,978,202 A | 12/1990 | Yang ..................... 350/331 R |
| 4,982,184 A | 1/1991 | Kirkwood ................. 340/783 |
| 4,982,265 A | 1/1991 | Watanabe et al. .......... 357/75 |
| 4,984,824 A | 1/1991 | Antes et al. .............. 283/91 |
| 4,999,308 A | 3/1991 | Nishiura et al. ........... 437/4 |
| 5,003,300 A | 3/1991 | Wells .................... 340/705 |
| 5,009,473 A | 4/1991 | Hunter et al. ............. 350/6.6 |
| 5,013,141 A | 5/1991 | Sakata ................... 350/348 |
| 5,018,256 A | 5/1991 | Hornbeck ................. 29/25.01 |
| 5,022,750 A | 6/1991 | Flasck ................... 353/31 |
| 5,023,905 A | 6/1991 | Wells et al. .............. 379/96 |
| 5,024,494 A | 6/1991 | Williams et al. ........... 350/3.6 |
| 5,028,939 A | 7/1991 | Hornbeck et al. .......... 346/160 |
| 5,035,473 A | 7/1991 | Kuwayama et al. .......... 350/3.7 |
| 5,037,173 A | 8/1991 | Sampsell et al. .......... 385/17 |
| 5,039,628 A | 8/1991 | Carey .................... 437/183 |
| 5,040,052 A | 8/1991 | McDavid .................. 357/80 |
| 5,041,395 A | 8/1991 | Steffen .................. 437/206 |
| 5,041,851 A | 8/1991 | Nelson ................... 346/160 |
| 5,043,917 A | 8/1991 | Okamoto .................. 364/518 |
| 5,048,077 A | 9/1991 | Wells et al. .............. 379/96 |
| 5,049,901 A | 9/1991 | Gelbart .................. 346/108 |
| 5,058,992 A | 10/1991 | Takahashi ................ 359/567 |
| 5,060,058 A | 10/1991 | Goldenberg et al. ........ 358/60 |
| 5,061,049 A | 10/1991 | Hornbeck ................. 359/224 |
| 5,066,614 A | 11/1991 | Dunaway et al. ........... 437/209 |
| 5,068,205 A | 11/1991 | Baxter et al. ............. 437/205 |
| 5,072,239 A | 12/1991 | Mitcham et al. ........... 346/108 |
| 5,072,418 A | 12/1991 | Boutaud et al. ........ 364/715.06 |
| 5,074,947 A | 12/1991 | Estes et al. .............. 156/307.3 |
| 5,075,940 A | 12/1991 | Kuriyama et al. ........... 29/25.03 |
| 5,079,544 A | 1/1992 | DeMond et al. ............ 340/701 |
| 5,081,617 A | 1/1992 | Gelbart .................. 369/112 |
| 5,083,857 A | 1/1992 | Hornbeck ................. 359/291 |
| 5,085,497 A | 2/1992 | Um et al. ................ 359/848 |
| 5,089,903 A | 2/1992 | Kuwayama et al. .......... 359/15 |
| 5,093,281 A | 3/1992 | Eshima ................... 437/217 |
| 5,096,279 A | 3/1992 | Hornbeck et al. .......... 359/230 |
| 5,099,353 A | 3/1992 | Hornbeck ................. 359/291 |
| 5,101,184 A | 3/1992 | Antes .................... 235/454 |
| 5,101,236 A | 3/1992 | Nelson et al. ............. 355/229 |
| 5,103,334 A | 4/1992 | Swanberg ................. 359/197 |
| 5,105,207 A | 4/1992 | Nelson ................... 346/160 |
| 5,105,299 A | 4/1992 | Anderson et al. .......... 359/223 |
| 5,105,369 A | 4/1992 | Nelson ................... 364/525 |
| 5,107,372 A | 4/1992 | Gelbart et al. ............ 359/824 |
| 5,112,436 A | 5/1992 | Bol ...................... 156/643 |
| 5,113,272 A | 5/1992 | Reamey ................... 359/53 |
| 5,113,285 A | 5/1992 | Franklin et al. ........... 359/465 |
| 5,115,344 A | 5/1992 | Jaskie ................... 359/573 |
| 5,119,204 A | 6/1992 | Hashimoto et al. ......... 358/254 |
| 5,121,343 A | 6/1992 | Faris .................... 395/111 |
| 5,126,812 A | 6/1992 | Greiff ................... 357/25 |
| 5,126,826 A | 6/1992 | Kauchi et al. ............. 357/72 |
| 5,126,836 A | 6/1992 | Um ....................... 358/60 |
| 5,128,660 A | 7/1992 | DeMond et al. ............ 340/707 |
| 5,129,716 A | 7/1992 | Holakovszky et al. ....... 351/50 |
| 5,132,723 A | 7/1992 | Gelbart .................. 355/40 |
| 5,132,812 A | 7/1992 | Takahashi et al. .......... 359/9 |
| 5,136,695 A | 8/1992 | Goldshlag et al. .......... 395/275 |
| 5,137,836 A | 8/1992 | Lam ...................... 437/8 |
| 5,142,303 A | 8/1992 | Nelson ................... 346/108 |
| 5,142,405 A | 8/1992 | Hornbeck ................. 359/226 |

| | | | |
|---|---|---|---|
| 5,142,677 A | 8/1992 | Ehlig et al. ............... 395/650 |
| 5,144,472 A | 9/1992 | Sang, Jr. et al. ........... 359/254 |
| 5,147,815 A | 9/1992 | Casto ......................... 437/51 |
| 5,148,157 A | 9/1992 | Florence ................... 340/783 |
| 5,148,506 A | 9/1992 | McDonald ................. 385/16 |
| 5,149,405 A | 9/1992 | Bruns et al. ............. 204/129.1 |
| 5,150,205 A | 9/1992 | Um et al. .................... 358/60 |
| 5,151,718 A | 9/1992 | Nelson ...................... 346/160 |
| 5,151,724 A | 9/1992 | Kikinis ........................ 357/17 |
| 5,151,763 A | 9/1992 | Marek et al. ................ 357/26 |
| 5,153,770 A | 10/1992 | Harris ....................... 359/245 |
| 5,155,604 A | 10/1992 | Miekka et al. ................. 359/2 |
| 5,155,615 A | 10/1992 | Tagawa ..................... 359/213 |
| 5,155,778 A | 10/1992 | Magel et al. ................ 385/18 |
| 5,155,812 A | 10/1992 | Ehlig et al. ................ 395/275 |
| 5,157,304 A | 10/1992 | Kane et al. ................ 313/495 |
| 5,159,485 A | 10/1992 | Nelson ...................... 359/291 |
| 5,161,042 A | 11/1992 | Hamada ...................... 359/41 |
| 5,162,787 A | 11/1992 | Thompson et al. ......... 340/794 |
| 5,164,019 A | 11/1992 | Sinton ........................ 136/249 |
| 5,165,013 A | 11/1992 | Faris ........................... 395/104 |
| 5,168,401 A | 12/1992 | Endriz ....................... 359/625 |
| 5,168,406 A | 12/1992 | Nelson ....................... 359/855 |
| 5,170,156 A | 12/1992 | DeMond et al. ........... 340/794 |
| 5,170,269 A | 12/1992 | Lin et al. ....................... 359/9 |
| 5,170,283 A | 12/1992 | O'Brien et al. ............. 359/291 |
| 5,172,161 A | 12/1992 | Nelson ....................... 355/200 |
| 5,172,262 A | 12/1992 | Hornbeck .................. 359/223 |
| 5,177,724 A | 1/1993 | Gelbart .................... 369/44.16 |
| 5,178,728 A | 1/1993 | Boysel et al. .............. 156/209 |
| 5,179,274 A | 1/1993 | Sampsell ................ 250/208.2 |
| 5,179,367 A | 1/1993 | Shimizu .................... 340/700 |
| 5,181,231 A | 1/1993 | Parikh et al. ................. 377/26 |
| 5,182,665 A | 1/1993 | O'Callaghan et al. ........ 359/95 |
| 5,185,660 A | 2/1993 | Um ............................... 358/60 |
| 5,188,280 A | 2/1993 | Nakao et al. ............... 228/123 |
| 5,189,404 A | 2/1993 | Masimo et al. ............. 340/720 |
| 5,189,505 A | 2/1993 | Bartelink .................... 257/419 |
| 5,191,405 A | 3/1993 | Tomita et al. .............. 257/777 |
| 5,192,864 A | 3/1993 | McEwen et al. ............ 250/234 |
| 5,192,946 A | 3/1993 | Thompson et al. ......... 340/794 |
| 5,198,895 A | 3/1993 | Vick .......................... 358/103 |
| D334,557 S | 4/1993 | Hunter et al. ............. D14/114 |
| D334,742 S | 4/1993 | Hunter et al. ............. D14/113 |
| 5,202,785 A | 4/1993 | Nelson ....................... 359/214 |
| 5,206,629 A | 4/1993 | DeMond et al. ........... 340/719 |
| 5,208,818 A | 5/1993 | Gelbart et al. ............... 372/30 |
| 5,208,891 A | 5/1993 | Prysner ..................... 385/116 |
| 5,210,637 A | 5/1993 | Puzey ........................ 359/263 |
| 5,212,115 A | 5/1993 | Cho et al. .................... 437/208 |
| 5,212,555 A | 5/1993 | Stoltz ........................ 358/206 |
| 5,212,582 A | 5/1993 | Nelson ....................... 359/224 |
| 5,214,308 A | 5/1993 | Nishiguchi et al. ......... 257/692 |
| 5,214,419 A | 5/1993 | DeMond et al. ............ 340/794 |
| 5,214,420 A | 5/1993 | Thompson et al. ......... 340/795 |
| 5,216,537 A | 6/1993 | Hornbeck ................... 359/291 |
| 5,216,544 A | 6/1993 | Horikawa et al. ........... 359/622 |
| 5,219,794 A | 6/1993 | Satoh et al. ................ 437/209 |
| 5,220,200 A | 6/1993 | Blanton ...................... 257/778 |
| 5,221,400 A | 6/1993 | Staller et al. ............... 156/292 |
| 5,221,982 A | 6/1993 | Faris ............................. 359/93 |
| 5,224,088 A | 6/1993 | Atiya ........................... 369/97 |
| D337,320 S | 7/1993 | Hunter et al. ............. D14/113 |
| 5,226,099 A | 7/1993 | Mignardi et al. ............. 385/19 |
| 5,229,597 A | 7/1993 | Fukatsu |
| 5,230,005 A | 7/1993 | Rubino et al. ................ 372/20 |
| 5,231,363 A | 7/1993 | Sano et al. ................. 332/109 |
| 5,231,388 A | 7/1993 | Stoltz ......................... 340/783 |
| 5,231,432 A | 7/1993 | Glenn .......................... 353/31 |
| 5,233,456 A | 8/1993 | Nelson ....................... 359/214 |
| 5,233,460 A | 8/1993 | Partlo et al. ................ 359/247 |
| 5,233,874 A | 8/1993 | Putty et al. ............. 73/517 AV |
| 5,237,340 A | 8/1993 | Nelson ....................... 346/108 |
| 5,237,435 A | 8/1993 | Kurematsu et al. ........... 359/41 |
| 5,239,448 A | 8/1993 | Perkins et al. .............. 361/764 |
| 5,239,806 A | 8/1993 | Maslakow .................... 53/432 |
| 5,240,818 A | 8/1993 | Mignardi et al. ........... 430/321 |
| 5,245,686 A | 9/1993 | Faris et al. ................. 385/120 |
| 5,247,180 A | 9/1993 | Mitcham et al. ......... 250/492.1 |
| 5,247,593 A | 9/1993 | Lin et al. ...................... 385/17 |
| 5,249,245 A | 9/1993 | Lebby et al. ................. 385/89 |
| 5,251,057 A | 10/1993 | Guerin et al. ............... 359/249 |
| 5,251,058 A | 10/1993 | MacArthur ................. 359/249 |
| 5,254,980 A | 10/1993 | Hendrix et al. .............. 345/84 |
| 5,255,100 A | 10/1993 | Urbanus ..................... 358/231 |
| 5,256,869 A | 10/1993 | Lin et al. ................. 250/201.9 |
| 5,258,325 A | 11/1993 | Spitzer et al. ................ 437/86 |
| 5,260,718 A | 11/1993 | Rommelmann et al.   346/107 R |
| 5,260,798 A | 11/1993 | Um et al. .................... 358/233 |
| 5,262,000 A | 11/1993 | Welbourn et al. ........... 156/643 |
| 5,272,473 A | 12/1993 | Thompson et al. ............. 345/7 |
| 5,278,652 A | 1/1994 | Urbanus et al. ............. 358/160 |
| 5,278,925 A | 1/1994 | Boysel et al. ................. 385/14 |
| 5,280,277 A | 1/1994 | Hornbeck ................... 345/108 |
| 5,281,887 A | 1/1994 | Engle ......................... 310/353 |
| 5,281,957 A | 1/1994 | Schoolman .................... 345/8 |
| 5,285,105 A | 2/1994 | Cain .......................... 257/672 |
| 5,285,196 A | 2/1994 | Gale, Jr. ..................... 345/108 |
| 5,285,407 A | 2/1994 | Gale et al. ............. 365/189.11 |
| 5,287,096 A | 2/1994 | Thompson et al. ......... 345/147 |
| 5,287,215 A | 2/1994 | Warde et al. ............... 359/293 |
| 5,289,172 A | 2/1994 | Gale, Jr. et al. ............ 345/108 |
| 5,291,317 A | 3/1994 | Newswanger ................ 359/15 |
| 5,291,473 A | 3/1994 | Pauli ........................... 369/112 |
| 5,293,511 A | 3/1994 | Poradish et al. ............ 257/434 |
| 5,296,408 A | 3/1994 | Wilbarg et al. ............. 437/203 |
| 5,296,891 A | 3/1994 | Vogt et al. .................... 355/67 |
| 5,296,950 A | 3/1994 | Lin et al. ....................... 359/9 |
| 5,298,460 A | 3/1994 | Nishiguchi et al. ......... 437/183 |
| 5,299,037 A | 3/1994 | Sakata ......................... 359/41 |
| 5,299,289 A | 3/1994 | Omae et al. .................. 359/95 |
| 5,300,813 A | 4/1994 | Joshi et al. ................. 257/752 |
| 5,301,062 A | 4/1994 | Takahashi et al. .......... 359/567 |
| 5,303,043 A | 4/1994 | Glenn .......................... 348/40 |
| 5,303,055 A | 4/1994 | Hendrix et al. ............. 348/761 |
| 5,307,056 A | 4/1994 | Urbanus ..................... 340/189 |
| 5,307,185 A | 4/1994 | Jones et al. ................... 359/41 |
| 5,310,624 A | 5/1994 | Ehrlich ....................... 430/322 |
| 5,311,349 A | 5/1994 | Anderson et al. ........... 359/223 |
| 5,311,360 A | 5/1994 | Bloom et al. ............... 359/572 |
| 5,312,513 A | 5/1994 | Florence et al. ............ 156/643 |
| 5,313,479 A | 5/1994 | Florence ...................... 372/26 |
| 5,313,648 A | 5/1994 | Ehlig et al. ................. 395/800 |
| 5,313,835 A | 5/1994 | Dunn ........................... 73/505 |
| 5,315,418 A | 5/1994 | Sprague et al. ............... 359/41 |
| 5,315,423 A | 5/1994 | Hong ......................... 359/124 |
| 5,315,429 A | 5/1994 | Abramov |
| 5,319,214 A | 6/1994 | Gregory et al. ......... 250/504 R |
| 5,319,668 A | 6/1994 | Luecke ....................... 372/107 |
| 5,319,789 A | 6/1994 | Ehlig et al. ................. 395/800 |
| 5,319,792 A | 6/1994 | Ehlig et al. ................. 395/800 |
| 5,321,416 A | 6/1994 | Bassett et al. .................. 345/8 |
| 5,323,002 A | 6/1994 | Sampsell et al. ......... 250/252.1 |
| 5,323,051 A | 6/1994 | Adams et al. .............. 257/417 |
| 5,325,116 A | 6/1994 | Sampsell .................... 346/108 |
| 5,327,286 A | 7/1994 | Sampsell et al. ........... 359/561 |
| 5,329,289 A | 7/1994 | Sakamoto et al. .......... 345/126 |
| 5,330,301 A | 7/1994 | Brancher ................... 414/417 |
| 5,330,878 A | 7/1994 | Nelson ....................... 430/311 |
| 5,331,454 A | 7/1994 | Hornbeck .................. 359/224 |
| 5,334,991 A | 8/1994 | Wells et al. .................... 345/8 |
| 5,339,116 A | 8/1994 | Urbanus et al. ............. 348/716 |

| | | | | | | |
|---|---|---|---|---|---|---|
| 5,339,177 A | 8/1994 | Jenkins et al. ............... 359/35 | 5,457,567 A | 10/1995 | Shinohara .................. 359/305 |
| 5,340,772 A | 8/1994 | Rosotker ................... 437/226 | 5,458,716 A | 10/1995 | Alfaro et al. ............... 156/245 |
| 5,345,521 A | 9/1994 | McDonald et al. ........... 385/16 | 5,459,492 A | 10/1995 | Venkateswar ............... 347/253 |
| 5,347,321 A | 9/1994 | Gove ......................... 348/663 | 5,459,528 A | 10/1995 | Pettitt ........................ 348/568 |
| 5,347,378 A | 9/1994 | Handschy et al. ............ 359/53 | 5,459,592 A | 10/1995 | Shibatani et al. ............ 359/40 |
| 5,347,433 A | 9/1994 | Sedlmayr .................... 362/32 | 5,459,610 A | 10/1995 | Bloom et al. ............... 359/572 |
| 5,348,619 A | 9/1994 | Bohannon et al. .......... 156/664 | 5,461,197 A | 10/1995 | Hiruta et al. ............. 174/52.4 |
| 5,349,687 A | 9/1994 | Ehlig et al. ................. 395/800 | 5,461,410 A | 10/1995 | Venkateswar et al. ...... 347/240 |
| 5,351,052 A | 9/1994 | D'Hont et al. ............... 342/42 | 5,461,411 A | 10/1995 | Florence et al. ........... 347/240 |
| 5,352,926 A | 10/1994 | Andrews .................... 257/717 | 5,461,547 A | 10/1995 | Ciupke et al. ................ 362/31 |
| 5,354,416 A | 10/1994 | Okudaira et al. ........... 156/643 | 5,463,347 A | 10/1995 | Jones et al. ................. 330/253 |
| 5,357,369 A | 10/1994 | Pilling et al. ............... 359/462 | 5,463,497 A | 10/1995 | Muraki et al. ............... 359/618 |
| 5,357,803 A | 10/1994 | Lane ......................... 73/517 B | 5,465,175 A | 11/1995 | Woodgate et al. .......... 359/463 |
| 5,359,349 A | 10/1994 | Jambor et al. .............. 345/168 | 5,467,106 A | 11/1995 | Salomon ...................... 345/87 |
| 5,359,451 A | 10/1994 | Gelbart et al. .............. 359/285 | 5,467,138 A | 11/1995 | Gove ......................... 348/452 |
| 5,361,131 A | 11/1994 | Tekemori et al. ........... 356/355 | 5,467,146 A | 11/1995 | Huang et al. ............... 348/743 |
| 5,363,220 A | 11/1994 | Kuwayama et al. ........... 359/3 | 5,469,302 A | 11/1995 | Lim ............................ 359/846 |
| 5,365,283 A | 11/1994 | Doherty et al. ............. 348/743 | 5,471,341 A | 11/1995 | Warde et al. ............... 359/293 |
| 5,367,585 A | 11/1994 | Ghezzo et al. ................ 385/23 | 5,473,512 A | 12/1995 | Degani et al. .............. 361/760 |
| 5,370,742 A | 12/1994 | Mitchell et al. .............. 134/10 | 5,475,236 A | 12/1995 | Yoshizaki .................... 257/48 |
| 5,371,543 A | 12/1994 | Anderson ................... 348/270 | 5,480,839 A | 1/1996 | Ezawa et al. ............... 437/209 |
| 5,371,618 A | 12/1994 | Tai et al. ...................... 359/53 | 5,481,118 A | 1/1996 | Tew ............................ 250/551 |
| 5,377,705 A | 1/1995 | Smith, Jr. et al. .......... 134/95.3 | 5,481,133 A | 1/1996 | Hsu ............................ 257/621 |
| 5,382,961 A | 1/1995 | Gale, Jr. ...................... 345/108 | 5,482,564 A | 1/1996 | Douglas et al. ............. 134/1.2 |
| 5,387,924 A | 2/1995 | Gale, Jr. et al. ............ 345/108 | 5,482,818 A | 1/1996 | Nelson ....................... 430/394 |
| 5,389,182 A | 2/1995 | Mignardi .................... 156/344 | 5,483,307 A | 1/1996 | Anderson .................... 353/98 |
| 5,391,881 A | 2/1995 | Jeuch et al. ............ 250/370.09 | 5,485,172 A | 1/1996 | Sawachika et al. ............. 345/8 |
| 5,392,140 A | 2/1995 | Ezra et al. .................... 359/41 | 5,485,304 A | 1/1996 | Kaeriyama .................. 359/291 |
| 5,392,151 A | 2/1995 | Nelson ....................... 359/223 | 5,485,354 A | 1/1996 | Ciupke et al. ................ 362/31 |
| 5,394,303 A | 2/1995 | Yamaji ....................... 361/749 | 5,486,698 A | 1/1996 | Hanson et al. ............. 250/332 |
| 5,398,071 A | 3/1995 | Gove et al. ................. 348/558 | 5,486,841 A | 1/1996 | Hara et al. ..................... 345/8 |
| 5,399,898 A | 3/1995 | Rostoker .................... 257/499 | 5,486,946 A | 1/1996 | Jachimowicz et al. ...... 359/263 |
| 5,404,365 A | 4/1995 | Hiiro .......................... 372/27 | 5,488,431 A | 1/1996 | Gove et al. ................. 348/716 |
| 5,404,485 A | 4/1995 | Ban ........................... 395/425 | 5,489,952 A | 2/1996 | Gove et al. ................. 348/771 |
| 5,408,123 A | 4/1995 | Murai ........................ 257/531 | 5,490,009 A | 2/1996 | Venkateswar et al. ...... 359/291 |
| 5,410,315 A | 4/1995 | Huber ........................ 342/42 | 5,491,510 A | 2/1996 | Gove ........................... 348/77 |
| 5,411,769 A | 5/1995 | Hornbeck ................... 427/534 | 5,491,612 A | 2/1996 | Nicewarner, Jr. ........... 361/760 |
| 5,412,186 A | 5/1995 | Gale .......................... 219/679 | 5,491,715 A | 2/1996 | Flaxl .......................... 375/344 |
| 5,412,501 A | 5/1995 | Fisli .......................... 359/286 | 5,493,177 A | 2/1996 | Muller et al. ............... 313/578 |
| 5,418,584 A | 5/1995 | Larson ....................... 353/122 | 5,493,439 A | 2/1996 | Engle ......................... 359/292 |
| 5,420,655 A | 5/1995 | Shimizu ....................... 353/33 | 5,497,172 A | 3/1996 | Doherty et al. .............. 345/85 |
| 5,420,722 A | 5/1995 | Bielak ........................ 359/708 | 5,497,197 A | 3/1996 | Gove et al. ................. 348/388 |
| 5,426,072 A | 6/1995 | Finnila ....................... 437/208 | 5,497,262 A | 3/1996 | Kaeriyama .................. 359/223 |
| 5,427,975 A | 6/1995 | Sparks et al. ................ 437/79 | 5,499,060 A | 3/1996 | Gove et al. ................. 348/651 |
| 5,430,524 A | 7/1995 | Nelson ....................... 355/200 | 5,499,062 A | 3/1996 | Urbanus ..................... 348/771 |
| 5,435,876 A | 7/1995 | Alfaro et al. ............... 156/247 | 5,500,761 A | 3/1996 | Goossen et al. ............ 359/290 |
| 5,438,477 A | 8/1995 | Pasch ........................ 361/689 | 5,502,481 A | 3/1996 | Dentinger et al. ........... 348/51 |
| 5,439,731 A | 8/1995 | Li et al. ..................... 428/209 | 5,504,504 A | 4/1996 | Markandey et al. ........ 345/214 |
| 5,442,411 A | 8/1995 | Urbanus et al. ............. 348/771 | 5,504,514 A | 4/1996 | Nelson ....................... 347/130 |
| 5,442,414 A | 8/1995 | Janssen et al. ............. 353/98 | 5,504,575 A | 4/1996 | Stafford ..................... 356/330 |
| 5,444,566 A | 8/1995 | Gale et al. .................. 359/223 | 5,504,614 A | 4/1996 | Webb et al. ................. 359/223 |
| 5,445,559 A | 8/1995 | Gale et al. .................. 451/388 | 5,506,171 A | 4/1996 | Leonard et al. ............ 437/187 |
| 5,446,479 A | 8/1995 | Thompson et al. .......... 345/139 | 5,506,597 A | 4/1996 | Thompson et al. ........... 345/85 |
| 5,447,600 A | 9/1995 | Webb ............................ 216/2 | 5,506,720 A | 4/1996 | Yoon ......................... 359/224 |
| 5,448,314 A | 9/1995 | Heimbuch et al. ........... 348/743 | 5,508,558 A | 4/1996 | Robinette, Jr. et al. ...... 257/700 |
| 5,448,546 A | 9/1995 | Pauli ......................... 369/112 | 5,508,561 A | 4/1996 | Tago et al. .................. 257/737 |
| 5,450,088 A | 9/1995 | Meier et al. ................. 342/51 | 5,508,565 A | 4/1996 | Hatakeyama et al. ....... 257/777 |
| 5,450,219 A | 9/1995 | Gold et al. .................. 359/40 | 5,508,750 A | 4/1996 | Hewlett et al. ............. 348/558 |
| 5,451,103 A | 9/1995 | Hatanaka et al. ............ 353/31 | 5,508,840 A | 4/1996 | Vogel et al. ................. 359/291 |
| 5,452,024 A | 9/1995 | Sampsell .................... 348/755 | 5,508,841 A | 4/1996 | Lin et al. .................... 359/318 |
| 5,452,138 A | 9/1995 | Mignardi et al. ............ 359/855 | 5,510,758 A | 4/1996 | Fujita et al. ................. 333/247 |
| 5,453,747 A | 9/1995 | D'Hont et al. ............... 342/42 | 5,510,824 A | 4/1996 | Nelson ....................... 347/239 |
| 5,453,778 A | 9/1995 | Venkateswar et al. ...... 347/239 | 5,512,374 A | 4/1996 | Wallace et al. ............. 428/422 |
| 5,453,803 A | 9/1995 | Shapiro et al. ............. 353/119 | 5,512,748 A | 4/1996 | Hanson ....................... 250/332 |
| 5,454,160 A | 10/1995 | Nickel ......................... 29/840 | 5,515,076 A | 5/1996 | Thompson et al. .......... 345/139 |
| 5,454,906 A | 10/1995 | Baker et al. .................. 216/66 | 5,516,125 A | 5/1996 | McKenna ...................... 279/3 |
| 5,455,445 A | 10/1995 | Kurtz et al. ................. 257/419 | 5,517,340 A | 5/1996 | Doany et al. ................. 359/41 |
| 5,455,455 A | 10/1995 | Badehi ....................... 257/690 | 5,517,347 A | 5/1996 | Sampsell .................... 359/224 |
| 5,455,602 A | 10/1995 | Tew ........................... 347/239 | 5,517,357 A | 5/1996 | Shibayama .................. 359/547 |
| 5,457,493 A | 10/1995 | Leddy et al. ................ 348/164 | 5,517,359 A | 5/1996 | Gelbart ...................... 359/623 |
| 5,457,566 A | 10/1995 | Sampsell et al. ............ 359/292 | 5,519,251 A | 5/1996 | Sato et al. ................... 257/666 |

| Patent | Date | Inventor | Class |
|---|---|---|---|
| 5,519,450 A | 5/1996 | Urbanus et al. | 348/600 |
| 5,521,748 A | 5/1996 | Sarraf | 359/321 |
| 5,523,619 A | 6/1996 | McAllister et al. | 257/686 |
| 5,523,628 A | 6/1996 | Williams et al. | 257/777 |
| 5,523,803 A | 6/1996 | Urbanus et al. | 348/771 |
| 5,523,878 A | 6/1996 | Wallace et al. | 359/290 |
| 5,523,881 A | 6/1996 | Florence et al. | 359/561 |
| 5,523,920 A | 6/1996 | Machuga et al. | 361/767 |
| 5,524,155 A | 6/1996 | Weaver | 385/24 |
| 5,526,834 A | 6/1996 | Mielnik et al. | 134/105 |
| 5,534,107 A | 7/1996 | Gray et al. | 156/643.1 |
| 5,534,883 A | 7/1996 | Koh | 345/3 |
| 5,539,422 A | 7/1996 | Heacock et al. | 345/8 |
| 5,544,306 A | 8/1996 | Deering et al. | 395/164 |
| 5,554,304 A | 9/1996 | Suzuki | 216/2 |
| 5,576,878 A | 11/1996 | Henck | 359/224 |
| 5,602,671 A | 2/1997 | Hornbeck | 359/224 |
| 5,606,181 A | 2/1997 | Sakuma et al. | 257/88 |
| 5,606,447 A | 2/1997 | Asada et al. | 359/199 |
| 5,610,438 A | 3/1997 | Wallace et al. | 257/682 |
| 5,623,361 A | 4/1997 | Engle | 359/291 |
| 5,629,566 A | 5/1997 | Doi et al. | 257/789 |
| 5,629,801 A | 5/1997 | Staker et al. | 359/572 |
| 5,640,216 A | 6/1997 | Hasegawa et al. | 349/58 |
| 5,658,698 A | 8/1997 | Yagi et al. | 430/11 |
| 5,661,592 A | 8/1997 | Bornstein et al. | 359/291 |
| 5,661,593 A | 8/1997 | Engle | 359/292 |
| 5,663,817 A | 9/1997 | Frapin et al. | 349/5 |
| 5,668,611 A | 9/1997 | Ernstoff et al. | 348/771 |
| 5,673,139 A | 9/1997 | Johnson | 359/291 |
| 5,677,783 A | 10/1997 | Bloom et al. | 359/224 |
| 5,689,361 A | 11/1997 | Damen et al. | 359/284 |
| 5,691,836 A | 11/1997 | Clark | 359/247 |
| 5,694,740 A | 12/1997 | Martin et al. | 53/431 |
| 5,696,560 A | 12/1997 | Songer | 348/436 |
| 5,699,740 A | 12/1997 | Gelbart | 101/477 |
| 5,704,700 A | 1/1998 | Kappel et al. | 353/31 |
| 5,707,160 A | 1/1998 | Bowen | 400/472 |
| 5,712,649 A | 1/1998 | Tosaki | 345/8 |
| 5,713,652 A | 2/1998 | Zavracky et al. | 353/122 |
| 5,726,480 A | 3/1998 | Pister | 257/415 |
| 5,731,802 A | 3/1998 | Aras et al. | 345/148 |
| 5,734,224 A | 3/1998 | Tagawa et al. | 313/493 |
| 5,742,373 A | 4/1998 | Alvelda | 349/204 |
| 5,744,752 A | 4/1998 | McHerron et al. | 174/52.4 |
| 5,745,271 A | 4/1998 | Ford et al. | 359/130 |
| 5,757,354 A | 5/1998 | Kawamura | 345/126 |
| 5,757,536 A | 5/1998 | Ricco et al. | 359/224 |
| 5,764,280 A | 6/1998 | Bloom et al. | 348/53 |
| 5,768,009 A | 6/1998 | Little | 359/293 |
| 5,773,473 A | 6/1998 | Green et al. | 438/26 |
| 5,793,519 A | 8/1998 | Furlani et al. | 359/291 |
| 5,798,743 A | 8/1998 | Bloom | 345/90 |
| 5,798,805 A | 8/1998 | Ooi et al. | 349/10 |
| 5,801,074 A | 9/1998 | Kim et al. | 438/125 |
| 5,802,222 A | 9/1998 | Rasch et al. | 385/1 |
| 5,808,323 A | 9/1998 | Spaeth et al. | 257/88 |
| 5,808,797 A | 9/1998 | Bloom et al. | 359/572 |
| 5,815,126 A | 9/1998 | Fan et al. | 345/8 |
| 5,825,443 A | 10/1998 | Kawasaki et al. | 349/95 |
| 5,835,255 A | 11/1998 | Miles | 359/291 |
| 5,835,256 A | 11/1998 | Huibers | 359/291 |
| 5,837,562 A | 11/1998 | Cho | 438/51 |
| 5,841,579 A | 11/1998 | Bloom et al. | 359/572 |
| 5,844,711 A | 12/1998 | Long, Jr. | 359/291 |
| 5,847,859 A | 12/1998 | Murata | 359/201 |
| 5,862,164 A | 1/1999 | Hill | 372/27 |
| 5,868,854 A | 2/1999 | Kojima et al. | 134/1.3 |
| 5,886,675 A | 3/1999 | Aye et al. | 345/7 |
| 5,892,505 A | 4/1999 | Tropper | 345/208 |
| 5,895,233 A | 4/1999 | Higashi et al. | 438/107 |
| 5,898,515 A | 4/1999 | Furlani et al. | 359/290 |
| 5,903,243 A | 5/1999 | Jones | 345/7 |
| 5,903,395 A | 5/1999 | Rallison et al. | 359/630 |
| 5,904,737 A | 5/1999 | Preston et al. | 8/158 |
| 5,910,856 A | 6/1999 | Ghosh et al. | 359/291 |
| 5,912,094 A | 6/1999 | Aksyuk et al. | 430/5 |
| 5,912,608 A | 6/1999 | Asada | 335/222 |
| 5,914,801 A | 6/1999 | Dhuler et al. | 359/230 |
| 5,915,168 A | 6/1999 | Salatino et al. | 438/110 |
| 5,919,548 A | 7/1999 | Barron et al. | 428/138 |
| 5,920,411 A | 7/1999 | Duck et al. | 359/127 |
| 5,920,418 A | 7/1999 | Shiono et al. | 359/246 |
| 5,923,475 A | 7/1999 | Kurtz et al. | 359/619 |
| 5,926,309 A | 7/1999 | Little | 359/293 |
| 5,926,318 A | 7/1999 | Hebert | 359/618 |
| 5,942,791 A | 8/1999 | Shorrocks et al. | 257/522 |
| 5,949,390 A | 9/1999 | Nomura et al. | 345/32 |
| 5,949,570 A | 9/1999 | Shiono et al. | 359/291 |
| 5,953,161 A | 9/1999 | Troxell et al. | 359/618 |
| 5,955,771 A | 9/1999 | Kurtz et al. | 257/419 |
| 5,963,788 A | 10/1999 | Barron et al. | 438/48 |
| 5,978,127 A | 11/1999 | Berg | 359/279 |
| 5,982,553 A | 11/1999 | Bloom et al. | 359/627 |
| 5,986,634 A | 11/1999 | Alioshin | 345/126 |
| 5,986,796 A | 11/1999 | Miles | 359/260 |
| 5,995,303 A | 11/1999 | Honguh et al. | 359/708 |
| 5,999,319 A | 12/1999 | Castracane | 359/573 |
| 6,004,912 A | 12/1999 | Gudeman | 508/577 |
| 6,016,222 A | 1/2000 | Setani et al. | 359/571 |
| 6,025,859 A | 2/2000 | Ide et al. | 347/135 |
| 6,038,057 A | 3/2000 | Brazas, Jr. et al. | 359/291 |
| 6,040,748 A | 3/2000 | Gueissaz | 335/78 |
| 6,046,840 A | 4/2000 | Huibers | 359/291 |
| 6,055,090 A | 4/2000 | Miles | 359/291 |
| 6,057,520 A | 5/2000 | Goodwin-Johansson | 200/181 |
| 6,061,166 A | 5/2000 | Furlani et al. | 359/254 |
| 6,061,489 A | 5/2000 | Ezra et al. | 385/115 |
| 6,062,461 A | 5/2000 | Sparks et al. | 228/123.1 |
| 6,064,404 A | 5/2000 | Aras et al. | 345/507 |
| 6,069,392 A | 5/2000 | Tai et al. | 257/419 |
| 6,071,652 A | 6/2000 | Feldman et al. | 430/5 |
| 6,075,632 A | 6/2000 | Braun | 359/124 |
| 6,084,626 A | 7/2000 | Ramanujan et al. | 347/239 |
| 6,088,102 A | 7/2000 | Manhart | 356/354 |
| 6,090,717 A | 7/2000 | Powell et al. | 438/710 |
| 6,091,521 A | 7/2000 | Popovich | 359/15 |
| 6,096,576 A | 8/2000 | Corbin et al. | 438/108 |
| 6,097,352 A | 8/2000 | Zavracky et al. | 345/7 |
| 6,101,036 A | 8/2000 | Bloom | 359/567 |
| 6,115,168 A * | 9/2000 | Zhao et al. | 359/247 |
| 6,122,299 A | 9/2000 | DeMars et al. | 372/20 |
| 6,123,985 A | 9/2000 | Robinson et al. | 427/162 |
| 6,124,145 A | 9/2000 | Stemme et al. | 438/26 |
| 6,130,770 A | 10/2000 | Bloom | 359/224 |
| 6,144,481 A | 11/2000 | Kowarz et al. | 359/291 |
| 6,147,789 A | 11/2000 | Gelbart | 359/231 |
| 6,154,259 A | 11/2000 | Hargis et al. | 348/756 |
| 6,154,305 A | 11/2000 | Dickensheets et al. | |
| 6,163,026 A | 12/2000 | Bawolek et al. | 250/351 |
| 6,163,402 A | 12/2000 | Chou et al. | 359/443 |
| 6,169,624 B1 | 1/2001 | Godil et al. | 359/237 |
| 6,172,796 B1 | 1/2001 | Kowarz et al. | 359/290 |
| 6,172,797 B1 | 1/2001 | Huibers | 359/291 |
| 6,177,980 B1 | 1/2001 | Johnson | 355/67 |
| 6,181,458 B1 | 1/2001 | Brazas, Jr. et al. | 359/290 |
| 6,188,519 B1 | 2/2001 | Johnson | 359/572 |
| 6,195,196 B1 | 2/2001 | Kimura et al. | 359/295 |
| 6,197,610 B1 | 3/2001 | Toda | 438/50 |
| 6,210,988 B1 | 4/2001 | Howe et al. | 438/50 |
| 6,215,579 B1 | 4/2001 | Bloom et al. | 359/298 |
| 6,219,015 B1 | 4/2001 | Bloom et al. | 345/87 |

| | | | | |
|---|---|---|---|---|
| 6,222,954 B1 | 4/2001 | Riza ............................ 385/18 | EP | 0 654 777 A1 | 5/1995 | ............ G09G/3/34 |
| 6,229,650 B1 | 5/2001 | Reznichenko et al. ....... 359/566 | EP | 0 658 868 A1 | 6/1995 | ............ G09G/3/34 |
| 6,229,683 B1 | 5/2001 | Goodwin-Johansson .... 361/233 | EP | 0 658 830 A1 | 12/1995 | ............ G09G/3/34 |
| 6,241,143 B1 | 6/2001 | Kuroda ..................... 228/110.1 | EP | 0 689 078 A1 | 12/1995 | ............ G02B/26/08 |
| 6,251,842 B1 | 6/2001 | Gudeman .................. 508/577 | EP | 0 801 319 A1 | 10/1997 | ............ G02B/26/00 |
| 6,252,697 B1 | 6/2001 | Hawkins et al. ............. 359/290 | EP | 0 851 492 A2 | 7/1998 | ......... H01L/23/538 |
| 6,254,792 B1 | 7/2001 | Van Buskirk et al. ........ 216/13 | EP | 1 003 071 A2 | 5/2000 | ............ G03B/27/72 |
| 6,261,494 B1 | 7/2001 | Zavracky et al. ........... 264/104 | EP | 1 014 143 A1 | 6/2000 | ............ G02B/26/08 |
| 6,268,952 B1 | 7/2001 | Godil et al. ................. 359/291 | EP | 1 040 927 A2 | 10/2000 | ............ B41J/2/455 |
| 6,271,145 B1 | 8/2001 | Toda .......................... 438/706 | GB | 2 117 564 A | 10/1983 | ............ H01L/25/08 |
| 6,271,808 B1 | 8/2001 | Corbin .......................... 345/7 | GB | 2 118 365 A | 10/1983 | ............ H01L/27/13 |
| 6,274,469 B1 | 8/2001 | Yu ............................. 438/592 | GB | 2 266 385 A | 10/1993 | ............ G02B/23/10 |
| 6,286,231 B1 | 9/2001 | Bergman et al. .............. 34/410 | GB | 2 296 152 A | 6/1996 | ............ H04N/13/04 |
| 6,290,859 B1 | 9/2001 | Fleming et al. ................ 216/2 | GB | 2 319 424 A | 5/1998 | ............ H04N/13/04 |
| 6,290,864 B1 | 9/2001 | Patel et al. .................... 216/79 | JP | 53-39068 | 4/1978 | ............ H01L/23/12 |
| 6,300,148 B1 | 10/2001 | Birdsley et al. ............... 438/15 | JP | 55-111151 | 8/1980 | ............ H01L/27/00 |
| 6,303,986 B1 | 10/2001 | Shook ......................... 257/680 | JP | 57-31166 | 2/1982 | ............ H01L/23/48 |
| 6,310,018 B1 | 10/2001 | Behr et al. ................... 510/175 | JP | 57-210638 | 12/1982 | ............ H01L/21/60 |
| 6,323,984 B1 | 11/2001 | Trisnadi ..................... 359/245 | JP | 60-49638 | 3/1985 | ............ H01L/21/60 |
| 6,327,071 B1 | 12/2001 | Kimura ...................... 359/291 | JP | 60-94756 | 5/1985 | ............ H01L/25/04 |
| 6,342,960 B1 | 1/2002 | McCullough ............... 359/124 | JP | 60-250639 | 12/1985 | ............ H01L/21/58 |
| 6,356,577 B1 | 3/2002 | Miller ........................ 372/107 | JP | 61-142750 | 6/1986 | ............ H01L/21/60 |
| 6,356,689 B1 | 3/2002 | Greywall ..................... 385/52 | JP | 61-145838 | 7/1986 | ............ H01L/21/60 |
| 6,359,333 B1 | 3/2002 | Wood et al. ................. 257/704 | JP | 63-234767 | 9/1988 | ............ H04N/1/04 |
| 6,384,959 B1 | 5/2002 | Furlani et al. ............... 359/291 | JP | 63-305323 | 12/1988 | ............ G02F/1/13 |
| 6,387,723 B1 | 5/2002 | Payne et al. .................. 438/48 | JP | 1-155637 | 6/1989 | ............ H01L/21/66 |
| 6,392,309 B1 | 5/2002 | Wataya et al. .............. 257/796 | JP | 40-1155637 | 6/1989 | ............ H01L/21/92 |
| 6,396,789 B1 | 5/2002 | Guerra et al. ............... 369/112 | JP | 2219092 | 8/1990 | ............ G09G/3/28 |
| 6,421,179 B1 | 7/2002 | Gutin et al. ................. 359/572 | JP | 4-333015 | 11/1992 | ............ G02B/27/18 |
| 6,438,954 B1 | 8/2002 | Goetz et al. | JP | 7-281161 | 10/1995 | ......... G02F/1/1333 |
| 6,445,502 B1 | 9/2002 | Islam et al. ................. 359/571 | JP | 3288369 | 3/2002 | ............ G02B/26/06 |
| 6,452,260 B1 | 9/2002 | Corbin et al. ............... 257/686 | WO | WO 90/13913 | 11/1990 | ............ H01L/23/10 |
| 6,466,354 B1 | 10/2002 | Gudeman ................... 359/247 | WO | WO 92/12506 | 7/1992 | ............ G09F/9/37 |
| 6,480,634 B1 | 11/2002 | Corrigan ........................ 385/4 | WO | WO 93/02269 | 2/1993 | ............ E06B/5/10 |
| 6,497,490 B1 | 12/2002 | Miller et al. ................. 359/614 | WO | WO 93/09472 | 5/1993 | ............ G03F/7/20 |
| 6,525,863 B1 | 2/2003 | Riza ........................... 359/290 | WO | WO 93/18428 | 9/1993 | ............ G02B/27/00 |
| 6,563,974 B2 | 5/2003 | Riza ............................. 385/18 | WO | WO 93/22694 | 11/1993 | ............ G02B/5/18 |
| 6,565,222 B1 | 5/2003 | Ishii et al. ................... 359/883 | WO | WO 94/09473 | 4/1994 | ............ G09G/3/34 |
| 2001/0019454 A1 | 9/2001 | Tadic-Galeb et al. ....... 359/649 | WO | WO 94/29761 | 12/1994 | ............ G02B/27/24 |
| 2002/0015230 A1 | 2/2002 | Pilossof et al. .............. 359/558 | WO | WO 95/11473 | 4/1995 | ............ G02B/27/00 |
| 2002/0021485 A1 | 2/2002 | Pilossof ...................... 359/295 | WO | WO 96/02941 | 2/1996 | ............ H01L/23/02 |
| 2002/0079432 A1 | 6/2002 | Lee et al. ..................... 250/216 | WO | WO 96/08031 | 3/1996 | ............ H01J/29/12 |
| 2002/0105725 A1 | 8/2002 | Sweatt et al. ................ 359/566 | WO | WO 96/41217 | 12/1996 | ............ G02B/5/18 |
| 2002/0112746 A1 | 8/2002 | DeYoung et al. ............. 134/36 | WO | WO 96/41224 | 12/1996 | ............ G02B/19/00 |
| 2002/0131230 A1 | 9/2002 | Potter ......................... 361/277 | WO | WO 97/22033 | 6/1997 | ............ G02B/27/22 |
| | | | WO | WO 97/26569 | 7/1997 | ............ G02B/5/18 |
| | FOREIGN PATENT DOCUMENTS | | WO | WO 98/05935 | 2/1998 | ............ G01L/9/06 |
| DE | 197 23 618 A1 | 12/1997 | ............ G03F/1/14 | WO | WO 98/24240 | 6/1998 | ............ H04N/9/31 |
| DE | 197 51 716 A1 | 5/1998 | ............ G02B/27/14 | WO | WO 98/41893 | 9/1998 | ............ G02B/26/08 |
| DE | 198 46 532 C1 | 5/2000 | ............ G02B/27/09 | WO | WO 99/07146 | 2/1999 | ............ H04N/7/16 |
| EP | 0 089 044 A2 | 9/1983 | ............ H01L/23/10 | WO | WO 99/12208 | 3/1999 | ............ H01L/25/065 |
| EP | 0 261 901 A2 | 3/1988 | ............ G09G/3/36 | WO | WO 99/23520 | 5/1999 | ............ G02B/26/08 |
| EP | 0 314 437 A1 | 10/1988 | ............ H01L/25/08 | WO | WO 99/34484 | 7/1999 | |
| EP | 0 304 263 A2 | 2/1989 | ......... H01L/25/065 | WO | WO 99/59335 | 11/1999 | ............ H04N/5/765 |
| EP | 0 306 308 A2 | 3/1989 | ............ H04N/3/14 | WO | WO 99/63388 | 12/1999 | ............ G02B/27/22 |
| EP | 0 322 714 A2 | 7/1989 | ............ G02B/5/30 | WO | WO 99/67671 | 12/1999 | ............ G02B/26/08 |
| EP | 0 627 644 A3 | 9/1990 | ............ G02B/27/00 | WO | WO 00/04718 | 1/2000 | ............ H04N/7/167 |
| EP | 0 417 039 A1 | 3/1991 | ............ G03B/21/20 | WO | WO 00/07225 | 2/2000 | ............ H01L/21/00 |
| EP | 0 423 513 A2 | 4/1991 | ............ H01S/3/085 | WO | WO 01/04674 A1 * | 1/2001 | ............ G02B/6/12 |
| EP | 0 436 738 A1 | 7/1991 | ............ H04N/5/74 | WO | WO 01/006297 A3 | 1/2001 | ............ G02B/27/10 |
| EP | 0 458 316 A2 | 11/1991 | ............ G06K/11/06 | WO | WO 01/57581 A3 | 8/2001 | ............ G02B/27/48 |
| EP | 0 477 566 A2 | 4/1992 | ............ G02B/26/08 | WO | WO 02/025348 A3 | 3/2002 | ............ G02B/27/02 |
| EP | 0 488 326 A3 | 6/1992 | ............ G09G/3/28 | WO | WO 02/31575 A2 | 4/2002 | ............ G02B/27/00 |
| EP | 0 499 566 A2 | 8/1992 | ............ G06F/3/033 | WO | WO 02/058111 A2 | 7/2002 | |
| EP | 0 528 646 A1 | 2/1993 | ............ G09G/3/02 | WO | WO 02/065184 A3 | 8/2002 | ............ G02B/27/12 |
| EP | 0 530 760 A2 | 3/1993 | ............ G09G/3/34 | WO | WO 02/073286 A2 | 9/2002 | ............ G02B/26/08 |
| EP | 0 550 189 A1 | 7/1993 | ............ G02F/1/315 | WO | WO 02/084375 A1 | 10/2002 | ............ G02B/26/08 |
| EP | 0 610 665 A1 | 8/1994 | ............ G09G/3/34 | WO | WO 02/084397 A3 | 10/2002 | ............ G02B/27/18 |
| EP | 0 627 644 A2 | 12/1994 | ............ G02B/27/00 | WO | WO 03/001281 A1 | 1/2003 | ............ G02F/1/01 |
| EP | 0 627 850 A1 | 12/1994 | ............ H04N/5/64 | WO | WO 03/001716 A1 | 1/2003 | ............ H04J/14/02 |
| EP | 0 643 314 A2 | 3/1995 | ............ G02B/27/00 | WO | WO 03/012523 A1 | 2/2003 | ............ G02B/26/00 |

| | | | | |
|---|---|---|---|---|
| WO | WO 03/016965 A1 | 2/2003 | ............ | G02B/5/18 |
| WO | WO 03/023849 A1 | 3/2003 | ........... | H01L/23/02 |
| WO | WO 03/025628 A2 | 3/2003 | | |

OTHER PUBLICATIONS

J. Neff, "Two–Dimensional Spatial Light Modulators: A Tutorial", Proceedings of the IEEE, vol. 78, No. 5 (May 1990), pp. 826–855.

R. Gerhard–Multhaupt, "Viscoelastic Spatial Light Modulators and Schlieren–Optical Systems for HDTV Projection Displays" SPIE vol. 1255 Large Screen Projection Displays 11 (1990), pp. 69–78.

R. Gerhard–Multhaupt, "Light–Valve Technologies for High–Definition Television Projection Displays", Displays vol. 12, No. 3/4 (1991), pp. 115–128.

O. Solgaard, F. Sandejas, and D. Bloom, "Deformable Grating Optical Modulator," Optics Letters, vol. 17, No. 9, May 1, 1992, New York, USA, pp. 688–690.

F. Sandejas R. Apte, W. Banyai, and D. Bloom, "Surface Microfabrication of Deformable Grating Valve for High Resolution Displays," The 7th International Conference on Solid–State Sensors and Actuators.

P. Alvelda, "High–Efficiency Color Microdisplays," SID 95 Digest, pp. 307–311, 1995.

Worboys et al., "Miniature Display Technology for Integrated Helmut Systems," GEC Journal of Research, vol. 10, No. 2, pp. 111–118, Chelmsford, Essex, GB 1993.

M. Farn et al., "Color Separation by use of Binary Optics," Optics Letters, vol. 18:15 pp. 1214–1216, 1993.

P. Alvelda, "VLSI Microdisplays and Optoelectric Technology," MIT, pp. 1–93, 1995.

P. Alvelda, "VLSI Microdisplay Technology," Oct. 14, 1994.

D. Rowe, "Laser Beam Scanning," SPIE, vol. 2088, Oct. 5, 1993, 18–26.

L. Hornbeck, "Deformable–Mirror Spatial Light Modulators," Spatial Light Modulators and Applications III, Aug. 8, CA 1989, pp. 86–102.

Russick et al., "Supercritical Carbon Dioxide Extraction of Solvent from Micromachined Structures," Supercritical Fluids, Chapter 18, American Chemical Society, pp 255–269, 1997.

Buhler et al., "Linear Array of Complementary Metal Oxide Semiconductor Double–Pass Metal Micromirrors," Optical Engineering, vol. 36, No. 5, pp 1391–1398, May 1997.

Gani et al., "Variable Gratings for Optical Switching: Rigorous Electromagnetic Simulation and Design," Optical Engineering, vol. 38, No. 3, pp 552–557, Mar. 1999.

R. Tepe, et al. "Viscoelastic Spatial Light Modulator with Active Matrix Addressing," Applied Optics, vol. 28, No. 22, New York, USA, pp. 4826–4834, Nov. 15, 1989.

W. Brinker, et al., "Deformation Behavior of Thin Viscoelastic Layers Used in an Active–Matrix–Addressed Spatial Light Modulator," SPIE vol. 1018, pp. 79–85, Germany, 1988.

T. Utsunomiya and H. Sato, "Electrically Deformable Echellette Grating and its Application to Tunable Laser Resonator," Electronics and Communications in Japan, vol. 63–c, No. 10, pp. 94–100, Japan, 1980.

R.N. Thomas, et al., "The Mirror–Matrix Tube: A Novel Light Valve for Projection Displays", IEEE Transactions on Electron Devices, vol. ED–22, No. 9, pp. 765–775, Sep. 1975.

J. Guldberg, et al., "An Aluminum/SiO2/Silicon–on–Sapphire Light Valve Matrix for Projection Displays," Applied Physics Letters, vol. 26, No. 7, pp. 391–393, Apr. 1975.

"Kitchen Computer", IBM Technical Disclosure Bulletin, vol. 37, No. 12, pp. 223–225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long–Haul WDM Communication Systems" IEEE Photonics Technology Letters, vol. 9, No. 3, Mar. 1997.pp. 377 of 379.

N. J. Frigo et al., "A Wavelength–Division Multiplexed Passive Optical Network with Cost–Shared Components", IEEE Photonics Technology Letters, vol. 6, No. 11, Nov. 1994, pp. 1365 of 1367.

M. S. Goodman et al., "The LAMBDANET Multiwavelength Network: Architecture, Applications, and Demostrations", IEEE Journal on Selected Areas in Communications, vol. 8, No. 6, Aug. 1990, pp. 995 of 1004.

C. A. Turkatte, "Examining the Benefits of Tunable Lasers for Provisioning Bandwidth on Demand", EuroForum— Optical Components, Feb. 2001, pp. 1 of 10.

R. Plastow, "Tunable Lasers and Future Optical Networks", Forum—Tunable Laser, Aug. 2000, pp. 58 of 62.

Elizabeth Bruce, "Tunable Lasers", Communications, IEEE Spectrum, Feb. 2002, pp. 35 of 39.

M. G. Littman et al., "Spectrally Narrow Pulsed Dye Laser without Beam Expander", Applied Optics, vol. 17, No. 14, Jul. 15, 1978, pp. 2224 of 2227.

Development of Digital MEMS–Based Display Technology Promises Improved Resolution, Contrast, and Speed, XP–000730009, 1997, pp. 33 of 34.

S.T. Pai, et al., "Electromigration in Metals", Received Jun. 4, 1976, p. 103–115.

Olga B. Spahn, et al., "High Optical Power Handling of Pop–Up Microelectromechanical Mirrors", Sandia National Laboratories, IEEE 2000, p. 51–52.

David M. Burns, et al. "Optical Power Induced Damage to Microelectromechanical Mirrors", Sensors and Actuators A 70, 1998, p. 6–14.

V.S. Aliev et al., "Development of Si(100) surface roughness at the initial stage of etching in F2 and XeF2 gases: ellipsometric study," Surface Science 442 (1999), pp. 206–214.

Xuan–Qi Wang et al., "Gas–Phase Silicon Etching with Bromine Trifluoride," Depart. of Electrical Engineering, 136–93 California Institute of Technology, 1997 IEEE, pp. 1505–1508.

Harold F. Winters, "Etch products from the reaction of XeF2 with SiO2, Si3N4, SiC, and Si in the presence of Ion Bombardment," IBM Research Laboratory, 1983 American Vacuum Society, pp. 927–931.

F.A. Houle, "Dynamics of SiF4 desorption during etching of silicon by XeF2," J. Chem. Phys. 87 (3), Aug. 1, 1987, pp. 1866–1872.

Mehran Mehregany, "Microelectromechanical Systems," 1993 IEEE, pp. 14–22.

D. Moser et al., "A CMOS Compatible Thermally Excited Silicon Oxide Beam Resonator with Aluminium Mirror," Physical Electronics Laboratory, 1991 IEEE, pp. 547–550.

M. Parameswaran et al., "Commerical CMOS Fabricated Integrated Dynamic Thermal Scene Simulator," 1991 IEEE, pp. 29.4.1–29.4.4.

M. Parameswaran et al., "CMOS Electrothermal Microactuators," Depart. of Electrical Engineering, 1990 IEEE, pp. 128–131.

U. Streller et al., "Selectivity in dry etching of Si(100) with XeF2 and VUV light," Applied Surface Science 106, (1996), pp. 341–346.

M.J.M Vugts et al., "Si/XeF2 etching: Temperature dependence," 1996 American Vacuum Society, pp. 2766–2774.

P. Krummenacher et al., "Smart Temperature Sensor in CMOS Technology," Sensors and Actuators, A–21–A–23 (1990), pp. 636–638.

Henry Baltes, "CMOS as sensor technology," Sensors and Actuators A. 37–38, (1993), pp. 51–56.

Thomas Boltshauser et al., "Piezoresistive Membrane Hygrometers Based on IC Technology," Sensor and Materials, 5, 3, (1993), pp. 125–134.

Z. Parpia et al., "Modelling of CMOS Compatible High Voltage Device Structures," pp. 41–50.

Jon Gildemeister, "Xenon Difluoride Etching System," 1997, UC Berkeley MicroTabrication Manual Chapter 7.15, pp. 2–5.

W. Riethmuller et al., "A smart accelerometer with on–chip electronics fabricated by a commercial CMOS process," Sensors and Actuators A. 31, (1992), 121–124.

W. Gopel et al., "Sensors– A Comprehensive Survey," vol. 7, Weinheim New York, 44 pgs.

D. E. Ibbotson et al., "Comparison of XeF2 and F–atom reations with Si and SiO2," 1984 American Institute of Physics, pp. 1129–1131.

D. E. Ibbotson et al., "Plasmaless dry etching of silicon with fluorine–containing compounds," 1984 American Institute of Physics, pp. 2939–2942.

M.H. Hecht et al., "A novel x–ray photoelectron spectroscopy study of the AI/SiO2 interfaces," 1985 American Institute of Physics, pp. 5256–52616.

Daniel L. Flamm et al., "XeF2 and F–Atom Reactions with Si: Their Significance for Plasma Etching,," Solid State Technology, V. 26, #4, 4/83, pp. 117–121.

H.F. Winters et al., "The etching of silicon with XeF2 vapor," Appl. Phys. Lett. vol. 34, No. 1, Jan. 1979, pp. 70–73.

Wayne Bailey et al., "Microelectronic Structures and Microelectromechanical Devices for Optical Processing and Multimedia Applications," SPIE—The International Society for Optical Engineering, vol. 2641, Oct. 1995, 13 pgs.

J. Marshall et al., "Realizing Suspended Structures on Chips Fabricated by CMOS Foundry Processes Through the MOSIS Service," National Inst. of Standards and Technology, Jun. 1994, 63 pgs.

David Moser et al., "CMOS Flow Sensors," 1993 Physical Electronics Lab, Swiss Federal Institute of Tech, Zurich, Switzerland, 195 pgs.

E. Hecht, "Optics", Addison–Wesley, $2^{nd}$ edition, 1987, Adelphi University, pp. 163–169.

E. Hecht, "Optics", Addison–Wesley, $2^{nd}$ edition, 1987, Adelphi University, pp. 358–360.

T. Glaser et al., "Beam switching with binary single–order diffractive grating", XP–000802142, Optics Letters, Dec. 15, 1998, vol. 23, No. 24, pp. 1933 of 1935.

P. C. Kundu et al., "Reduction of Speckle Noise by Varying the Polarisation of Illuminating Beam", XP–002183475, Dept. of Applied Physics, Calcutta University, 1975, pp. 63–67.

J. W. Goodman, "Some Fundamental Properties of Speckle", XP–002181682, Dept. of Electrical Engineering, Stanford University, 1976, pp. 1146–1150.

Lingli Wang et al., "Speckle Reduction in Laser Projection Systems by Diffractive Optical Elements", XP–000754330, Applied Optics, Apr. 1, 1998, vol. 37, No. 10, pp. 1770–1775.

R.W. Corrigan et al., "Calibration of a Scanned Linear Grating Light–Valve, Projection System for E–Cinema Applications", Silicon Light Machines, SID'99, San Jose, CA, 27 pgs, 1999.

R.W. Corrigan et al., "Calibration of a Scanned Linear Grating Light–Valve, Projection System", Silicon Light Machines, San Jose, CA, 4 pgs, May 18, 1999.

"Introduction to Cryptograghy", http://www.ssh.fi/tech/crpto/into.html, 35 pgs, Jun. 21, 1999.

"Deep Sky Black," Equinox Interscience, www.eisci.com/deepsky.html, 1997.

"Absorptive Neutral Density Filters," Newport Corp., Irvine, CA, www.newport.com, May 7, 1999.

"High Energy Variable Attenuators," Newport Corp., Irvine, CA, www.newport.com, May 7, 1999.

"Neutral–Density Filters," New Focus, Inc., Santa Clara, CA, www.newfocus.com, May 7, 1999.

J. Hawkes et al., "Laser Theory and Practice," Prentice Hall, New York, 1995, pp. 407–408.

C. Tew et al., "Electronic Control of a Digital Micromirror Device for Projection Displays", Proceedings of the 1994 IEEE International Solid–State Circuits Conference, 1994.

Henck, S.A., "Lubrication of Digital Mircomirror Devices™", Tribology Letters, No. 3, pp. 239–247, 1997.

K. W. Goossen et al., "Silicon Modulator Based on Mechanically–Active Anti–Reflection Layer with 1 Mbit/sec Capability for Fiber–in–the–Loop Applications", IEEE Protonics Technology Letters, vol. 6, No. 9, Sep. 1994, pp. 1119–1121.

J. A. Walker et al., "Demonstration of a Gain Flattened Optical Amplifer with Micromechanical Equalizer Element", Lucent Technologies, pp. 13–14.

A. P. Payne et al., "Resonance Measurements of Stresses in $Al/Si_3N_4$ Micro–Ribbons", Silicon Light Machines, Sep. 22, 1999, 11 pgs.

M. W. Miles, "A New Reflective FPD Technology Using Interferometric Modulation", 4 pgs.

N. A. Riza et al., "Digitally Controlled Fault–Tolerant Multiwavelength Programmable Fiber–Optic Attenuator Using a Two–Dimensional Digital Micromirror Device", Optics Letters, Mar. 1, 1999, vol. 24, No. 5, pp. 282–284.

N. A. Riza et al., "Synchronous Amplitude and Time Control for an Optimum Dynamic Range Variable Photonic Delay Line", Applied Optics, Apr. 10, 1999, vol. 38, No. 11, pp. 2309–2318.

P. Alvelda et al., "44.4: Ferroelectric Microdisplays Using Distortion–Compensated Pixel Layouts", SID 95 Digest, XP 2020715, pp. 931–933.

"Micromachined Opto/Electro/Mechanical Systems," Electronic Systems, NASA Tech Briefs, Mar. 1997, pp. 50 & 52.

David M. Burns et al., "Development of Microelectromechanical Variable Blaze Gratings," Sensors and Actuators A 64 (1998), pp. 7–15.

Apte et al., "Deformable Grating Light Valves for High Resolution Displays," Solid State Actuator Workshop, Hilton Head, South Carolina, Jun. 13–16, 1994.

Sene et al., "Polysilicon micromechanical gratings for optical modulation," Sensors and Actuators, vol. A57, pp. 145–151, 1996.

Amm et al., "*Invited Paper*: Grating Light Valve™ Technology: Update and Novel Applications," SID Digest, vol. 29, 1998.

* cited by examiner

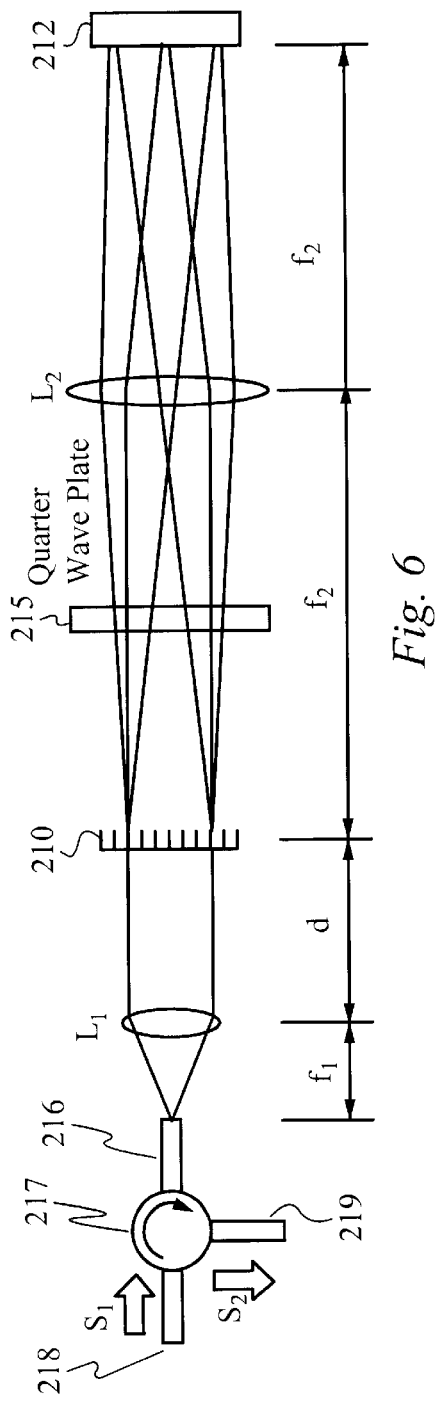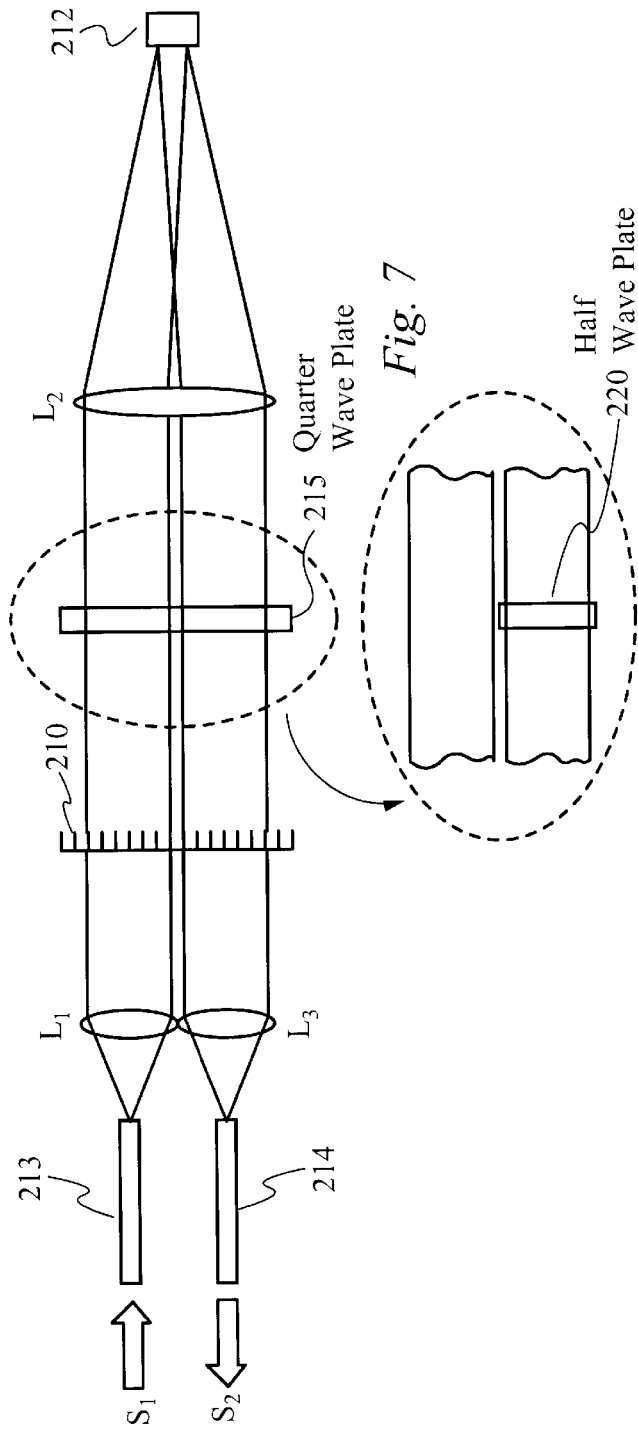
Fig. 6
Fig. 7

Diffraction Using "Fine Grating" GLV

METHOD AND APPARATUS FOR DYNAMIC EQUALIZATION IN WAVELENGTH DIVISION MULTIPLEXING

RELATED APPLICATIONS

The present application claims priority of the Provisional U.S. Patent Application No. 60/301,106 filed Jun. 25, 2001 and entitled "Grating Light Valve (GLV) Based Channel Equalizer For D/WDM Applications." The Provisional U.S. Patent Application No. 60/301,106 filed Jun. 25, 2001 and entitled "Grating Light Valve (GLV) Based Channel Equalizer For D/WDM Applications" is herein incorporated by reference. The present application also claims priority of the Provisional U.S. Patent Application No. 60/328,586 filed on Oct. 9, 2001 and entitled "A GRATING LIGHT VALVE (GLV) BASED DYNAMIC GAIN EQUALIZER" The Provisional U.S. Patent Application No. 60/328,586 filed on Oct. 9, 2001 and entitled "A GRATING LIGHT VALVE (GLV) BASED DYNAMIC GAIN EQUALIZER" is herein incorporated by reference.

BACKGROUND OF THE INVENTION

1. Field of the Invention

The present invention relates to the field of signal equalization within wavelength division multiplexed optical transmission networks. More particularly, the present invention relates to the use of diffractive light modulators for signal equalization of component signals within wavelength division multiplexed optical fiber networks.

2. Background of the Invention

Increasingly, data transmitted through the telecommunications network is shifting from an electrical data transmission to optical data transmission. Design parameters for fiber optical networks seek to create an architecture which allows the highest number of bits per second in transmission, while simultaneously reducing costs by developing a system that affords the greatest distance between repeaters, and maintaining system reliability where transmission errors are held to an acceptably low level. These three operational characteristics are oftentimes adverse to each other. Signal strength, that is, the power of the signal, attenuates during transmission, and the greater the transmission distance, the greater the attenuation. As signal strength decreases, the signal to noise ratio decreases. The bit error rate increases exponentially as the signal to noise ratio decreases. The need for repeaters is therefore governed largely because of line loss or attenuation of an optical signal through an optical medium. At some critical point in attenuation, a signal under transmission will become be too weak to reproduce reliably, and the bit error rate will climb to unacceptable levels. Accordingly, a lower threshold for signal strength is established as a system parameter of an optical network to ensure system reliability. To operate within such a parameter, the system must be designed to prevent a signal from falling below the lower threshold. Typically, signal attenuation is measured in dB per km. Accordingly, repeaters must be spaced close enough together that a signal has not attenuated below the lower threshold by the time it reaches the next repeater, at which point it is either amplified, or processed in some other manner for re-transmission. Because it is economically dis-advantageous to have repeaters spaced more closely together than necessary, repeaters are typically placed near the maximum distance at which a signal can be reliably received and processed for accurate reconstruction.

In endeavoring to maximize the distance between repeaters, an increase in the power of a signal will therefore increase the distance that a signal may reliably travel before falling below the lower threshold. It is easily understood, however, that there is an upper limit of allowable power when transmitting a signal across an optical network. Above that upper limit, an increase in signal strength is at best superfluous, and at worst, maintenance intensive, economically prohibitive or even deleterious to the integrity of the optical network. The upper threshold of signal transmission power is therefore another operational parameter for a fiber optical network.

Analog and digital communication have long used frequency/wavelength multiplexing as one means of achieving greater bandwidth. Through multiplexing, discrete signals defined by distinct wavelengths are transmitted across the same medium. Each discrete signal is typically assigned to carry specific information. Signal attenuation within a fiber network, however, is oftentimes frequency or wavelength dependent. Accordingly, the rate of attenuation, commonly measured in dB/km can vary among different wavelengths within a fixed optical spectrum. Consequently, the wavelength distinguished by the highest rate of attenuation will typically govern fundamental network parameters such as the maximum distance between repeaters. One result of differing rates of attenuation, therefore, is that different wavelengths transmitted at a same power will be at different power levels upon reaching a repeater or other processing station. In addition, the routing and switching of signals within a metropolitan network has the capacity to combine signals of disparate power levels. Moreover, there is unevenness in the multiplexing and demultiplexing components, unequal gain over different wavelengths in erbium doped fiber amplifiers (EDFAs), unequal laser launch power for the different channels, etc. All of these features exacerbate the uneven power levels of different wavelengths during the transmission, re-transmission, routing and processing of an optical signal.

FIG. 1 illustrates a spectrum made up of many discrete wavelengths, from a first wavelength $\lambda_1$ up to an $n^{th}$ wavelength $\lambda_n$, which form component signals within a collective wavelength multiplexed signal within an optical medium. The Y-axis represents signal power, and the X-axis represents a spectrum of wavelengths. It is commonly understood by those skilled in the art that wavelength and frequency are inversely proportional. These terms may therefore be used interchangeably throughout to distinguish component signals. Moving along the X-axis is therefore equally understood to represent a spectrum of frequencies. The lower signal threshold 124 is the lowest signal power level to which a signal may attenuate and remain reliably processable according to system requirements. The "saturation threshold" 120 is the maximum allowable signal power of the network for any one wavelength. Between these two levels, a reference power level 122 is illustrated throughout FIGS. 1, 2 and 4 for comparative purposes only. For illustrative purposes, it is assumed that all of the component wavelengths or frequencies depicted in FIG. 1 began at equal signal strength, and have attenuated to the levels seen in FIG. 1 during launch, transmission, routing or other processing within a fiber optical network. As seen in FIG. 1, the signals can be at different strengths. The third wavelength $\lambda_3$ is seen to be quite robust, remaining above the reference level 122. Contrariwise, the fourth wavelength $\lambda_4$ is seen to have attenuated to a signal strength substantially below the reference level 122.

FIGS. 2 and 3 show the signals of FIG. 1 after each component wavelength has been uniformly amplified. Because the third wavelength $\lambda_3$ was the strongest signal prior to amplification, it remains the strongest signal after amplification. Plotting uniformly amplified signals, the relationship in signal strength is therefore unchanged from the pre-amplification relationship of FIG. 1, provided all of the component signals remain below the saturation threshold. FIG. 2 shows all component signals within the upper limit of the network parameters, with the strongest signal, the third wavelength, $\lambda_3$, at the upper limit. As noted however, the other discrete wavelengths fall far below the upper threshold. Because it was earlier determined that the fourth wavelength $\lambda_4$ was subject to the greatest attenuation during transmission, future transmission subsequent FIG. 2 is limited by the fourth wavelength $\lambda_4$, which is both the weakest signal, and subject to the greatest attenuation. Failure to amplify the fourth wavelength $\lambda_4$ to the maximum allowable signal strength 120 will result in attenuation of $\lambda_4$ to the lower threshold 124 in a substantially shorter transmission distance than if it had begun at the upper threshold 120. Alternatively, FIG. 3 shows the fourth $\lambda_4$, which is the weakest component wavelength in the figure, amplified to the upper threshold 120. The problem with this approach, however, becomes clear when an examination is made of the other component signals in FIG. 3. By amplifying the weakest signal up to the upper threshold 120 of the network, in a uniform amplification process, all other signals, $\lambda_1, \lambda_2, \lambda_3, \lambda_n$ are amplified above the upper threshold 120 of the optical network.

To optimize network performance therefore, a first step in the processing of a wavelength multiplexed signal is channel equalization of component signals $\lambda_1, \ldots, \lambda_n$. FIG. 4 illustrates component signals in a wavelength multiplexed signal which have been both equalized, and amplified to the upper threshold 120 of the network parameters. Unless the weakest component signals $\lambda_1, \ldots, \lambda_n$ is below the allowable threshold for maintaining an acceptable signal to noise ratio, the first step of the equalization process is to reduce the signal strength of each component wavelengths component signals $\lambda_1, \ldots, \lambda_n$ to the level of the lowest power of any of the signals present. Alternatively, the component signals may be reduced to a common predetermined power level. The second step in the equalization process is to uniformly amplify the equalized component signals $\lambda_1, \ldots, \lambda_n$ to a predetermined power level, preferably the maximum recommended power level 120 (FIG. 4) of a network. By this process of equalization and amplification, all wavelengths within a signal can be equally amplified to the maximum power allowable on a fiber network, thereby maximizing the signal to noise ratio and minimizing the bit error rate.

Initially, optical signal equalization was performed electrically by converting component optical signals into electrical signals, amplifying the component signals and converting the signals back into optical signals. The process, often known as regeneration, typically included a variety of drawbacks. The process required an optical receiver, an electrical amplifier, and an optical transmitter. Moreover, the repeaters or regenerators were typically monochromatic, requiring a different set of components for each wavelength or channel. Accordingly, the process was complex and expensive to maintain. As a result, systems have increasingly looked to optical equalization in wavelength division multiplexing systems. Methods of optically equalizing and amplifying signals have included static equalization and dynamic equalization. The use of an erbium doped fiber amplifiers ("EDFAs") combined with a dielectric filter, whose transmission is, for example, the spectral inverse of the gain spectrum of an erbium doped fiber amplifier ("EDFA"), can function as a static equalizer. The EDFA and filter taken together then work to produce a flat, equal output spectrum. However, such an approach is largely incapable of dynamic equalization, that is, equalizing the spectrum under changing conditions. The spectral variation of gain for an EDFA can be 2–3 dB or, at the extreme spectral edges of the amplifier, as large as 15 dB. Furthermore, the gain curve of an EDFA changes dynamically as the input power levels on the individual wavelength channels change. Such dynamic deviations in the EDFA gain curve cannot be corrected with a dielectric filter. However, equalization is highly desirable if the signal to noise ratio ("SNR") values are also to be maximized for all channels in a WDM system.

Because of the limitations of static equalization, engineers have sought to develop a reliable dynamic means of equalization. A dynamic equalizer would allow a more complete use of EDFA gain with a consequent reduction in the number of EDFAs in a given transmission distance. A variety of dynamic equalization techniques have also been advanced within the prior art, which seek to equalize component signals in a WDM system. All rely on some spectral mux/demux component, followed by an electronically-controllable variable optical attenuator ("VOA") which can operate on the de-multiplexed channels (or possibly a band of channels).

Mach-Zehnder interferometers, which have been well-established as effective high-speed amplitude modulators, can be used as high-resolution VOA's. The Mach-Zehnder thermo-optic filter functions as a temperature-controlled waveguide interferometer. An optical path length may be further controlled by changing the temperature of the refractive material in the path. The amplitude of two different channels or wavelengths entering a directional coupler are split equally among separate paths. The path length is thereby controlled. The beams are recombined at a second direction coupler with two different outputs. Each output typically supports only one of the wavelengths under certain constructive phase conditions. Accordingly, different wavelengths can be tuned through optical path differences by controlling the temperature of the refractive material. However, Thermo-optical apparatus typically dissipate considerable amounts of heat into the substrate and are inherently slow.

Another means for dynamic equalization being explored is through the use of semiconductor optical amplifiers (SOAs). SOAs create a gain medium through population inversion by electrically pumping a semiconductor, for example, indium gallium arsenide phosphide (InGaAsP). The weaker input WDM signals optically seed the gain medium and are amplified through stimulated emission. However, although the spectral bandwidth that can be addressed by SOAs is fairly large, SOAs have a low signal-to-noise ratio, suffer from significant channel cross-talk, and are polarization sensitive, typically requiring polarizing-preserving fibers for transmission.

Raman amplifiers have also been used for dynamic optical equalization. Raman amplifiers use a lower-wavelength pump laser to excite the atoms in nondoped fibers to higher energy states. The amplification created by this process is not linear, but rather, the weaker WDM signals have a greater effect of stimulating atoms in higher energy states to emit photons at longer wavelength commensurate with the WDM signals. This non-linearity can be exploited to dynamically equalize component WDM signals of varying power levels. The stimulated light mixes with the WDM signal, resulting in optical amplification. The spectral bandwidth over which Raman amplifiers operate is fairly wide.

However, Raman amplifiers suffer from their own limitations and drawbacks. For example, Raman amplifiers require very long fibers and high-powered pump lasers. Other approaches include acousto-optic tunable filters ("AOTFs"), which have been employed as spectroscopic attenuators for years.

A more recent technology used in dynamic equalization of WDM signals has been electronically switchable Bragg gratings (ESBGs). ESBGs can be created through holographic polymer-dispersed liquid-crystal technology (HPDLC), which embeds phase-volume holograms in polymer substrates through a process that allows direct control of the diffractive bandwidth and central wavelength. The liquid-crystal droplets comprising the ESBG are therefore placed on a waveguide. The components are made by creating a row of ESBGs, wherein each ESBG is devoted to a predetermined wavelength. The ESBGs are formed of a mixture of liquid crystal and polymer, which exhibit Bragg Gratings, or a series of stripes of different refractive index, disposed within them to reflect back specific wavelengths. An interference pattern is formed by exposing the polymer and liquid crystal mixture to ultraviolet light from intersecting laser beams. Liquid crystal (LC) droplets are formed as the liquid crystal diffuses to areas of high light intensity. When a voltage is applied to this arrangement, the refractive index of the LC droplets is reduced, thereby collapsing the grating effect and allowing all light to pass through. When no voltage is applied, the grating diffracts light at a specific wavelength of the waveguide. Accordingly, by applying an appropriate voltage, the LC droplets form an evanescently coupled grating which can couple light out of the waveguide to a varying level, depending on the coupling-strength of the grating.

In processing a WDM signal, however, it is generally advantageous to process component wavelengths in parallel rather than serial processes. In parallel processing of component wavelengths, all wavelengths are processed simultaneously, so there is no cumulative signal attenuation or degradation. In serial processing of the component wavelengths in a WDM signal, those wavelengths that are not processed first may be subject to cumulative attenuation or degradation imposed in the successive processing steps. According to such a serial process, if four wavelengths are being equalized, the first wavelength is processed at the first serial station, and the second, third and fourth wavelengths are subjected to any attenuation, scattering, filtering, refraction or other degradation imposed by the first station. When the second wavelength is processed by the second station, the third and fourth wavelengths are subject to any degradation imposed by the second station. When the third wavelength is processed at a third station, the fourth wavelength is again unnecessarily degraded by the interaction at the third station. Accordingly, if serial WDM imposes any degradation whatsoever upon wavelengths awaiting processing, the later processed signals will degrade exponentially according to the number of serial processing steps or stations, thereby limiting the scalability of such a technique, and placing an upper limit on the number of wavelengths that may be processed.

Preliminary considerations suggest that a WDM signal being processed through a liquid crystal ESBG advantageously directs the WDM signal through a succession of liquid crystal devices in a serial application, each device dedicated to a single wavelength. According to this model, a WDM signal being serially processed by liquid crystal ESBGs will cascade through a series of liquid crystal device, thereby limiting the scalability or the total number of channels which may be processed in this manner. Although studies continue to advance on the functionality and application of ESBG technology, its applications, and limitations, both commercial and technological, remain largely unexplored.

There exists therefore a need for a method and apparatus of equalizing an optical signal without converting the optical signal to an electrical signal and back to an optical signal. There is also a need for a method and apparatus which can dynamically equalize an optical signal as the power levels on the individual wavelength channels change, thereby responding to dynamic deviations in a EDFA gain curve. There further exists a need for a method and apparatus for dynamically equalizing optical signals that is very fast, has low insertion loss, does not require the use of very long fibers and high-powered pump lasers, that exhibits a low signal-to-noise ratio, does not suffer from significant channel cross-talk, and is not highly polarization sensitive such that it requires polarizing-preserving fibers for transmission, and is premised on economically viable and commercially proven technology which is demonstrated to avoid the limitations of serial processing of light waves.

SUMMARY OF THE INVENTION

The present invention discloses a method and apparatus for equalizing the power levels of component wavelengths within a wavelength multiplexed signal, without the need of converting the optical signal to an electrical signal and back to an optical signal. The present invention further discloses a method and apparatus which can dynamically equalize an optical signal as the power levels on the individual wavelength channels change, thereby responding to dynamic deviations in a EDFA gain curve. The present invention further discloses a method and apparatus for dynamically equalizing optical signals that is very fast, does not dissipate substantial heat to the substrate, does not require the use of very long fibers and high-powered pump lasers, that exhibits a low signal-to-noise ratio, does not suffer from significant channel cross-talk, and is not highly polarization sensitive such that it requires polarizing-preserving fibers for transmission. The present invention further discloses a method and apparatus for dynamically equalizing a WDM signal that is premised on economically viable and commercially proven technology which is demonstrated to avoid the limitations of serial processing of light waves. These and other advantages will become apparent to those of ordinary skill in the art after having read the following detailed description of the preferred embodiments which are illustrated in the various drawings and figures.

According to one embodiment of the present invention, an apparatus for adjusting power levels of component signals of a wavelength division multiplexed signal including a first wavelength signal and a second wavelength signal, comprises a diffractive light modulator with a first pixel configured to receive the first wavelength signal and a second pixel configured to receive the second wavelength signal. The first pixel directs at least a portion of the first wavelength signal into a first mode, whereby a first post-modulator wavelength signal is formed, a portion of the first post-modulator wavelength signal being collected in a first optical output channel to form a first collected signal. The second pixel partially directs the second wavelength signal into the first mode and partially directs the second wavelength signal into a second mode, whereby a portion of a second post-modulator wavelength signal is collected in a second optical output channel to form a second collected signal. A power level of the second collected signal is attenuated relative to a power level of the second wavelength signal.

The apparatus advantageously comprises a demultiplexer configured to de-multiplex the wavelength division multiplexed signal into component signals including the first wavelength signal and the second wavelength signal, and a multiplexer configured to multiplex a plurality of collected signals into an output signal, the plurality of collected signals including the first collected signal and the second collected signal. The apparatus is configured such that the power level of the first collected signal is approximately equal to the power level of the second collected signal. The apparatus advantageously comprises a first light sensor for determining a power level of the first collected signal and a second light sensor for determining the power level of the second collected signal. A controller is electrically coupled to the first light sensor, the second light sensor, and the diffractive light modulator. As the first and second light sensors detect changes in the first and second wavelength powers, the controller dynamically modulates the first and second pixels of the diffractive light modulator to maintain a desired level of attenuation, maintaining a predetermined ratio between the power level of the first collected signal and the power level of the second collected signal. According to one embodiment, the first wavelength signal passes through the first lens before coupling with the first pixel, and the second wavelength signal passes through the second lens before coupling with the second pixel. The diffractive light modulator advantageously comprises a grating light valve.

A method of adjusting a power level of component wavelength signals of a wavelength division multiplexed signal comprises the steps of de-multiplexing an input signal into component wavelength signals including first and second wavelength signals, illuminating first and second pixels of a diffractive light modulator with the first and second wavelength signals, respectively forming first and second post modulator signals, modulating the first pixel such that a portion of the first post-modulator signal is directed into a first optical channel, thereby forming a first collected signal, wherein a portion of the first post-modulator signal is directed away from the optical channel, thereby forming a first rejected signal. A reference power level is established, wherein the first collected signal is modulated to conform to the reference power level. The modulating is achieved by modulating of the first pixel through a controller. According to one embodiment, the step of establishing a reference power level comprises the steps of determining a plurality of power levels respectively associated with the plurality of collected signals, and selecting a reference power level from among the plurality of power levels. According to an alternative embodiment, the reference power level is predetermined.

A channel equalizer for a wavelength division multiplexing system comprises an optical input for transmitting an input signal, the input signal comprising a first plurality of component input signals defined according to a first plurality of wavelengths. The optical input is operatively coupled to a demultiplexer which is configured to separate the input signal into the first plurality of component input signals including a first component input signal defined according to a first wavelength. A diffractive light modulator comprises a plurality of pixels including a first pixel. A plurality of input channels respectively channel the plurality of component input signals from the demultiplexer to the respective plurality of pixels, including a first input channel configured to receive the first component input signal and channel it toward the first pixel of the diffractive light modulator. A plurality of reflected signals are formed by the plurality of component input signals interacting with their respective pixels. The plurality of reflected signals are directed toward a plurality of output channels, including a first reflected signal reflected toward a first output channel. The first output channel is configured to receive a portion of the first reflected signal, the portion ranging from zero to one hundred percent, thereby forming a first collected signal. The first pixel is configured to controllably modulate the portion of the first signal received by the first output channel. A multiplexer is operatively coupled to the plurality of output channels. The multiplexer is configured to receive a plurality of collected signals including the first collected signal, the multiplexer being further configured to combine the plurality of collected signals into an output signal. The channel equalizer is advantageously coupled to a plurality of light sensors for measuring the power level of a plurality of signals, including a first light sensor for measuring the power level of a first component wavelength. According to one embodiment, the first light sensor is coupled to the first input channel for measuring the power level of the first collected signal. According to this embodiment, the first light sensor may measure the power level of the wavelength of light prior to being multiplexed into a single stream, or may measure the power level of the first component wavelength after a plurality of components have been multiplexed into an output stream, wherein a portion of the output signal is diverted, demodulated into its component wavelengths for measuring by a plurality of light sensors. Alternative embodiments are envisioned, however, wherein the first light sensor measures the power level of light thrown away from the first output channel as a result of the diffractive light modulator prior to entering an output channel. Still another embodiment is envisioned wherein the first light sensor measures the power level of the first component wavelength prior to striking the diffraction light modulator. The diffractive light modulator is preferably a grating light valve.

A method of selectively equalizing respective power levels of a plurality of component signals defined by a plurality of wavelengths comprises the steps of directing the plurality of component signals onto a respective plurality of pixels of a diffractive light modulator, wherein a first component signal is directed onto a first pixel, and wherein a plurality of signals resulting from an interaction of the plurality of component signals with the plurality of pixels are defined as a plurality of reflected signals, including a first reflected signal resulting from the first component signal interacting with the first pixel, controlling the first pixel by a controller to affect an amount of diffraction created within the first reflected signal, and collecting a portion of the plurality of reflected signals in a respective plurality of optical output channels, thereby forming a plurality of collected signals, including a first collected signal comprising a portion of the first reflected signal entering a first optical output channel. The method advantageously comprises the step of measuring a portion of the first reflected signal to determine a power level of the collected portion of the first reflected signal. According to one embodiment, the measured portion of the first reflected signal comprises the collected portion of the first reflected signal. According to an alternative embodiment, the measured portion of the first reflected signal comprises an uncollected portion of the first reflected signal.

BRIEF DESCRIPTION OF SEVERAL VIEWS OF THE DRAWINGS

FIG. 6 illustrates a first embodiment of a static grating multiplexer/demultiplexer.

FIG. 7 illustrates an alternative embodiment of a static grating multiplexer/demultiplexer.

DETAILED DESCRIPTION OF THE PREFERRED EMBODIMENT

Figure 1:
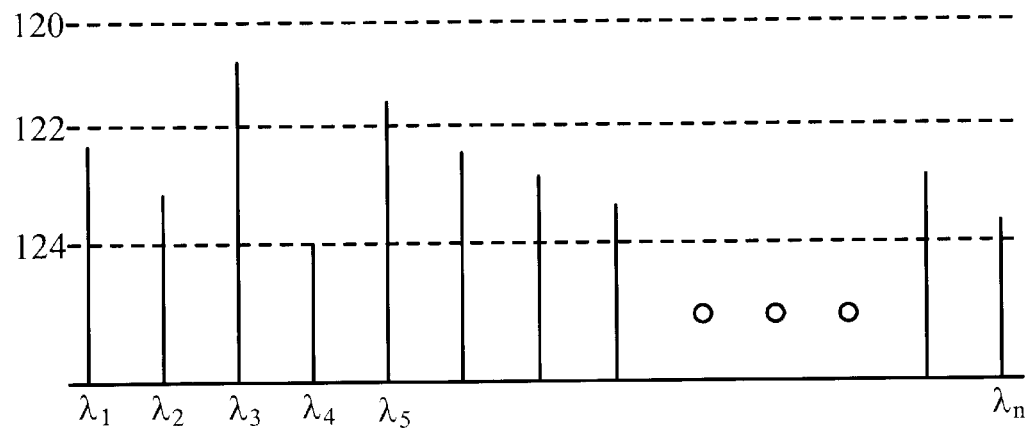
FIG. 1 graphically illustrates a wavelength multiplexed signal with component wavelengths at different power levels as a result of attenuation during transmission.
Figure 2:
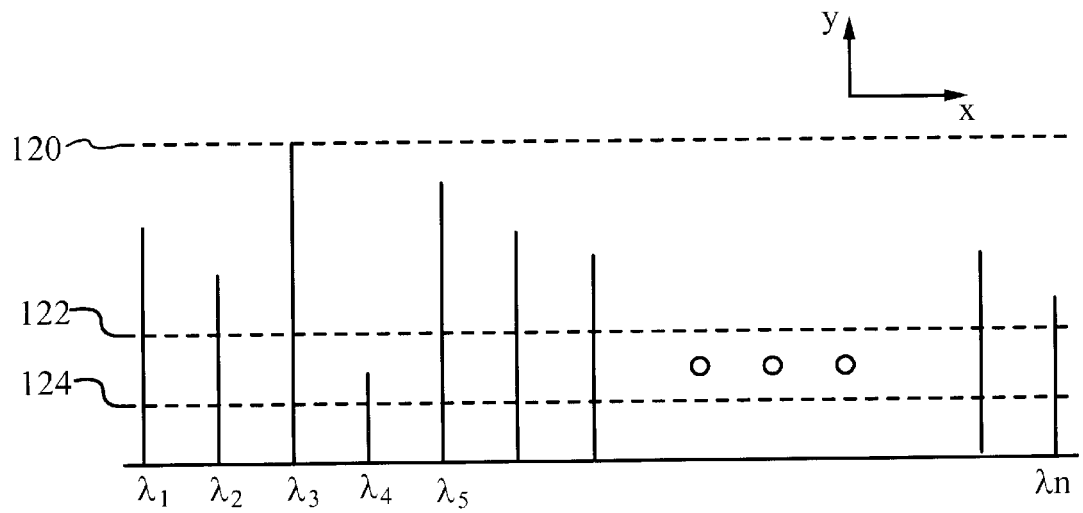
FIG. 2 graphically illustrates the signal of FIG. 1 after the component wavelengths have been uniformly amplified, wherein the strongest signal has been amplified to the saturation threshold.
Figure 3:
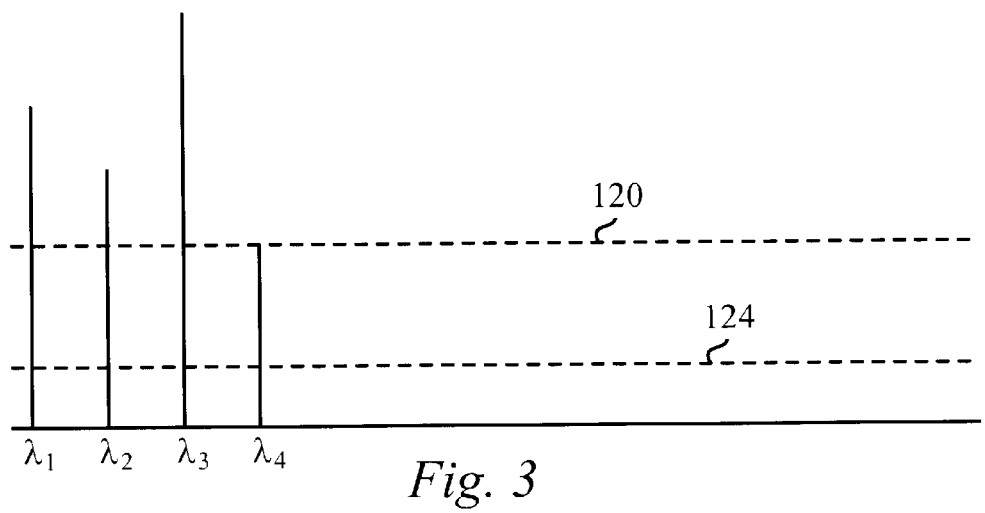
FIG. 3 graphically illustrates the signal of FIG. 1 after the component wavelengths have been uniformly amplified, wherein the weakest signal has been amplified to the saturation threshold.
Figure 4:
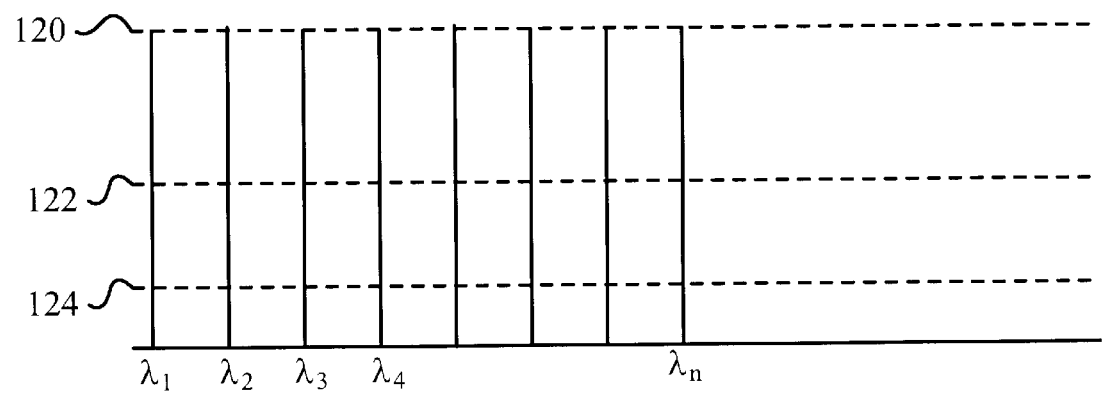
FIG. 4 graphically illustrates the signal of FIG. 1 after the component wavelengths have been equalized to the same power.

U.S. Pat. No. 5,311,360 entitled "METHOD AND APPARATUS FOR MODULATING A LIGHT BEAM" and U.S. Pat. No. 5,841,579 entitled "FLAT DIFFRACTION GRATING LIGHT VALVE to Bloom et al. and U.S. Pat. No. 5,661,592 entitled "METHOD OF MAKING AN APPARATUS FOR A FLAT DIFFRACTION GRATING LIGHT VALVE" to Bornstein et al., are herein incorporated by reference.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Reference will be made to a grating light valve comprising at least one pixel, and more preferably, a plurality of pixels, each pixel comprising a plurality of elongated ribbons, at least one of which is a movable elongated ribbon. Although the attached figures used to illustrate the present invention depict a fixed row of elongated ribbons nearer an optical channel and a movable row of elongated ribbons farther away from an optical channel, it is understood that either row of elongated ribbons could be constructed nearest the optical channel. It is further understood that embodiments are envisioned wherein both rows of elongated ribbons are movable. Accordingly, such details are not intended to limit the present invention, but to improve the clarity of the disclosure by utilizing specific examples which will be more readily understood by those skilled in the art.

It should further be born in mind that terms like "equalize" and "equalization" as used with respect to the present invention are to be broadly interpreted with respect to regulating the power levels of component light signals to any pre-determined level of relative power levels. Accordingly, the term "equalize" as used herein is not to be limited to any one particular curve or ratio, but simply constitutes a regulation or normalization of signal power against any pre-determined curve or ratio of power levels at different frequencies. Finally, recitation is made herein to common industry components such as bi-directional wavelength multiplexer/demultiplexer. Those skilled in the art will understand that a single bi-directional unit could easily be replaced by separate individual multiplexing and de-multiplexing units. It is understood that substitutions of such equivalent structures of this and other components recited within the disclosure of the present invention are within the intended scope of the present invention. Accordingly, although this detailed description of the present invention includes numerous specific details which are set forth to provide a thorough understanding of the present invention, it will be readily apparent to one of ordinary skill in the prior art that the present invention may be practiced without these specific details. Minor variations of the disclosed invention will immediately become apparent to those skilled in the art. In other instances, numerous details which are commonly known and understood by those skilled in the art have not been recited within the present disclosure so as not to unnecessarily obscure aspects of the present invention. Accordingly, the figures and detailed description recited herein are not intended to limit the present invention, but are merely intended to illustrate a particular implementation of the present invention, and to enable those skilled in the art to utilize the principles of the invention set forth herein.

Figure 5:
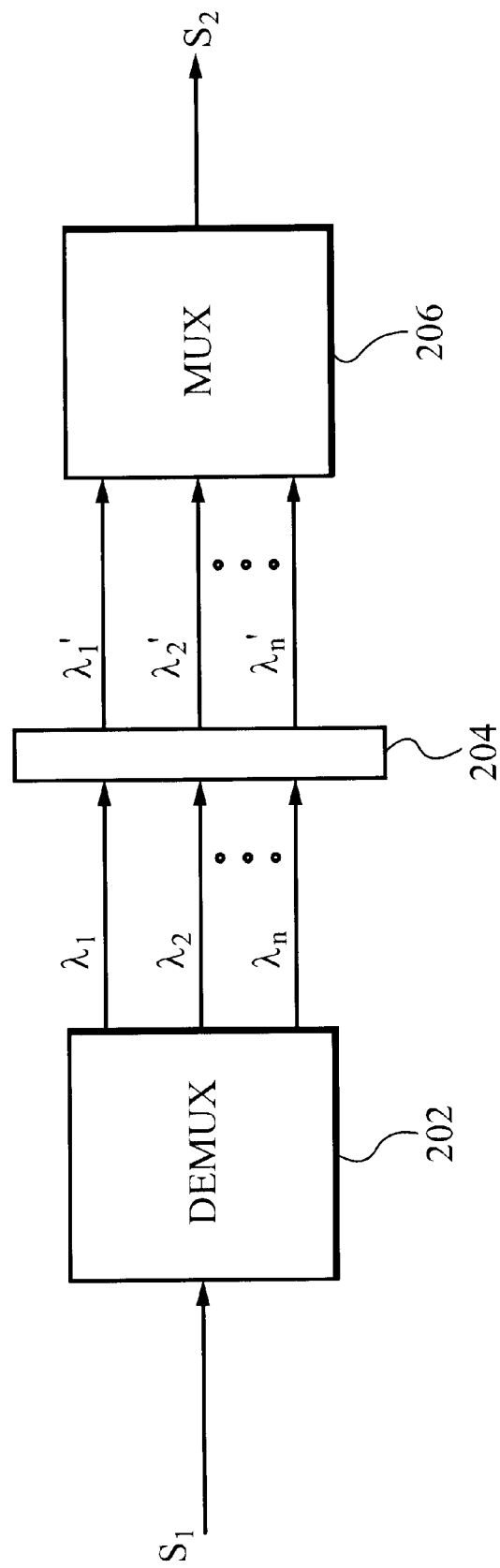
FIG. 5 illustrates an overview of a demultiplexing, equalizing and multiplexing apparatus according to the present invention.

FIG. 5 illustrates the basic components of the present invention. An input signal S1 enters a demultiplexer 202, which separates the input signal S1 into a plurality of component signals input $\lambda_1, \ldots, \lambda_n$. The plurality of component input signals $\lambda_1, \ldots, \lambda_n$ are regulated by a diffraction light modulator 204 to produce a plurality of component output signals $\lambda_1', \ldots, \lambda_n'$. The plurality of component output signals $\lambda_1', \ldots, \lambda_n'$ are channeled into a multiplexer 206, producing an output signal S2 at the output of the multiplexer 206. The multiplexer 206 and demultiplexer 202 may employ any of a wide variety of multiplexing or demultiplexing schemes known in the art, including but not limited to prism, and array waveguide grating (AWG), and static diffraction grating, depending on the spectral resolution, as well as the quality of the eventual equalization required.

FIG. 6 illustrates the use of static grating used for multiplexing and demultiplexing. A wavelength multiplexed input signal $S_1$ from the launch fiber 216 is discharged from a launch fiber 216 and passed through a collimation lens $L_1$, which directs the wavelength multiplexed input signal $S_1$ through a static grating bi-directional multiplexer/demultiplexer 210. A transmission phenomena known as polarization dependent loss ("PDL"), however, takes place in the course of signal transmission. The grating type multiplexer diffracts a portion of the incoming light into a first order diffractive state, generally in a polarization dependent manner. This variation in polarization causes light signals of equal strength to appear to be at vastly different intensity levels. Accordingly, it is not only important that the signals are equalized in their strength, but also, that they appear equal to sensing equipment.

Wave plates are devices known to those skilled in the art which exhibit a different index of refraction dependent upon on the polarization of the light passing through the wave plate. Because light travels more slowly through a substance displaying a greater index of refraction, light beams exhibiting different polarization as a result of the PDL will "see" a different index of refraction when passing through the wave plate. By traveling at different speeds, one signal will come out slightly ahead or behind another signal that entered at the same time. Through use of a quarter wave-plate 215, a signal offset of ¼ wavelength is affected between two orthogonal polarization states. Two passes in opposite directions through the quarter-wave plate affects a 90° polarization rotation of any arbitrary polarization state. According to the preferred embodiment, the de-multiplexed light passes from the static grating 210 through the quarter wave-plate 215, and is then focused by an imaging lens $L_2$ onto a diffraction light modulator 212 such as a grating light valve (GLV). The reflected light experiences diffraction as a result of its interaction with the diffraction light modulator 212. A benefit of the diffraction is that a certain amount of light is "thrown away" from the central path, which is the very means by which the present invention controls the amount of light re-entering the fiber launch channel 216. However, the diffraction resulting from the diffraction light modulator 212 is again polarization dependent, which will result in polarization dependent loss. By re-tracing the same path after interaction with the diffraction light modulator 212, through the transform lens $L_2$, and then passing through the quarter wave-plate 215, and again through the static grating 210, the quarter wave plate compensates for the PDL created by the static grating. The embodiment in FIG. 6 assumes that the PDL of the grating light valve is zero dB. However, in embodiments wherein the PDL induced by the grating light valve is proportionally significant, the quarter wave plate embodiment of FIG. 6 will not be sufficient to eliminate all PDL. According to the illustration of FIG. 6, therefore, the polarization of all light beams is rotated by 90° between incident and return paths, thus mitigating any polarization dependent loss induced by the static grating. As a consequence, the actual power or strength of the beam of light re-entering the fiber channel 216, and directed by the circulator to the output fiber 219, is measured more accurately, thereby allowing more accurate channel based equalization. The output signal $S_2$ is focused through the collimation lens $L_1$ back into the fiber channel 216. According to the multiplexer/de-multiplexer embodied in FIG. 6, the equalized light traverses back through the original path of the incoming signal, and returns through the original collimation lens $L_1$, thus permitting the use of the quarter-wave plate to mitigate polarization dependent effects in the module. As seen in FIG. 6, by using a single fiber 216 for the launch of incoming beam $S_1$ and the collection of output beam $S_2$, a circulator 217 is required. The circulator 217 receives the input beam from an incoming channel 218 and directs the output beam through a separate output channel 219.

In an alternative embodiment, FIG. 7 illustrates a static grating multiplexer/demultiplexer with separate collimation lenses $L_1$, $L_3$ for the input beam $S_1$ and the output beam $S_2$ respectively. The separate paths are achieved by an angular offset of the input beam $S_1$ with the diffraction light modulator 212, resulting in a different return path for the output signal $S_2$. According to the multiplexer/de-multiplexer embodied in FIG. 7, the input signal $S_1$ is discharged from a fiber channel 213 and directed through the collimation lens $L_1$, from where it passes through a static grating de-multiplexer 210. The demultiplexed signal passes through a quarter wave-plate 215 and is focused by imaging lens $L_2$ onto a diffraction light modulator 212. The modulated beam is reflected back to imaging lens $L_2$, from which it is again focused through the quarter wave-plate and through the static grating multiplexer/de-multiplexer 210, where the separate signals are re-multiplexed. From there, the outgoing signal $S_2$ signal is refocused by collimation lens $L_3$ for projection into a fiber channel 214. An equivalent embodiment is illustrated in the dotted circle, wherein the incoming signal $S_1$ does not pass through a quarter wave plate, but the output beam $S_2$ passes through a half wave plate 216. Those skilled in the art will understand that double passage through a quarter wave plate 215 as illustrated in the upper dotted circle has an identical effect as a single pass through a half wave plate 216, as illustrated in the lower offset circle. As with FIG. 6, the quarter wave plate embodiment of FIG. 7 compensates only for the PDL induced by the static grating, and is not as useful for those embodiments wherein the PDL of the grating light valve is significant.

Figure 27:
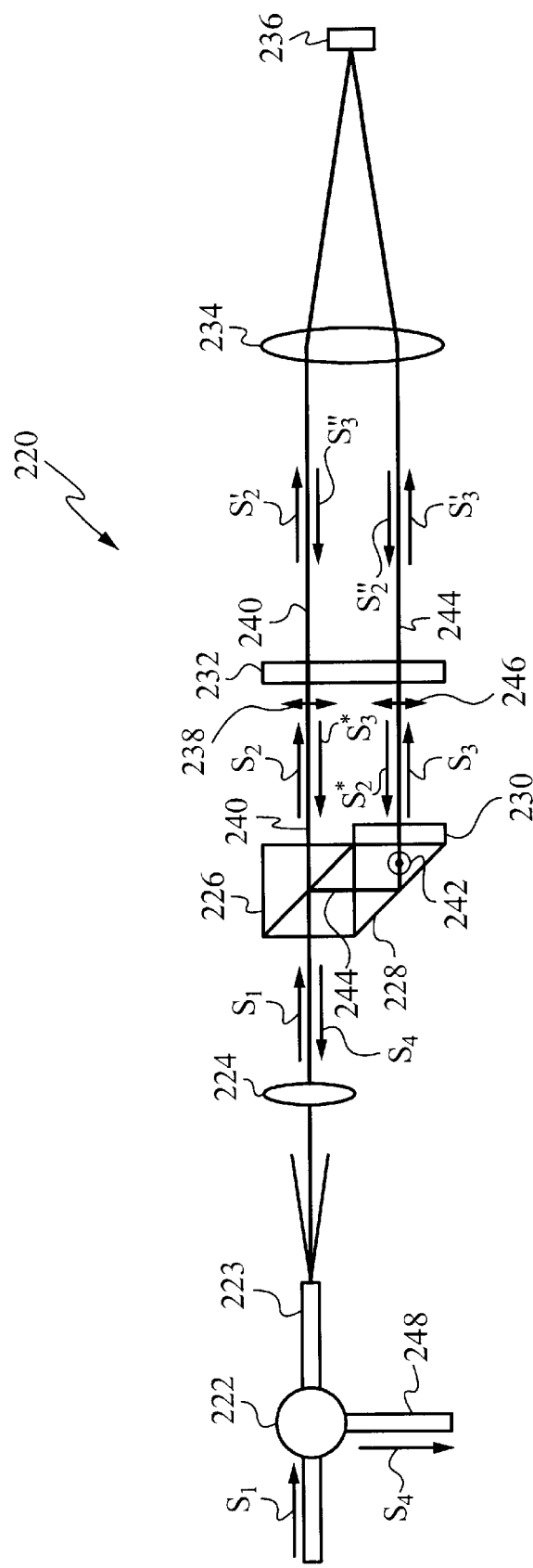
FIG. 27 illustrates a polarization diversity embodiment of the present invention.

FIG. 27 illustrates a polarization diversity embodiment 220 of the present invention. The polarization diversity embodiment 220 comprises a circulator 222, a collimator 224, a polarizing beam splitter 226, a prism 228, a half wave plate 230, a static diffraction grating 232, a transform lens 234, and a grating light valve 236. According to the polarization diversity embodiment 220, a wavelength multiplexed input signal $S_1$ enters the circulator 222, exits an optical fiber 223 of the circulator 222, is collimated by the collimator 224, and is split into first and second signals, $S_2$ and $S_3$, by the polarizing beam splitter 226. The polarizing beam splitter 226 directs the first signal $S_2$ having a first vertical polarization 238 along a first path 240. The polarizing beam splitter 226 directs the second signal $S_3$ having a horizontal polarization 242 along a second path 244. The prism 228 reflects the second signal $S_3$ and the half wave plate 230 rotates the polarization of the second signal $S_3$ by 90° into a second vertical polarization 246. The static diffraction grating 232 demultiplexes the first and second signals, $S_2$ and $S_3$, forming first and second demultiplexed signals, $S_2'$ and $S_3'$, each of which comprises a plurality of wavelength signals. The transform lens 234 focuses the plurality of wavelength signals onto the grating light valve 236, which equalizes power levels of the plurality of wavelength signals forming first and second equalized demultiplexed signals, $S_2''$ and $S_3''$. The grating light valve 236 directs the first and second equalized demultiplexed signals, $S_2''$ and $S_3''$, through the transform lens 234, and multiplexed by the diffraction grating element 232 along the second and first paths, 244 and 240, respectively, forming first and second equalized signals, $S_2^*$ and $S_3^*$. The first and second equalized signals, $S_2^*$ and $S_3^*$, are combined by the half wave plate 230, the prism 228, and the polarizing beam splitter 226 to form an output signal $S_4$. The output signal $S_4$ couples to the circulator 222 via the collimator 224 and the optical fiber 223. The output signal $S_4$ then exits a circulator output 248.

An advantage of the polarization diversity embodiment of FIG. 27 incorporating a half wave plate 232 and polarizing beam splitter 226 is the ability to reduce or eliminate polarization dependent loss PDL from a diversity of sources. As discussed above, the quarter wave plate embodiments of FIGS. 6 and 7 are not advantageously configured to correct for PDL induced by the grating light valve. In contrast, the embodiment of FIG. 27 is equally configured to reduce PDL induced by a static diffraction grating 232 and PDL induced by the grating light valve 236. Accordingly the embodiment of FIG. 27 is a preferred embodiment in those applications incorporating a GLV 236 known to account for a significant percent of the total PDL.

Figure 8:
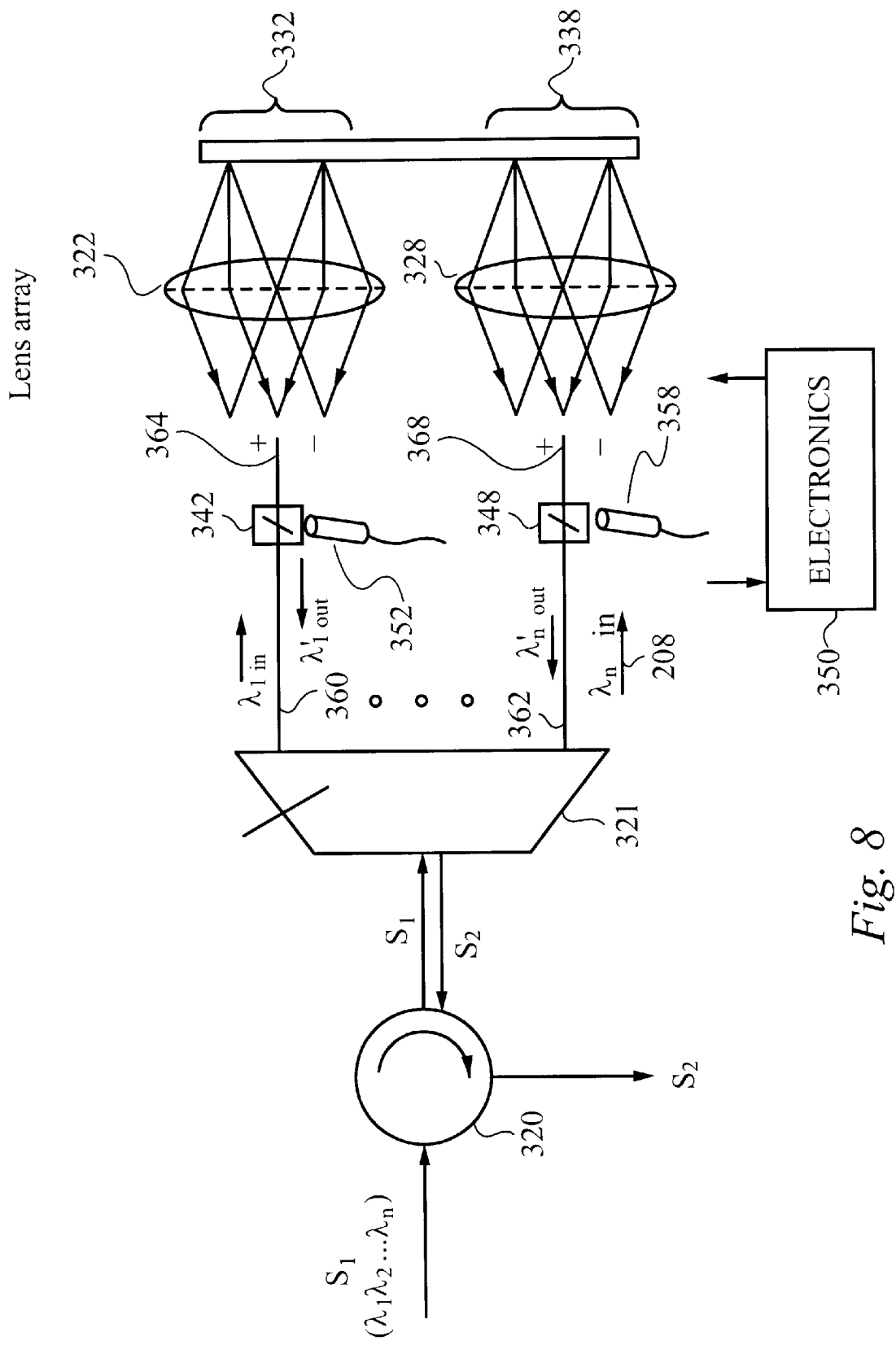
FIG. 8 illustrates a lens embodiment of a diffraction channel-based equalizer according to the present invention.

FIG. 8 illustrates a first alternative channel equalizer of the present invention whereby component signals $\lambda_1, \ldots, \lambda_n$ within a wavelength multiplexed optical input signal $S_1$ are equalized against a predetermined ratio of power through application of a diffraction light modulator. Prior to equalization, it is understood that the component signals $\lambda_1, \ldots, \lambda_n$ present in input signal $S_1$ may be at disparate power levels as illustrated in FIG. 1. In the first step of the equalization process, the optical input signal $S_1$ enters a circulator 320, from which the input signal $S_1$ is transmitted to a Bi-directional multiplexer/demultiplexer 321. The Bi-directional multiplexer/demultiplexer 321 separates the input signal $S_1$ into its component signals $\lambda_1, \ldots, \lambda_n$ defined according to component wavelengths that had been present in the input signal $S_1$. The component input signals $\lambda_1, \ldots, \lambda_n$ are individually passed through respective optical channels 360–362 and into an array of lenses 322, ..., 328 which are assigned to the respective optical channels 360–362. The emitted light beams of each component signal $\lambda_1, \ldots, \lambda_n$ are then individually directed onto respective pixels 332–338, within the diffraction light modulator, which are preassigned to each respective wavelength. The reflected/diffracted light from each respective pixel 332–338 passes through a lens array. As noted above in conjunction with FIGS. 6 and 7, the return path may utilize the same lens as the incoming light, or may utilize a separate lens. By controlling the level of diffraction created by individual pixels 332–338 of the diffraction light modulator 204, 212, as light is reflected back into the fiber ends or tips 364–368 of the individual channels 360–362, the amount of light that is "thrown away" will vary from channel to channel. The power level of light focused back into the optical channels 360–362 assigned to each reflected signal $\lambda_1', \ldots, \lambda_n'$ are therefore individually controlled by controlling the pixels which are respectively assigned to the various component signals $\lambda_1', \ldots, \lambda_n'$. The individual pixels are preferably controlled by an electronic controller 350. In order to equalize all of the reflected signals $\lambda_1', \ldots, \lambda_n'$ to the same power, the more powerful incoming component signals $\lambda_1, \ldots, \lambda_n$ are therefore subject to the greater diffraction, thereby causing a greater amount of light to be scattered away from the optical channel input 360–362. Similarly, the controller provides that the less powerful incoming component signals $\lambda_1, \ldots, \lambda_n$ are subject to a lesser amount of diffraction. When properly coordinated against a reference power level, the various reflected signals $\lambda_1', \ldots, \lambda_n'$ are equalized to a pre-determined ratio. Although the invention is described herein in terms of the reflected light being channeled back into the fiber optical tip and the diffracted light being thrown away, those skilled in the art will recognize that a system could equally be implemented wherein the diffracted light is collected, and some or all of the reflected light is thrown away. According to this alternative embodiment, the diffracted light could be collected and equalized, and an increase or decrease in diffraction would therefore function to adjust the amount of diffracted light entering the fiber optical channel. As illustrated in subsequent drawings, however, the reflected light typically embodies a greater power level than the diffracted light, and is therefore preferred for collection and measuring.

To provide input information to the electronic controller 350, light sensors 352–358 are advantageously coupled to each optical channel 360–362 to sense the power levels of the individual signals. The respective power levels of the various wavelengths may be measured for the component incoming light beams, $\lambda_1, \ldots, \lambda_n$, the component reflected light beams $\lambda_1', \ldots, \lambda_n'$, or both. According to the preferred embodiment, however, power levels will be measured from among the reflected component output beams $\lambda_1', \ldots, \lambda_n'$. According to this embodiment, the electronic controller 350 is not simply regulating individual pixels 332–338 of the diffraction light modulator 204, 212 based upon theoretical levels of attenuation which may have been experienced as the result of signal transmission and processing. Rather, by measuring the power of component output signals, adjustments are based upon actual power levels of component signals. According to this embodiment therefore, a closed loop control is formed wherein the light sensors 352–358 measure the power of the reflected component light beams $\lambda_1', \ldots, \lambda_n'$ which have been reflected off of the respective pixels 332, ..., 338 of the diffraction light modulator 204, 212.

According to the preferred embodiment, light is diverted to the light sensors by means of "fiber taps" or "couplers" 342–348 that are coupled to the optical fiber to divert a small percent of the light into the sensor, with the remaining output signal continuing on to transmit information. Couplers are commonly known to those skilled in the art, and incorporate beam-splitter type technology to allow the passage of most light, while diverting only a portion of the light. Because the diverted light is commonly directed into an optical performance monitor capable of sensing the power level of the component wavelengths, according to the preferred embodiment, the light sensors said to be coupled to the components of the present invention will be those light sensors integral to a standard optical performance monitor as currently used in industry. Signals or information gained from the optical performance monitor are used to control the diffraction light modulators of the present invention. However, embodiments are envisioned wherein separate couplers and light sensors are used which are integral to dynamic equalizer of the present invention. Couplers are commonly rated according to their ratio of light diverted to light passed. For example, a "90/10 coupler" would be configured to pass 90% of a light beam onto its original path, and divert 10% of the light beam for sensing, typically by a light sensor 352–358 for measuring the strength of the beam. Because the ratio of the light diverted compared to the light that continues on the output path is a substantially constant ratio over the entire useable range of power, a sensor measuring the amount of light diverted through the coupler can determine the power of the remaining output beam across a wide variety of power levels. According to the embodiments illustrated in FIGS. 8 and 9, the sensors 358 are disposed along the return paths of the component signals $\lambda_1', \ldots, \lambda_n'$ prior to re-multiplexing of the reflected signals $\lambda_1', \ldots, \lambda_n'$. Alternative embodiments are envisioned, however, wherein a coupler can be positioned to divert a portion of the reflected DWM signal $S_2$. According to this embodiment, a separate de-multiplexer would be required to de-multiplex the diverted signal to measure the strength of the component wavelengths making up the diverted portion of the reflected signal $S_2$. Another alternative embodiment is envisioned, however, wherein the couplers 348—348 are unnecessary. According to this alternative embodiment, light sensors 352–358 need not be coupled to detected light focused back into, the actual component channels, but may be positioned to sense light which is "thrown away" as a result of diffraction, as explained in conjunction with FIGS. 18A, 18B, 19A and 19B. This embodiment has an advantage of not interfering with the collected light which is to be multiplexed and re-transmitted.

Measurements taken by the light sensors 352–358 form the input data of the electronic controller 350. Control signals produced by the electronic controller 350 then regulate the individual pixels 332, . . . 338 of diffraction light modulator 204, 212. Although embodiments are envisioned that are capable of controlling individual pixels 332–338 of a diffraction light modulator 204, 212 exclusively from analog inputs, according to the preferred embodiment, A/D converters transform the measured power levels of the respective light beams as measured by the light sensors light sensors 352, . . . , 358, into digital data. According to the preferred embodiment, the A/D convertors comprise digital registers with a minimum of eight bit resolution capable of distinguishing at least two hundred fifty-six gradations of light power in digital format to the electronic controller. The present invention, however, envisions the advantageous use of digital registers greater than, and smaller than eight bits in particular applications. Accordingly, the preferred embodiment is not intended to limit the digital resolution of the present invention. The A/D converters are advantageously located within the individual light sensors 352, . . . , 358. Those skilled in the art, however, will recognize that analog to digital conversion may take place at virtually any location within FIG. 8, including the controller itself. A variety of low cost control systems such as digitally programmable PID loop controllers are commonly known to those skilled in the art.

A preferred method of equalizing the power of the component incoming signals $\lambda_1, \ldots, \lambda_n$ involves identifying the weakest component wavelength $\lambda_b$ (the component wavelength at the lowest power level) from among all component wavelengths $\lambda_1, \ldots, \lambda_n$ and establishing the weakest component signal $\lambda_b$ as the reference wavelength. According to this embodiment, the remaining component wavelengths $\lambda_1, \ldots, \lambda_n$ are modulated down to match the power level of the reference signal $\lambda_b$, and the reference signal does not have to be modulated at all. It is understood, however, that according to the alternative embodiment discussed above, wherein couplers are not used to divert a portion of the output signals $\lambda_1', \ldots, \lambda_n'$ but rather, the power level of each component signal $\lambda_1, \ldots, \lambda_n$ is determined by measuring light "thrown away" by the diffractive light modulator in the modulation process, even the weakest signal $\lambda_b$ may have to be modulated to produce a measurable amount of light by which the intensity of the signal $\lambda_b$ can be determined.

Although certain frequencies are known to exhibit greater attenuation over extended transmission, pre-selecting as a reference signal the wavelength expected to exhibit the greatest attenuation may not always be the most reliable selection of a reference signal. In a metropolitan environment or "hub", signals which have traveled varying distances and been subject to varying degrees of attenuation are typically re-routed and multiplexed or joined together. The weakest signal therefore will not necessarily be the wavelength subject to the greatest attenuation. Accordingly, the present invention will advantageously incorporate a dynamic selection of a reference signal by measuring the power levels of all component signals and selecting as a reference signal the signal having the lowest actual power level of all component signals $\lambda_1, \ldots, \lambda_n$. The incoming component signal $\lambda_1, \ldots, \lambda_n$ at the reference wavelength would preferably be subject to little or no diffraction from its respective pixel 332, . . . , 338. The remaining pixels 332, . . . , 338 of the diffractive light modulator 204, 212 respectively control the power of the remaining reflected component light beams to which they are assigned. The pixels 332, . . . 338 are individually adjusted by the controller such that the output power of their respective beams $\lambda_1', \ldots, \lambda_n'$ are equalized against the output power of the reference wavelength.

Alternatively, however, it is envisioned that all signals could be diffracted downward to a pre-established common power level rather than to the lowest power level of the various component wavelengths. An advantage of this approach lies in circumstances wherein a particular wavelength has attenuated below a reliable signal-to-noise ratio. In such a circumstance, equalizing all signals to the weakest signal will expand the unacceptable signal-to-noise ratio to all of the component signals. Diffracting all signals down toward a pre-established power level ensures that robust signals will not be equalized down to an unacceptable signal-to-noise ratio.

An array of lenses 322–328 are respectively assigned to the individual pixels 332–338 comprising the diffractive light modulator 204, 212. According to the preferred embodiment, the same lens used to focus a component incoming signal $\lambda_1$, onto a pixel 332 of the diffractive light modulator 204, 212 is also used to focus a reflected signal $\lambda_1'$ from the pixel 332 back into the optical channel 360 assigned to that wavelength. However, it was seen in FIG. 7 that separate lenses may be used for incoming and reflected signals. Using either a single path embodiment as depicted in FIG. 6 or the embodiment of FIG. 7 comprising separate paths for incoming and reflected signals in conjunction with the embodiment depicted in FIG. 8, the component reflected light beams $\lambda_1'$, . . . , $\lambda_n'$ shown in FIG. 8 are then recombined in the multiplexer of a Bi-directional wavelength multiplexer/demultiplexer 321 and the resultant signal is channeled through the circulator 320 to form the output signal $S_2$. The output signal may then be amplified for further transmission, or processed in some other manner. An advantage of a separate channel 214 for reflected signals as shown in FIG. 7 is that it will not need a circulator.

An advantage of the lens-array embodiment is that it eliminates the need for very exacting manufacturing tolerances governing the distance between the tips 364, . . . , 368 of the individual optical channels 360, . . . , 362 and their respective pixels 332, . . . , 338.

Figure 9:
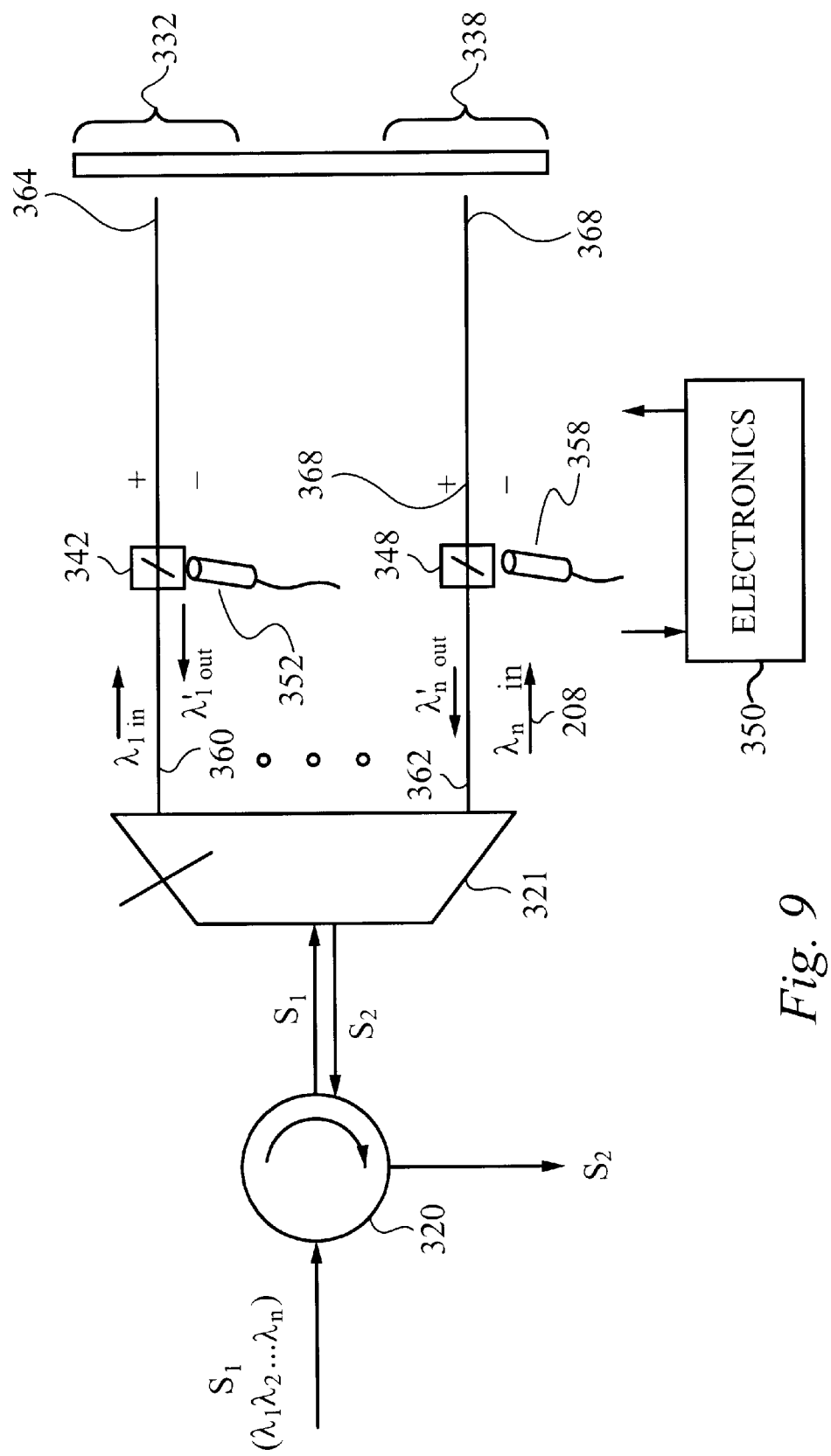
FIG. 9 illustrates a lensless embodiment of a diffraction channel-based equalizer according to the present invention.

FIG. 9 discloses a lensless embodiment of the diffractive light equalizer seen in FIG. 8. The tips 364, 368 of the fiber optical channels 360, 368 are nearer to the individual pixels 332, 338 of the diffractive light modulator than in FIG. 8, thereby eliminating the need for a lens to focus the incoming light signals $\lambda_1$, . . . , $\lambda_n$ onto the individual pixels, as well as the need to focus the reflected component reflected signals $\lambda_1'$, . . . , $\lambda_n'$ back into the respective channels 360, 362. The lensless embodiment depicted in FIG. 9 is clearly advantageous over the lens embodiment of FIG. 8 in that it is simpler and more compact. However, a lensless embodiment is more likely to require a circulator, 320, and requires extremely high manufacturing tolerances.

Figure 10:
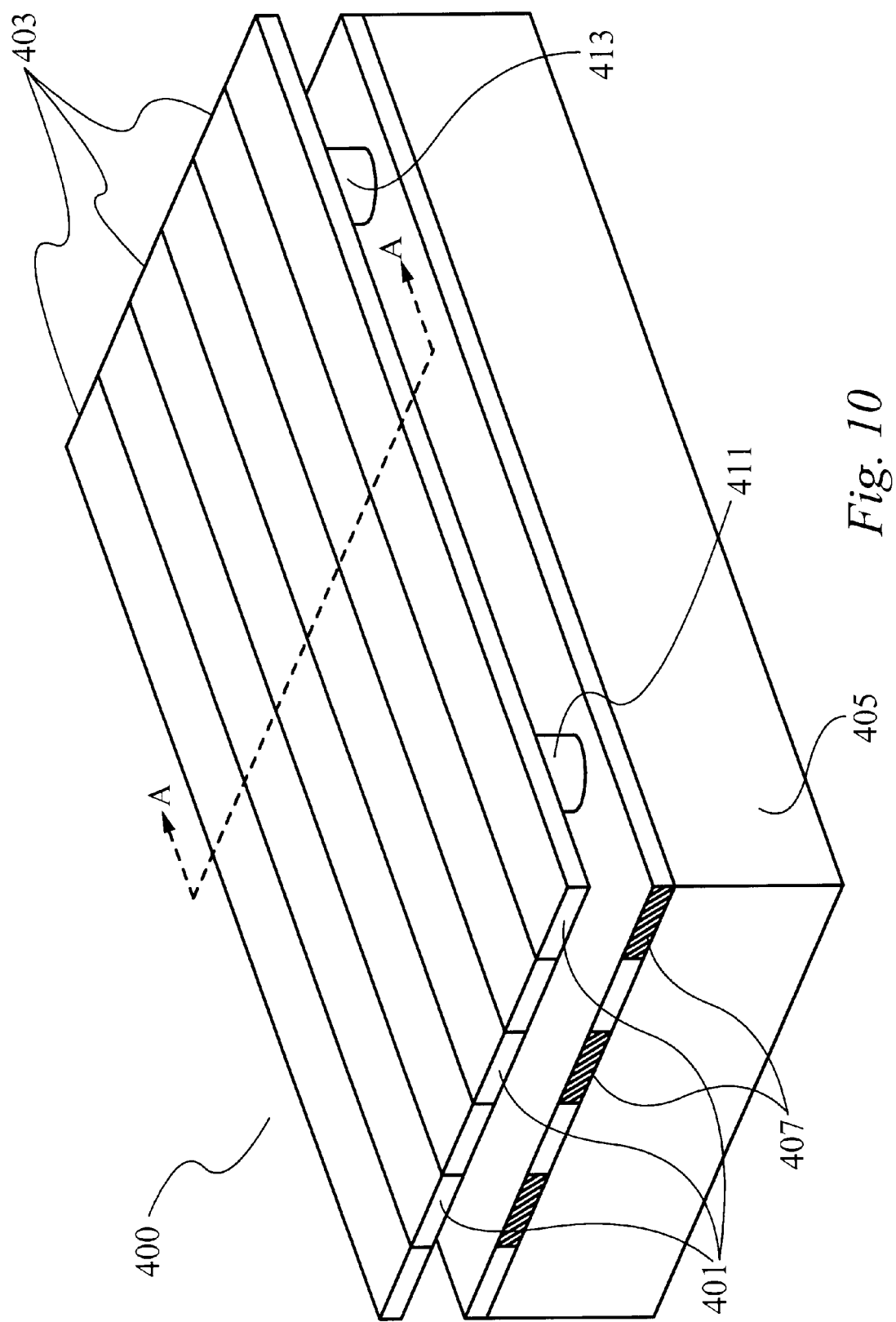
FIG. 10 illustrates a grating light valve for use as a diffractive light modulator in conjunction with the present invention.

Although the present invention is envisioned as operating in conjunction with any diffractive light modulator, the preferred embodiment of the present invention envisions the use of grating light valves for the diffractive light modulator. FIG. 10 illustrates a grating light valve adapted for use as a diffractive light modulator according to the present invention. The GLV 400 comprises two sets of interdigited elongated elements or "ribbons" 401, 403, wherein at least one set 401 is movable by means of a controllable electric field. The elongated elements 401, 403 of FIG. 5 are supported above a substrate 405 by support members 411, 413. Conductive elements 407 capable of generating an electric field are disposed proximate the movable ribbons 401. A conductive element 407 may be assigned to a single movable ribbon or, according to a much simpler embodiment, the conductive element 407 need not be segmented, but formed from a continuous conductive layer, and may therefore be assigned to deflect multiple ribbons. According to the embodiment of FIG. 10, the conductive members 407 are seen to rest on an upper surface of the substrate 405. Alternative GLV designs are possible however, wherein the conductive elements 407 are disposed below the substrate, or even layered within layers of a laminate substrate structure.

Figure 11:
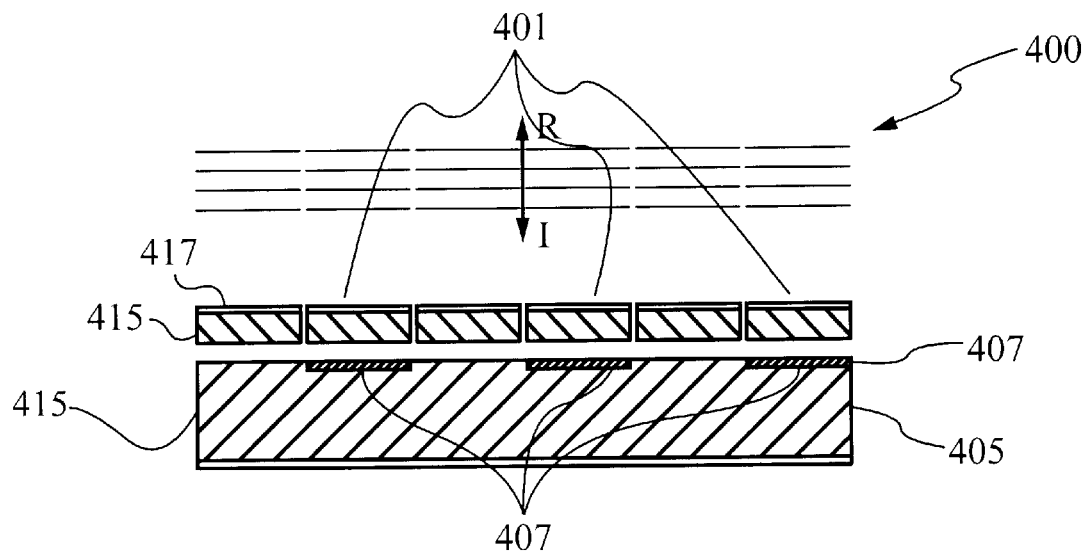
FIG. 11 illustrates a cut-away side view along cut-line A of the grating light valve of FIG. 10 in a non-diffracting state.
Figure 12:
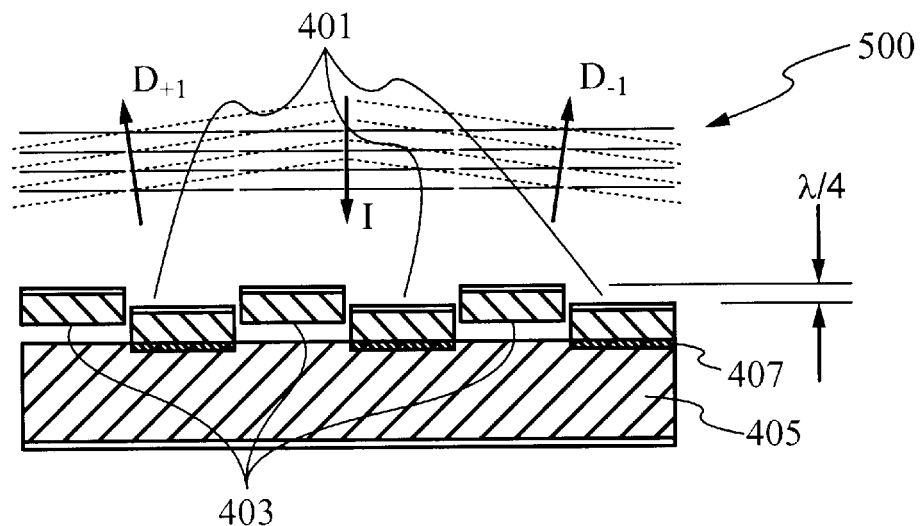
FIG. 12 illustrates a cut-away side view along cut-line A of a grating light valve of FIG. 10 in a diffracting state.

FIG. 11 illustrates a cross-sectional view of a GLV 400 comprising fixed elongated members 403 alternately interspersed with movable elongated members 401. According to one embodiment, multiple independent conductive members 407 are disposed below the movable ribbons 401, thereby providing independent control of the various ribbons. Alternatively, as discussed above in embodiments comprising a continuous conductive layer 407, selective control of ribbons 401 is achieved by coupling each independent ribbon 401, or the collective ribbons of each independent pixel 332–338, to respective independently controllable voltage sources. In either embodiment, the ability to control ribbons 401 of one pixel 332–338 independently from the deflection of ribbons 401 in another pixel 332–338 is essential to exercising independently controllable modulation of the component wavelength signals $\lambda_1'$, . . . , $\lambda_n'$ of a DWM signal. Because the present invention envisions a range of deflection of movable ribbons by means of an electric field created by a conductive element, the electric fields within the conductive members must be controllable through a range of field strengths. In order to focus a particular field more closely on its respective movable ribbon 401, GLVs used in conjunction with the present application will advantageously be constructed with their conductive members 407 nearer the surface of the substrate 405, as depicted in FIGS. 10–12. The moveable elongated elements 401 and the fixed ribbons 403 advantageously include a reflective coating 417 such as aluminum.

In order to deflect the movable ribbons 401, a component of the ribbon must be responsive to an electric field. The field-responsive component may be part of the reflective surface 417, the structural component of the ribbon itself 415, or may comprise an additional layer of the movable ribbon.

Figure 13:
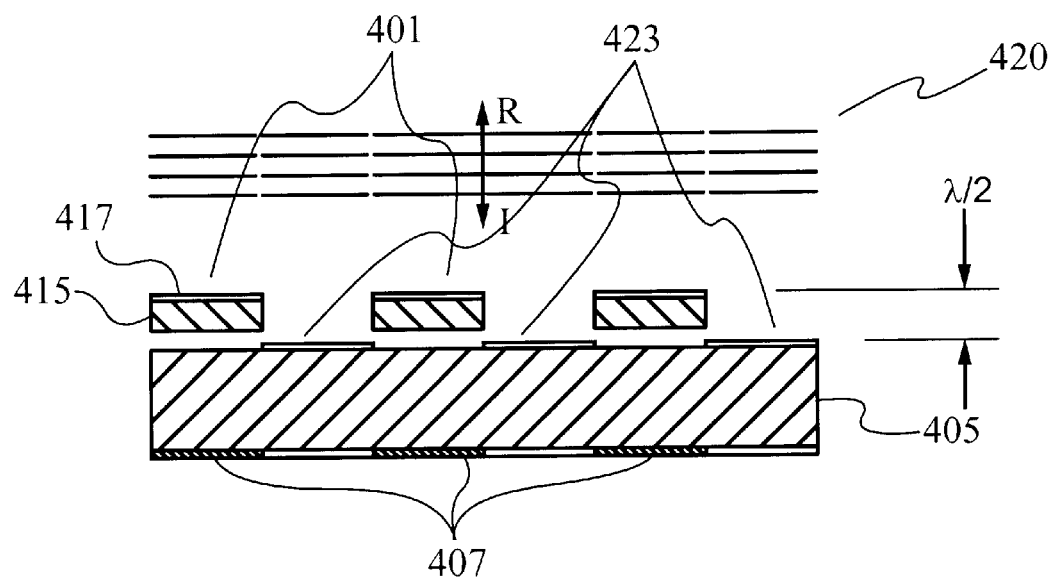
FIG. 13 illustrates an alternative embodiment of a GLV in a non-diffractive state.

In the reflecting mode, the reflective surface 417 of the movable ribbons 401 are typically on either on a parallel plane with the fixed ribbons 403, or, as illustrated in FIG. 13, separated by a height difference of approximately one half wavelength $\lambda/2$ of incident light I. The parallel rows of movable 401 and fixed 403 ribbons as seen in FIG. 11 therefore illustrate a GLV in a reflecting mode.

FIG. 12 illustrates the same GLV 400 of FIG. 11, but with the movable ribbons 401 deflected a distance of $\lambda/4$. This is accomplished by adjusting the field strength created by the conductive members. In this configuration, the GLV 400 is set for maximum diffraction. To transition from the reflecting mode to the diffracting mode, an electrostatic potential between the moveable elongated elements 401 and a conductive member 407s within the substrate 405 moves the moveable elongated elements 401 downward toward the substrate. Diffraction will typically be maximized when the surface of the fixed ribbons 403 is separated from the surface of a movable ribbon 401 by a distance equal to a quarter wavelength $\lambda/4$ of the incident light. According to the present invention, however, the optimum separation is determined by the amount of light that must be "thrown away" and the amount of light that must be reflected back into a channel to equalize the component frequencies $\lambda 1 - \lambda n$ of a wavelength multiplexed signal, as illustrated in conjunction with FIGS. 8 and 9, and subsequent FIGS. 15–25. As will be illustrated in conjunction with FIGS. 22 and 23, it is possible that, for the present application, the maximum amount of light "thrown away" from the re-entering the optical channel 360–362 will occur at less than a quarter wavelength, establishing the upper limit for modulation of the GLV. Although the GLVs illustrated in FIGS. 10–12 show only the first alternating set of ribbons 401 to be movable, those skilled in the art will understand that separation distance between ribbon surfaces, and consequently, the level of diffraction, may equally be controlled by making both sets 401, 403 of interdigited ribbons movable.

Figure 14:
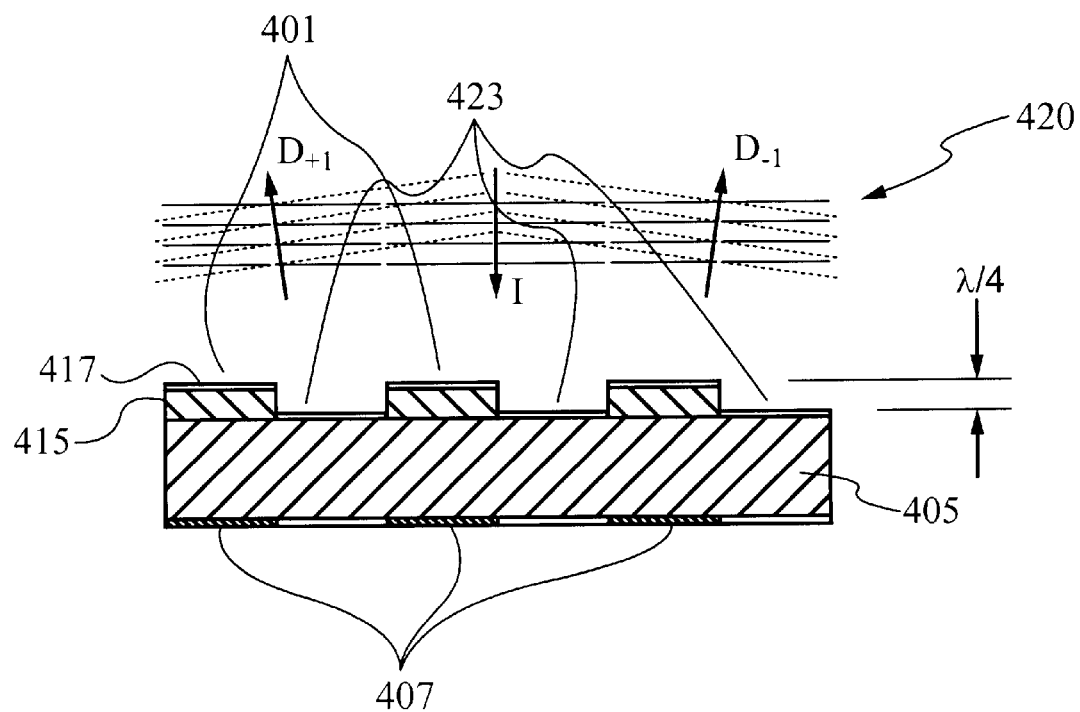
FIG. 14 illustrates an alternative embodiment of a GLV in a diffractive state.

FIG. 13 illustrates an alternative GLV design in the undiffracted state. As noted above, zero diffraction is approached when alternating ribbons are on the same plane (a zero-wavelength separation) as well as when alternating ribbons are separated by half a wavelength. At a separation of $\lambda/2$, the incident light I reflecting from the fixed members 601 travels a full wavelength further than the incident light I reflecting from the movable members 603. Accordingly, the incident light I, reflecting from the fixed 601 and movable 603 ribbons, constructively combines to form reflected light R with little or no diffraction. Accordingly, FIG. 13 illustrates a GLV 420 with the movable ribbons 401 in an undeflected state wherein the undeflected position of the movable ribbons 401 is one half wavelength from the fixed ribbons 423. FIG. 14 illustrates GLV 420 of FIG. 13 in a highly diffracting state. Accordingly, movable ribbons 401 are seen to be deflected downward by a distance of $\lambda/4$. Light reflected from the GLV 420 is illustrated as being diffracted by an amount $D_{+1}$ and $D_{-1}$. Because the embodiment of FIGS. 13 and 14 shows the non-movable ribbons 423 disposed on the surface of the substrate, the GLV design of FIGS. 13–14 cannot accommodate two sets of movable ribbons. Although the present invention is not limited to any one form of grating light valve, U.S. Pat. Nos. 5,311,360 and 5,841,579 to David Bloom, and U.S. Pat. No. 5,661,592 to Bornstein et al. are herein incorporated by reference as examples of the fabrication, structure, and operation of grating light valves commonly understood by those skilled in the art.

Figure 15:
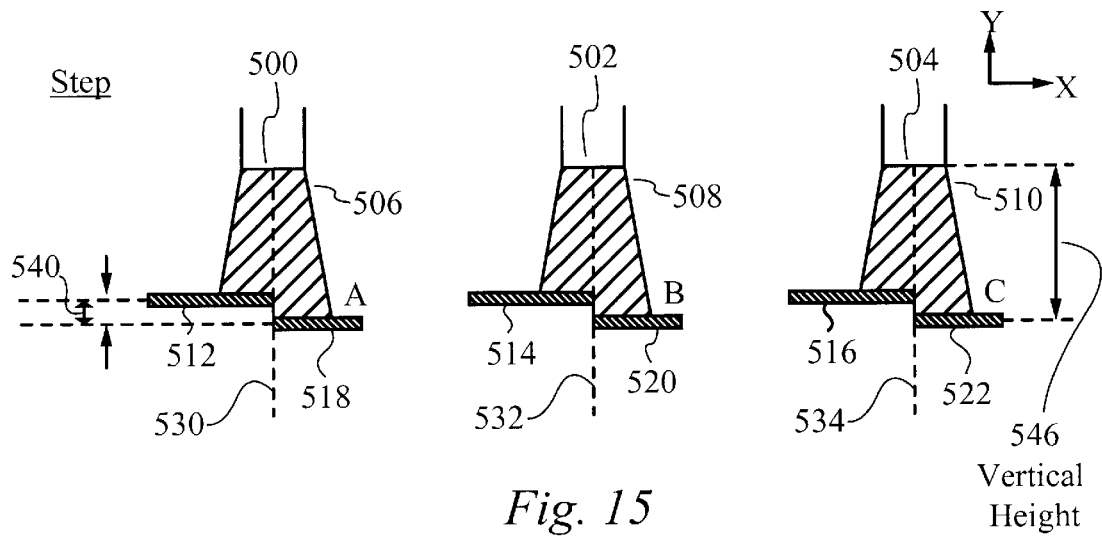
FIG. 15 illustrates a step embodiment of a grating light valve for use in conjunction with the present invention.
Figure 16:
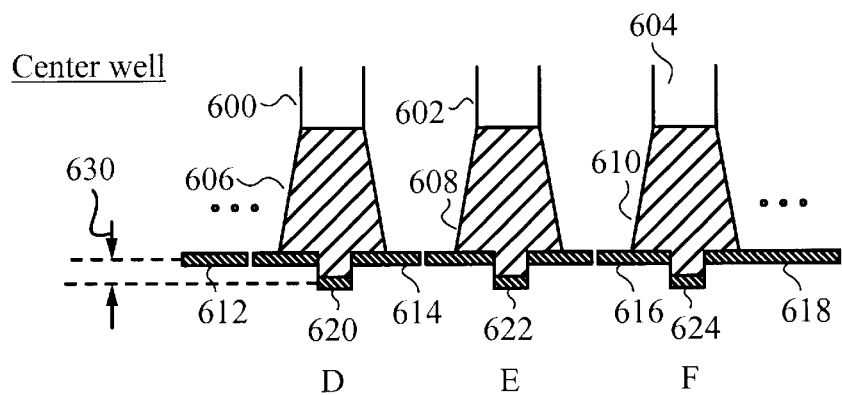
FIG. 16 illustrates a center well embodiment of a grating light valve for use in conjunction with the present invention.
Figure 17:
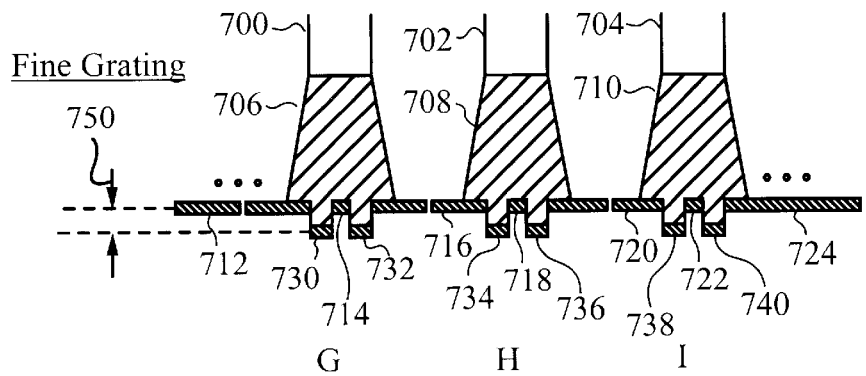
FIG. 17 illustrates a fine grating embodiment of a grating light valve for use in conjunction with the present invention.

As discussed in greater detail in conjunction with FIGS. 15–17, when a GLV is used as the diffraction light modulator, a pixel is advantageously comprised of a predetermined number of ribbons working in concert. Each pixel is advantageously dedicated to modulating a single frequency. Embodiments discussed herein include a "step" embodiment utilizing only two ribbons per pixel, a "center well" embodiment utilizing three ribbons per pixel, and a "fine grating" embodiment utilizing five ribbons per pixel. Although these embodiments are illustrated as comprising alternating fixed and movable ribbons, those skilled in the art will understand that these embodiments can equally be constructed of all movable ribbons. Although the "step", "center well" and "fine grating" GLV structures depicted in FIGS. 15, 16, and 17 are shown in a lensless embodiment, it is understood that these GLV structures may equally be used in conjunction with the lens embodiment illustrated in FIG. 8.

According to the "step" embodiment illustrated in FIG. 15, each pixel of the grating light valve comprises a first elongated ribbon 512, 514, 516 and a second elongated ribbon 518, 520, 522. The elongated ribbons 512 & 518, 514 & 520, 516 & 522 controllably reflect the light back into the respective optical channels 500, 502, 504. According to the preferred embodiment, the first set of ribbons 512, 414, 516 are fixed and the second set of ribbons 518, 520, 522 are movable. As noted, however, embodiments are envisioned wherein both elongated ribbons are movable. Three fiber optical channels 500, 502, 504 are respectively focused above the three pixels A, B, C of the grating light valve. A beam of light 506, 508, 510 emanates forth from a tip of each fiber optical channel 500, 502, 504. Channel 504 is seen positioned a vertical distance 546 above pixel C of the grating light valve. The elongated ribbons 512 & 518, 514 & 520, 516 & 522 for a particular pixel A, B, C are disposed such that the two elongated ribbons of the same pixel, define vertical line 530, . . . , 534 perpendicular to the plane of the pixel. The optical channel 500, 502, 504 is advantageously positioned above its respective pixel such that the vertical line 530, 532, 534 of its respective pixel A, B, C will coincide with the axes of the fiber optical channel 500, 502, 504.

The amount of diffraction generated by a pixel is affected by the separation distance 540 between the first and second elongated ribbon of a given pixel. Therefore, to control the amount of diffraction, the separation distance 540 must be controllable. As discussed in conjunction with FIGS. 10–14, this is typically achieved by adjusting the vertical position of the movable elongated ribbon of a pixel by means of an electrostatic field applied through a conductive member coupled to a control voltage, thereby increasing or decreasing the separation distance 540 of the elongated ribbons 512 & 518, 514 & 520, 516 & 522 within a particular pixel A, B or C according to the voltage level.

The vertical height 546 between an optical channel 500, 502, 504 and a grating light valve is measured from the tip 544 of an optical channel 504 to a center line between a fixed elongated ribbon 516 and a movable elongated ribbon 522. When a separation distance 540 is set at one-quarter wavelength, a beam of light reflecting off the movable member will travel a total of one-half wavelength further than a portion reflected off the fixed or upper surface. According to the step embodiment, this offset will typically produce the greatest diffraction pattern, thereby reducing by the greatest measure the amount of light reflected back into the optical channel. Conversely, because there is no diffraction resulting from an offset of zero wavelengths, a separation difference 540 of zero will result in most light waves reflecting back into the optical channel. By regulating the separation distance 540, typically between zero and one-quarter wavelength, the reflected beam may be regulated from a high degree of diffraction to virtually no diffraction, including a range of intermediate gradations there between, thereby controlling the amount of light 506 reflected back into the optical channel 500. This will be understood more clearly in conjunction with FIGS. 18A and 18B, wherein greater diffraction reduces the amount of reflected light remaining along the center line approaching the optical channel, and a greater portion of the light is thrown away from the center line beyond the fiber optics axis.

FIG. 16 presents an alternative "center well" embodiment for a grating light valve for use in equalization of component signals in wavelength division multiplexing. The optical channels 600, . . . , 604 are seen disposed above the respective pixels, D, E, and F of a grating light valve. Using the first pixel D for exemplary purposes, a center ribbon 620 is abutted by adjacent ribbons 612, 614 on each side. According to the preferred embodiment, the center ribbon 620 is the movable member, and the adjacent ribbons 612, 614 are fixed. This configuration allows a single fixed member 614 to serve as an adjacent member for two separate pixels D, E. Accordingly, each pixel comprises a center member abutted by an adjacent member on each side. Each optical channel 600, 602, 604 is assigned to a respective pixel D, E, F. The operation of the center well GLV is otherwise identical to the operation of the step GLV. Operational parameters of these two configurations may be compared in FIGS. 18B and 19B.

FIG. 17 is a "fine grating" GLV used in conjunction with the present invention. Using the first pixel G for exemplary purposes, a plurality of movable ribbons 730, 732 are interdigited with a plurality of fixed ribbons 712, 714, 716. The two adjacent fixed ribbons 712, 716 are disposed outside the two movable ribbons 730, 732. According to this embodiment, an adjacent fixed ribbon 716 may serve as a fixed ribbon for two adjacent pixels, G and H. It is understood, however, that the fixed elongated ribbon 716 could be replaced by two separate fixed elongated ribbons. The three pixels G, H, I depicted in FIG. 17 are respectively assigned to one of the optical channels 700, 702, 704. The structure of the first pixel G is seen repeated among the plurality of pixels G, H, I of the grating light valve depicted in FIG. 17 such that a dedicated fixed member 714, 718, 720 is inter-positioned between the two movable elongated ribbons assigned to any one optical channel. Common fixed members 712, 716, 720, 724 are positioned such that a single common member serves as a reflective surface for two separate optical channel 700, 702, 704. It is understood that the embodiment of FIG. 17 with common fixed members capable of serving two separate optical channels promotes economy and efficiency, and that two separate elongated ribbons could be substituted for each of the common fixed members 712, 716, 720, 724. Although FIG. 17 depicts a fine grating embodiment comprising only two movable ribbons per optical channel, and one dedicated fixed ribbon inter-positioned between those two movable ribbons, this depiction is not intended to limit the number of movable ribbons assigned to each optical channel.

Figure 18A:
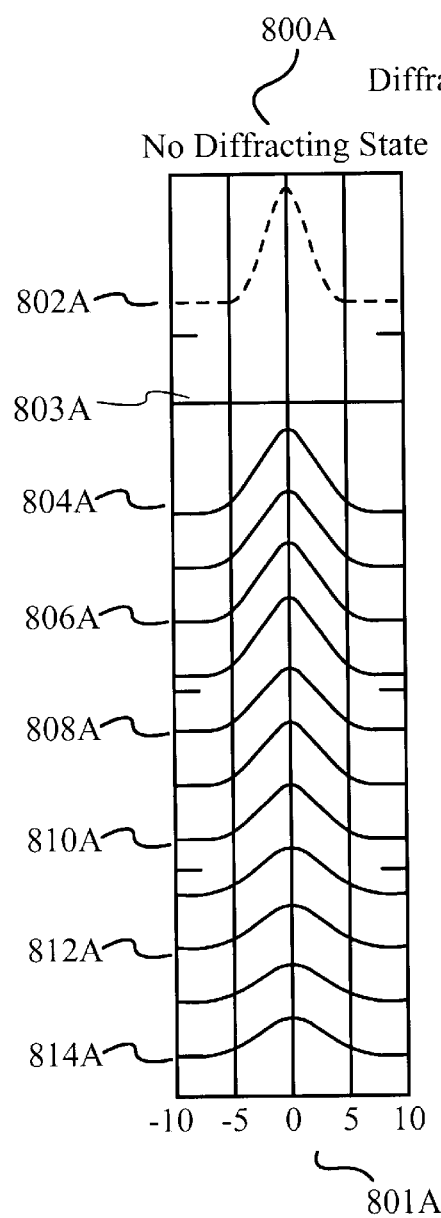
FIG. 18A graphically illustrates the power distribution of incident and reflected beams according to a step embodiment of a grating light valve in a non-diffracted state.
Figure 18B:
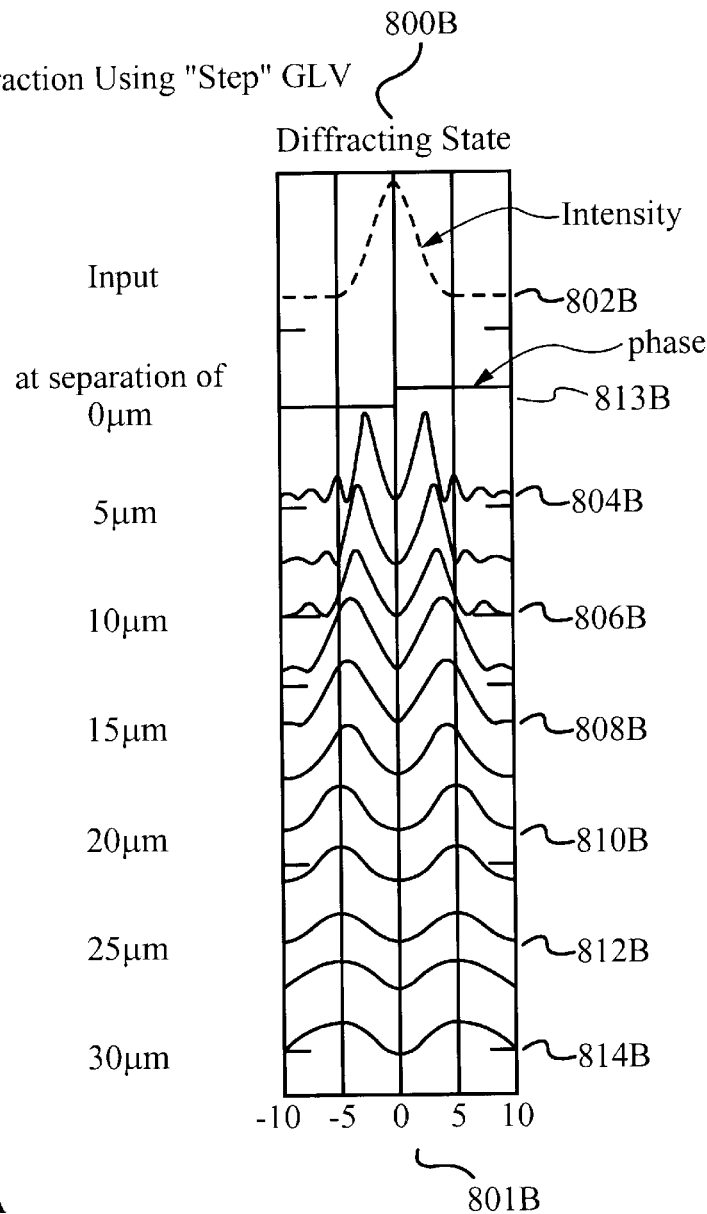
FIG. 18B graphically illustrates the power distribution of incident and reflected beams according to a step embodiment of a grating light valve in a diffracted state.

FIGS. 18A and 18B are graphs of light intensity distribution as a function of distance from a reflected surface of the step embodiment depicted in FIG. 15. The graphs are generated numerically using a light beam with a wavelength of 1.55 μm discharged from an optical fiber or conduit approximately 8 μm diameter. The respective separation distance 540 (FIG. 15) between the movable 516, 518 and fixed 512, 514 elongated ribbons is respectively zero μm 802A in FIG. 18A, and λ/4, which, at a wavelength of 1.55 μm is a separation distance of approximately 0.3875 μm 803B in FIG. 18B. The horizontal axis 800A, 800B of both graphs is a measure of distance from a vertical line 530, ..., 534 (FIG. 15) formed at the intersection 803B of two ribbons. These respective vertical lines 530, ..., 534 is also seen to intersect the center point of a circle formed at the tip of the cylindrical optical fiber comprising an optical channel 500, 502, 504 (FIG. 15). In FIGS. 18A and 18B, this vertical line passes through zero on the horizontal axis 801A, 801B. The gradations on the horizontal axes are measured in μm from the center point. The vertical axis represents a relative power distribution for each represented wave form 802A, ..., 814B. The dotted graphs 802A, 802B at the top are a measure of the power distribution from a beam of light prior to being reflected off a GLV surface. The power distribution was measured 20 μm away from a tip 540, 542, 544 of a fiber optical channel 500, 502, 504. It is noted that the light power distribution 802A, 802B is greatest along the center line 801A, 801B, attenuating outward, so that it has substantially attenuated at 5 μm from the center line 800A, 800B. The lower graphs 804A, ..., 814A of FIG. 18A show the power distribution of reflected light at various distances from a non-diffracting GLV surface 803A with a separation distance 540 (FIG. 15) of zero. The graphs are noted to be substantially Gaussian-like in shape. Reflected light levels 804A–814A are noted to display a greater center line power distribution. Because the optical channel 500, 502, 504 is oriented along the center line 530–534, the greater the amount of light distributed along the center line, the greater the amount of light re-entering the channel 500–504. Conversely the less light distributed along the center line, the less light will re-enter the fiber optical tip.

The lower graphs 804B, ..., 814B of FIG. 18B show the intensity distribution of reflected light at various distances from a diffracting GLV surface 803B with a Separation Distance 540 (FIG. 15) λ/4, which, as noted, at a wavelength of 1.55 μm is a Separation Distance of approximately 0.3875 μm. The graphs no longer exhibit a Gaussian-like shape, but exhibit a diffraction pattern which includes two primary nodes to the left and right of the center line. Such distributions reduce the amount of light reflected back into the optical channel By modulating the separation distance 540 (FIG. 15) from zero to 0.3875 μm., the equalization process can return a greater or lesser amount of reflected light for a specific channel.

Figure 19A:
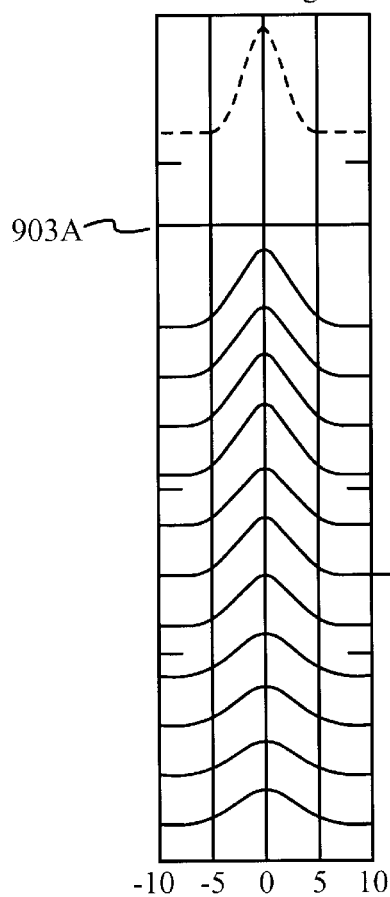
FIG. 19A graphically illustrates the power distribution of incident and reflected beams according to a center well embodiment of a grating light valve in a non-diffracted state.
Figure 19B:
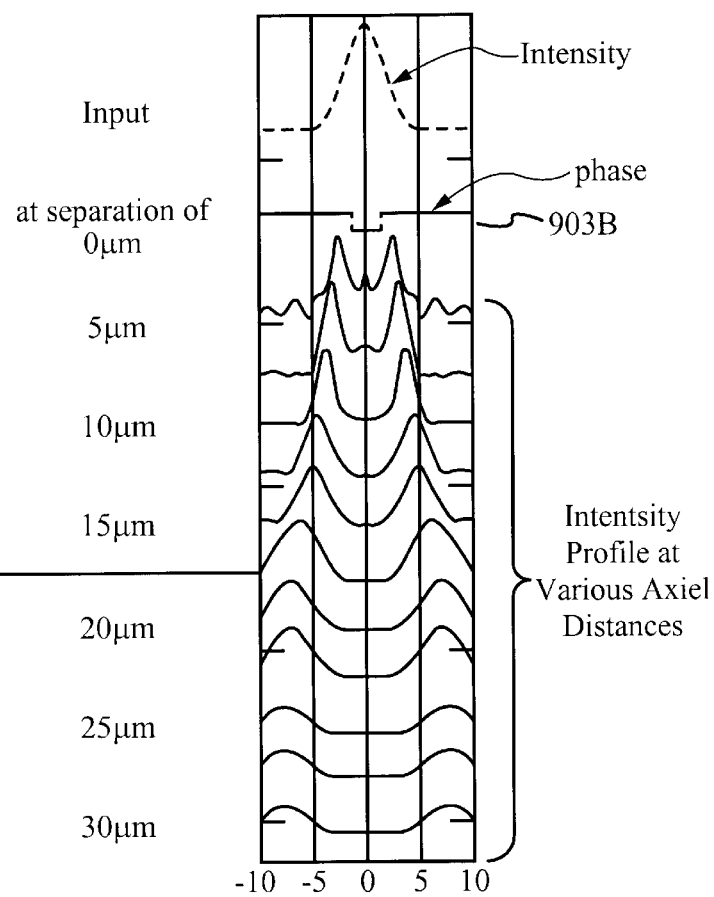
FIG. 19B graphically illustrates power distribution of incident and reflected beams according to a center well embodiment of a grating light valve in a diffracted state.

FIGS. 19A and 19B contrast light reflected off a non-diffracting surface (defined by a separation distance 540 of zero μm) surface 903A and light reflected off a diffracting surface 903B according to the center well embodiment (FIG. 16). The graphs of refraction are based on a separation distance 540 (FIG. 15) between diffracting surfaces of (¾) λ/4, or approximately 0.29 μm. This optimum separation distance was determined empirically, as discussed in conjunction with FIGS. 20–21.

Figure 20:
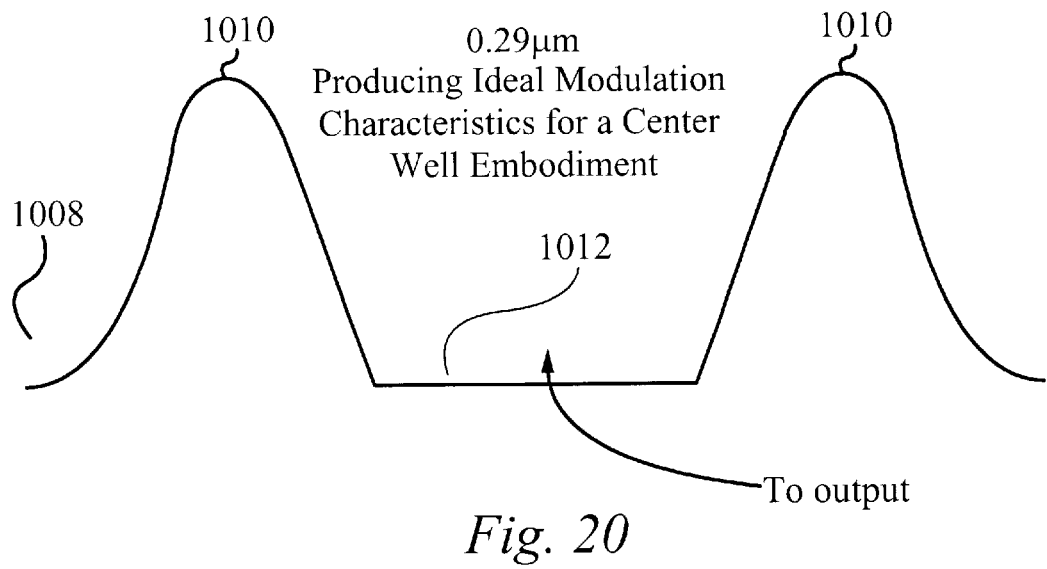
FIG. 20 graphically illustrates an over-modulated signal in the center well embodiment.
Figure 21:
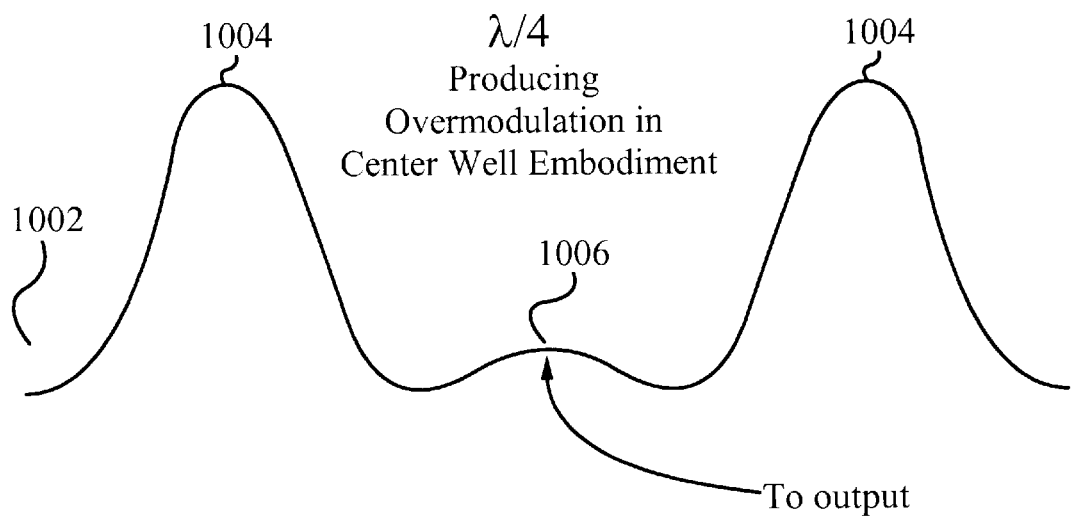
FIG. 21 graphically illustrates optimal maximum diffraction in the center well embodiment.

FIG. 20 depicts a graphic illustration of a diffraction pattern at a separation distance of 0.29 μm in a center well embodiment. The center portion 1012 of the graph, which preferably directs toward an optical channel, shows an output of virtually no light. Virtually all the light in FIG. 20 is directed into the side bands 1010. According to the present invention, a diffractive pattern is modulated from a high-end diffraction pattern returning the maximum possible amount of light to an optical channel to a low-end pattern returning the minimum possible amount of light to an optical channel. Accordingly, the graph of FIG. 20 illustrates an ideal low-end diffraction pattern. Conversely, FIG. 21 illustrates an "over-modulated" signal. Although the distance of λ/4 produces the greatest theoretical diffraction, it over-modulates the diffracted waveform 1002, producing a center-line component of light 1006 reflected back into the optical channel. At a separation distance 630 of 0.29 μm, however, the resultant waveform 1008 exhibits virtually no center-line light component 1012. If an algorithm were to modulate between the "high-end" (zero diffraction) to the diffraction pattern graphically illustrated in FIG. 21, a minimum amount of light would be returned to the optical channel at less than total modulation. FIGS. 20 and 21 thus illustrate that, although the separation distance λ/4 produces the maximum modulation in the other two structures, as applied to the present invention, the distance λ/4 may over-modulate a signal when used in conjunction with a center well embodiment. In terms of focusing a minimum amount of light on a center line and "throwing away" a maximum amount of light, in accord with the present invention, a separation distance 630 for the center well embodiment modulated from zero μm and 0.29 μm produces the maximum to minimum range of reflected light re-entering the optical channel.

Figure 22:
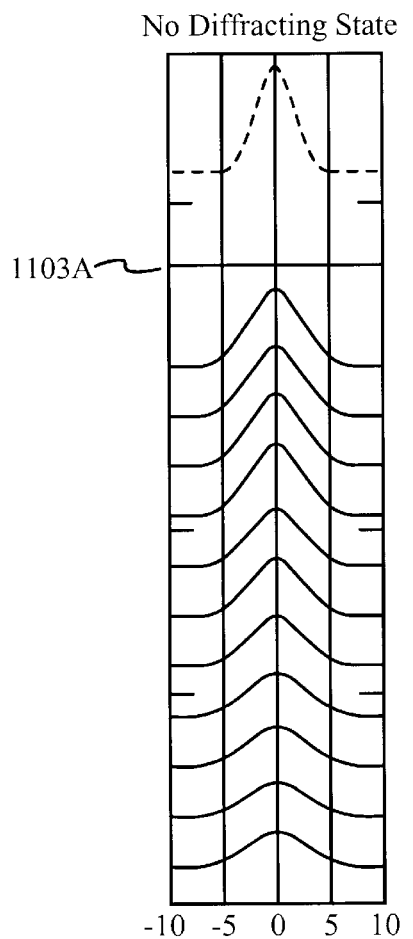
FIG. 22 graphically illustrates the power distribution of incident and reflected beams according to a fine grating embodiment of a grating light valve in a non-diffracted state.
Figure 23:
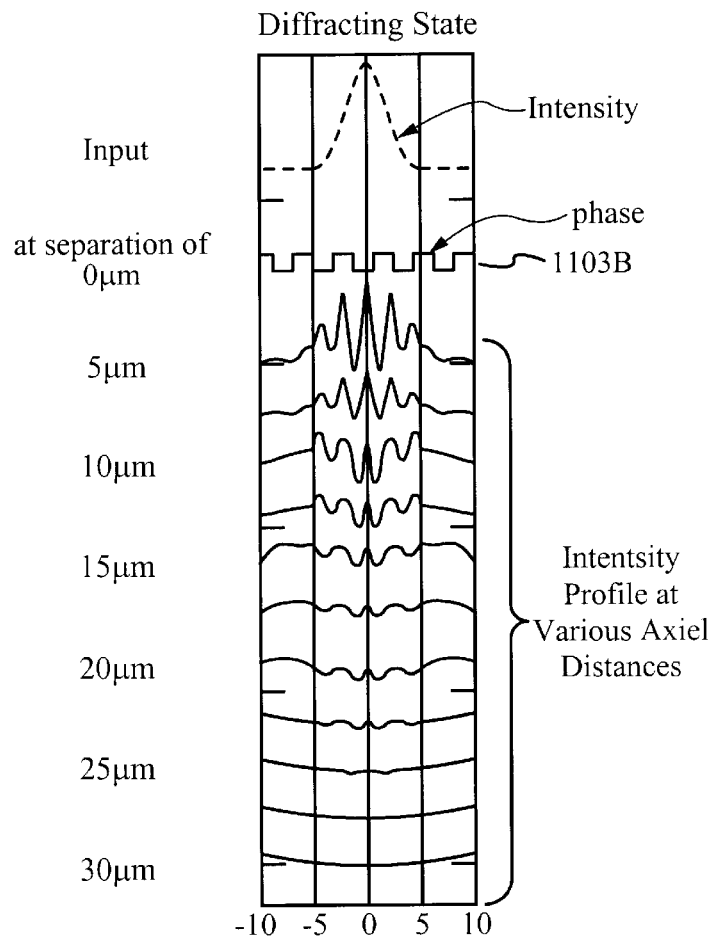
FIG. 23 graphically illustrates power distribution of incident and reflected beams according to a fine grating embodiment of a grating light valve in a diffracted state.

FIGS. 22 and 23 graphically illustrate center-line light intensities in the fine grating embodiment. FIG. 22 is an illustration of the distribution of light reflected along the center line of a fine-grating pixel in the non-diffracting mode. It is substantially similar to the step and center well embodiments in the non-diffracting mode, distributing the greatest amount of light along the center line within the circumference of the fiber optical channel for a given wavelength. FIG. 23 discloses the center line distribution of light reflected off a fine grating pixel in a diffracting mode with a separation distance 750 of λ/4, or approximately 0.3875 μm. As in the previous examples, it is seen that the center line distribution of light falling within the circumference of a fiber optical channel is significantly less when the fine grating GLV is in the diffracting mode. λ/4 separation distance 750 (FIG. 17) between diffracting surfaces.

Figure 24:
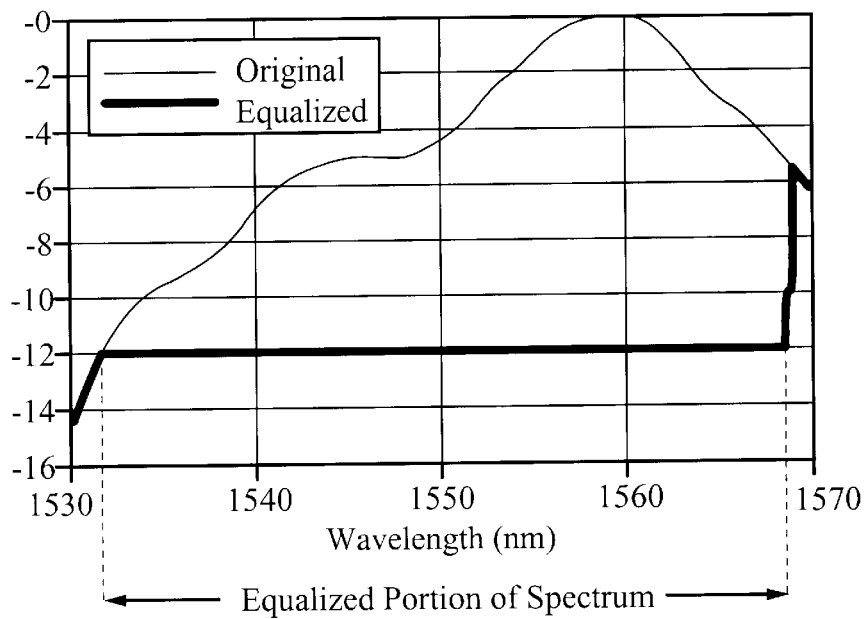
FIG. 24 illustrates continuous-spectrum graphs of WDM signals before and after equalization.

The GLV based dynamic gain equalizer (DGE) of the present invention preferably operates in the C-band and uses a grating light valve (GLV) as a diffraction light modulator with a dynamic range of more than 15 dB. In an actual experiment, an ASE source was used as an input signal. The equalization is applied to the spectral portion between 1531.5 nm and 1568.5 nm, in which the power of light at various points of the spectrum was seen to vary by more than 12 dB. FIG. 24 compares the original spectral profile and the equalized spectral profile. The equalized profile was measured to exhibit a ±0.05 dB rms residual ripple with a ±0.2 dB peak-to-peak value.

Figure 25:
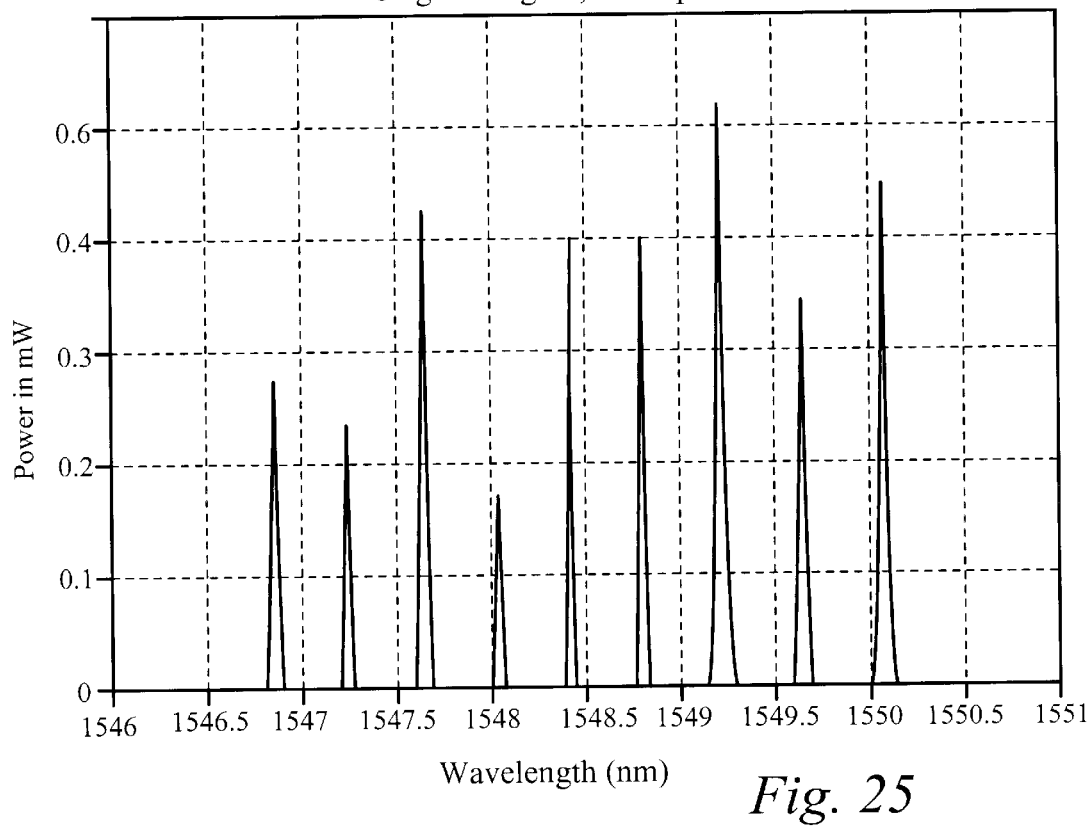
FIG. 25 graphically illustrates discrete WDM component signals before equalization.
Figure 26:
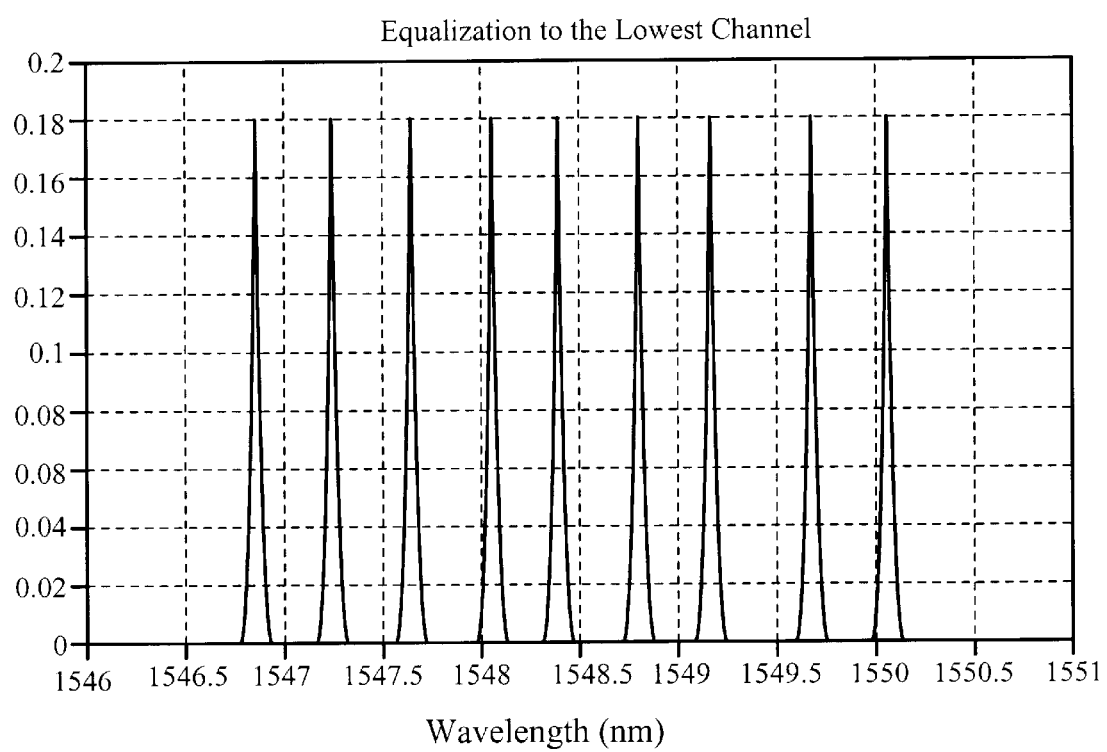
FIG. 26 graphically illustrates discrete WDM component signals after equalization.

In a different experiment, a wavelength division multiplexed signal was selected that consisted of eight 50 GHz spaced channels, as illustrated in FIG. 25. FIG. 26 illustrates the equalized profile, which was measured to display a ±0.05 dB rms residual ripple with ±0.1 dB.

As illustrated by the above examples and discussion, the DGE module can be tailored to meet the exact needs of a wide variety of different equalization applications. As the GLV device can function as a "seamless" multi-channel VOA, a GLV-based DGE can operate at any arbitrary spectral resolution, with commensurate total package size. Furthermore, wide spectral coverage applications, such as extended-band C+L band applications, are easily accommodated in this module architecture. When using any continuous mux/de-mux function, including diffraction grating, prism, or combination thereof, with a smoothly varying angular dispersion function, the dynamic gain equalizer of the present invention can accommodate whatever spectral coverage is desired while dynamically equalizing wavelength division multiplexed channels to a high degree of uniformity in power.

The present invention has been described in terms of specific embodiments incorporating details to facilitate the understanding of the principles of construction and operation of the invention. Such reference herein to specific embodiments and details thereof is not intended to limit the scope of the claims appended hereto. More specifically, references to the step, center well and fine grating embodiments are not intended to limit the application of grating light valve technology in optical channel equalization to these three embodiments. It will be apparent to those skilled in the art that virtually any grating light valve design may be adapted for optical channel equalization according to the present invention.

What is claimed is:

1. An apparatus for selectively adjusting power levels of component signals of a wavelength division multiplexed signal including a first wavelength signal and a second wavelength signal, the apparatus comprising a diffractive light modulator with a first pixel configured to receive the first wavelength signal and a second pixel configured to receive the second wavelength signal, wherein each pixel is controllable to selectively direct a received signal into a first mode and a second mode, and further wherein each first mode is collected such that a power level of the first wavelength signal is selectively adjusted relative to a power level of the second wavelength signal.

2. The apparatus according to claim 1 wherein the diffractive light modulator comprises a grating light valve.

3. An apparatus for selectively adjusting power levels of component signals of a wavelength division multiplexed signal including a first wavelength signal and a second wavelength signal, the apparatus comprising:
   a. a demultiplexer configured to de-multiplex the wavelength division multiplexed signal into the component signals, including the first wavelength signal and the second wavelength signal;
   b. a diffractive light modulator with a first pixel configured to receive the first wavelength signal and a second pixel configured to receive the second wavelength signal from the multiplexer, wherein each pixel is controllable to selectively direct a received signal into a first mode and a second mode, and further wherein each first mode is collected such that a power level of the first wavelength signal is selectively adjusted relative to a power level of the second wavelength signal thereby forming first and second collected wavelength signals; and
   c. a multiplexer configured to multiplex the first and second collected wavelength signals into an output signal.

4. The apparatus of claim 3 wherein the first mode comprises a reflection mode and further wherein the second mode comprises a diffraction mode.

5. The apparatus of claim 3 further comprising:
   a. a light sensor for each pixel for determining a power level proportional to the first mode from the pixel; and
   b. a controller electrically coupled to each light sensor and the diffractive light modulator such that in operation the light sensors detect power levels proportional to the first and second collected wavelength signals and further such that in operation the controller dynamically modulates the first and the second pixels of the diffractive light modulator to maintain a desired level of power in the first mode for each pixel relative to each other.

6. The apparatus of claim 3 wherein the multiplexer and the demultiplexer comprise separate components.

7. The apparatus of claim 3 wherein the multiplexer and the demultiplexer comprise a bi-directional multiplexer/demultiplexer.

8. The apparatus of claim 7 further comprising a circulator such that in operation the wavelength division multiplexed signal couples to the bi-directional multiplexer/demultiplexer through the circulator from an optical input.

9. The apparatus of claim 8 wherein the output signal couples from the bi-directional multiplexer/demultiplexer through the circulator to an optical output.

10. The apparatus of claim 3 further comprising first and second lenses configured such that, in operation, the first lens directs the first wavelength signal onto the first pixel, and the second lense directs the second wavelength signal onto the second pixel.

11. The apparatus of claim 3 further comprising first and second optical fibers for respectively directing the first and second wavelength signals onto the first and second pixels.

12. The apparatus of claim 3 wherein the diffractive light modulator comprises a grating light valve.

13. The apparatus of claim 3 wherein the demultiplexer comprises a dispersion device.

14. The apparatus of claim 13 wherein the dispersion device comprises a prism.

15. The apparatus of claim 13 wherein the dispersion device comprises a grating.

16. The apparatus of claim 15 wherein the grating comprises an array waveguide grating.

17. A method of adjusting a power level of each of a plurality of component wavelength signals of a wavelength division multiplexed signal comprising the steps of:
   a. de-multiplexing an input signal into component wavelength signals including first and second wavelength signals;
   b. directing the first wavelength signal onto a first pixel and the second wavelength signal onto a second pixel;
   c. modulating the first pixel to selectively direct the first wavelength signal into a first mode and a second mode;

d. modulating the second pixel to selectively direct the second wavelength signal into the first mode and the second mode; and e. collecting the first mode of the first wavelength signal and the first mode of the second wavelength signal such that a power level of the first wavelength signal is adjusted relative to a power level of the second wavelength signal.

18. The method of claim 17 wherein the first mode comprises a reflection mode and further wherein the second mode comprises a diffraction mode.

19. An apparatus for adjusting a power level of each of a plurality of component wavelength signals of a wavelength division multiplexed signal comprising:

a. means for de-multiplexing an input signal into component wavelength signals including first and second wavelength signals;

b. means for directing the first wavelength signal onto a first pixel and the second wavelength signal onto a second pixel;

c. means for modulating the first pixel to selectively direct the first wavelength signal into a first mode and a second mode;

d. means for modulating the second pixel to selectively direct the second wavelength signal into the first mode and the second mode; and e. means for collecting the first mode of the first wavelength signal and the first mode of the second wavelength signal such that a power level of the first wavelength signal is adjusted relative to a power level of the second wavelength signal.

20. The apparatus according to claim 19 wherein the first mode comprises a reflection mode and further wherein the second mode comprises a diffraction mode.

21. A channel equalizer for a wavelength division multiplexing system comprising:

a. a demultiplexer configured to separate the wavelength division multiplexed input signal into a plurality of input wavelength signals, including a first input wavelength signal;

b. a diffractive light modulator comprising a plurality of pixels configured to modulate the plurality of input wavelength signals into a plurality of modulated signals, including a first pixel configured to controllably modulate the first input wavelength signals into a first modulated signal, such that a modulation of a pixel controls a percent of a modulated signal forming a reflected component and a percent of a modulated signal forming a diffracted component, wherein a percent of the first modulated signal modulated into a first diffracted signal is within the range of zero percent to one hundred percent of the first modulated signal;

c. a multiplexer configured to combine the reflected components of the plurality of modulated signals into a wavelength division multiplexed output signal.

22. The channel equalizer of claim 21 wherein the diffractive light modulator comprises a grating light valve.

23. The channel equalizer of claim 22 further comprising a light sensor configured to measure a reflected portion of the first modulated signal.

24. The channel equalizer of claim 22 further comprising a light sensor configured to measure a portion of the first diffracted signal.

25. The channel equalizer of claim 22 further comprising a controller coupled to the light sensor, wherein the controller is configured to control the first pixel according to a power level of light measured by the light sensor.

26. The channel equalizer according to claim 22 further comprising a circulator coupled to both the wavelength division multiplexed input signal and a wavelength division multiplexed output signal.

27. The channel equalizer according to claim 22 wherein the grating light valve is a step grating light valve.

28. The channel equalizer according to claim 22 wherein the grating light valve is a center well grating light valve.

29. The channel equalizer according to claim 22 wherein the grating light valve is a fine-grating grating light valve.

30. The channel equalizer of claim 22 wherein power levels of the plurality of input wavelength signals are equalized to a reference power level.

31. The channel equalizer of claim 22 wherein power levels of the plurality of input wavelength signals are equalized to a reference power-level function.

32. A method of selectively equalizing respective power levels among a plurality of component wavelength signals of a wavelength division multiplexed signal, the method comprising the steps:

a. directing the plurality of component incoming wavelength signals onto a respective plurality of pixels of a diffractive light modulator, wherein a first component incoming wavelength signal is directed onto a first pixel;

b. controlling the respective pixels by a controller to control an amount of modulation imposed on a component incoming wavelength signal;

c. producing a plurality of modulated signals, wherein each of the modulated signals comprises a reflected component, and wherein at least one modulated signal comprises a diffracted component; and d. equalizing respective power levels among the reflected components of the modulated signals.

33. The method according to claim 32 wherein the diffractive light modulator is a grating light valve.

34. The method according to claim 32 further comprising the steps of:

a. collecting a portion of the plurality of modulated signals though a respective plurality of light sensors; and b. measuring a power level of light collected within each of the plurality of light sensors.

35. The method according to claim 34 wherein light collected within a light sensor comprises a reflected portion of a modulated signal.

36. The method according to claim 34 wherein light collected within a light sensor comprises a diffracted portion of a modulated signal.

37. The method according to claim 35 further comprising the steps:

a. converting the power levels of the light collected in each of the plurality of light sensors to a respective digital value, and b. using a digital value to control the first pixel.

38. The method according to claim 33 further comprising the steps:

a. collecting a plurality of collected portions of reflected signals into a wavelength multiplexer; and b. combining the plurality of collected portions of the reflected signals reaction signals into a multiplexed output signal.

* * * * *